(12) United States Patent
Maekawa et al.

(10) Patent No.: US 7,860,980 B2
(45) Date of Patent: Dec. 28, 2010

(54) INFORMATION PROCESSING DEVICE, SERVER, COMMUNICATION SYSTEM, ADDRESS DECISION METHOD, ADDRESS MODIFICATION METHOD, AND PROGRAM

(75) Inventors: Hajime Maekawa, Osaka (JP); Takumi Ikeda, Hyogo (JP)

(73) Assignee: Panasonic Corporation, Osaka (JP)

( * ) Notice: Subject to any disclaimer, the term of this patent is extended or adjusted under 35 U.S.C. 154(b) by 907 days.

(21) Appl. No.: 11/466,854

(22) Filed: Aug. 24, 2006

(65) Prior Publication Data
US 2007/0002873 A1 Jan. 4, 2007

Related U.S. Application Data

(63) Continuation of application No. 10/597,496, filed as application No. PCT/JP2005/000565 on Jan. 19, 2005.

(51) Int. Cl.
*G06F 15/16* (2006.01)
(52) U.S. Cl. .................. 709/227; 709/228; 709/245; 370/398; 370/469
(58) Field of Classification Search .............. 709/227, 709/228, 245; 370/398, 469
See application file for complete search history.

(56) References Cited

U.S. PATENT DOCUMENTS 6,614,809 B1 * 9/2003 Verma et al. ............... 370/469
7,106,967 B2 * 9/2006 Handelman ................. 398/47
7,111,065 B2 * 9/2006 Davidson et al. ........... 709/227
7,127,524 B1 * 10/2006 Renda et al. ............... 709/245
7,359,973 B2 * 4/2008 Chiles et al. ............... 709/228

FOREIGN PATENT DOCUMENTS

JP    2001-268125    9/2001
JP    2003-244188    8/2003
JP    2003-244251 A  8/2003

OTHER PUBLICATIONS

Umemoto, "BSB de My Server o Tsukuro!, Dynamic Tunnel", BSD Magazine 2000 No. 5, Ascii Corp., Dec. 31, 2000, pp. 115-177, Fig. 1.
Yamada, "Solution Unyo Kokoga Point? Dai 1 Kai, Internet VPN Unyo-Zenpen-Pilot Test to Sekkei no Point", N+1 Network, Softbank Publishing Inc., vol. 2, No. 12, Dec. 1, 2002, pp. 130-135.

* cited by examiner

*Primary Examiner*—Kyung-Hye Shin
(74) *Attorney, Agent, or Firm*—Pearne & Gordon LLP

(57) ABSTRACT

A first information-processing device for communication source performing tunnel communication with a device at communication destination, equipped with: tunnel communication part performing tunnel communication with communication target data encapsulated; identifier acceptor for accepting a communication destination device identifier for identifying a device for communication destination; identifier storage part for storing a communication source device identifier for identifying first information-processing device; and address determination part for determining an address used for communication target data, according to a communication destination device identifier and a communication source device identifier. Such a makeup provides an information-processing device capable of determining an address used for communication target data encapsulated in tunnel communication.

4 Claims, 24 Drawing Sheets

First information-processing device 1

Second information-processing device 2

FIG. 5A
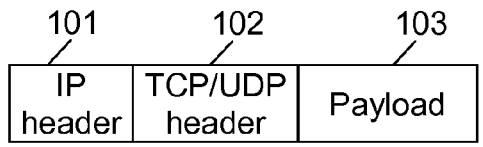
FIG. 5B
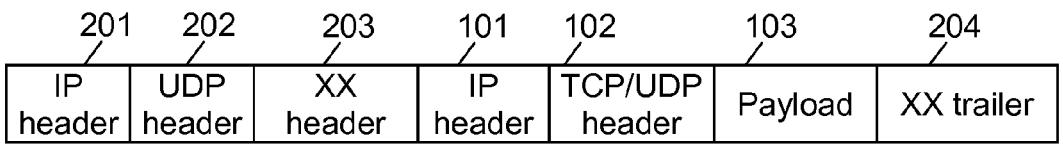
FIG. 6
| Digit number where device identifier is different | IP address |
|---|---|
| 0 | 192.168.0.0 |
| 1 | 192.168.0.1 |
| 2 | 192.168.0.2 |
| ⋮ | ⋮ |
| 8 | 192.168.0.8 |
| 9 | 192.168.0.9 |
FIG. 7
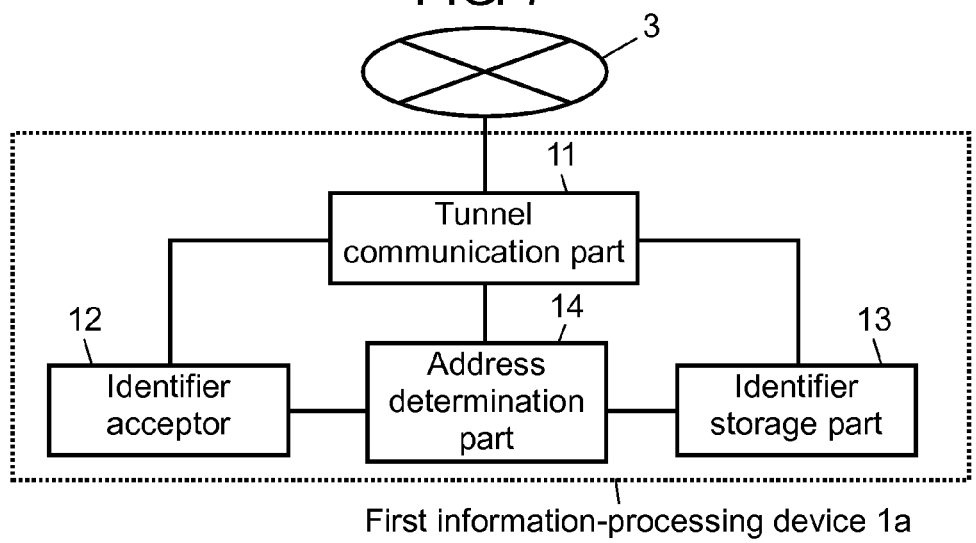
First information-processing device 1a FIG. 10
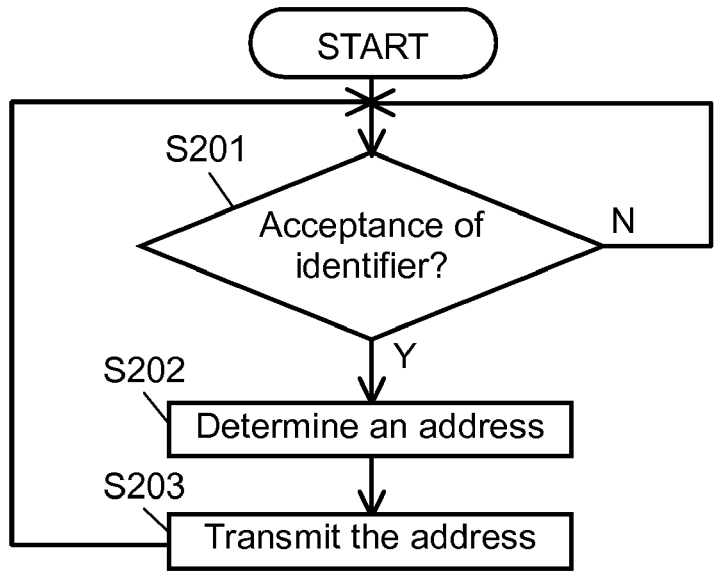
FIG. 11
| Device identifier | IP address |
| --- | --- |
| 12345678 | 202.132.10.6 |
| 98765432 | 131.206.10.240 |
| ⋮ | ⋮ |
FIG. 12
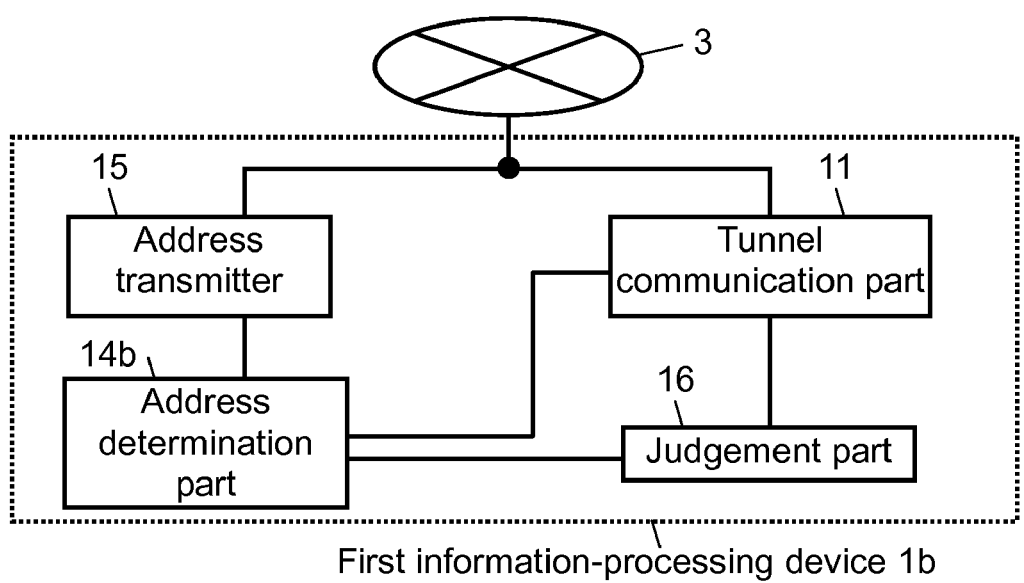

FIG. 15A

| | IP address |
|---|---|
| Caller | 192.168.0.1 |
| Callee | 192.168.0.2 |

FIG. 15B

| | IP address |
|---|---|
| Caller | 192.168.0.1 |
| | 192.168.0.3 |
| | 192.168.0.5 |
| | 192.168.0.7 |
| Callee | 192.168.0.2 |
| | 192.168.0.4 |
| | 192.168.0.6 |
| | 192.168.0.8 |

FIG. 22A
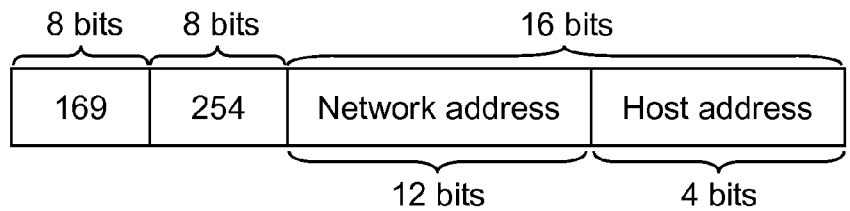
FIG. 22B
| Digit number where device identifier is different | Host address |
|---|---|
| 0 | 0 |
| 1 | 1 |
| ⋮ | ⋮ |
| 9 | 9 |
FIG. 23
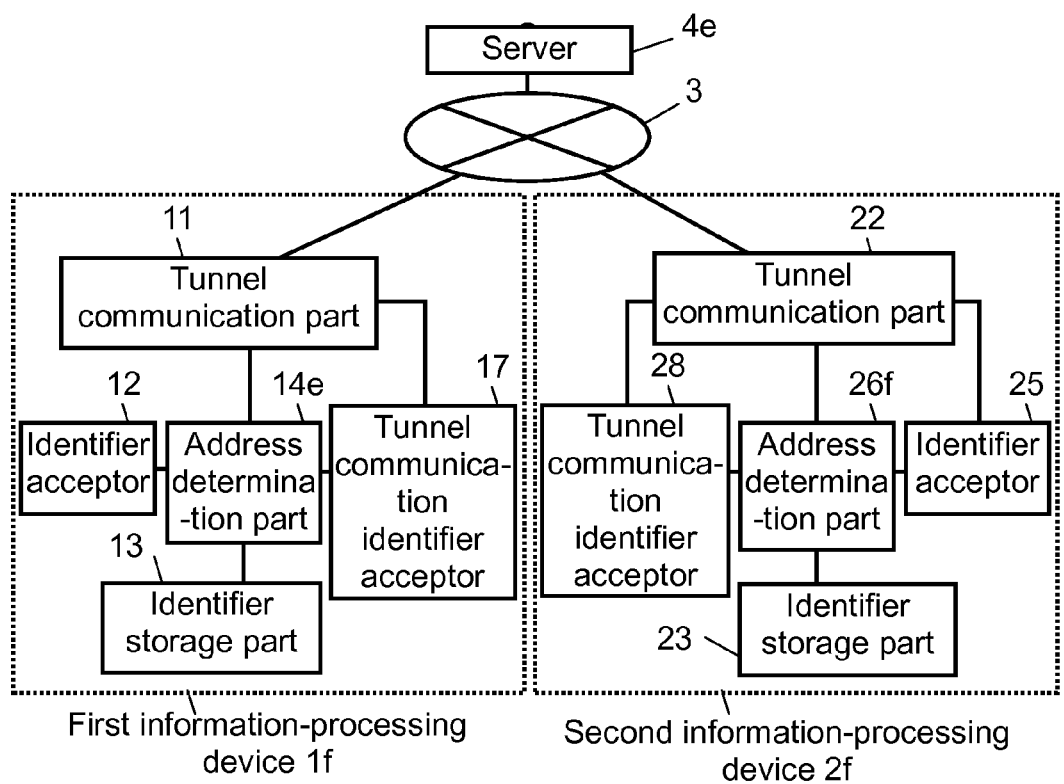

|  | Host address |
|---|---|
| Caller | 1 |
| Callee | 2 |

|  | Host address |
|---|---|
| Caller | 1 |
|  | 3 |
|  | 5 |
| Callee | 2 |
|  | 4 |
|  | 6 |

First information-processing device 1k

Third information-processing device 3k

US 7,860,980 B2

INFORMATION PROCESSING DEVICE, SERVER, COMMUNICATION SYSTEM, ADDRESS DECISION METHOD, ADDRESS MODIFICATION METHOD, AND PROGRAM

CROSS-REFERENCE TO RELATED APPLICATION

This application is a continuation of U.S. patent application Ser. No. 10/597,496 filed Jul. 27, 2006, which is a 371 of International Patent Application No. PCT/JP2005/000565 filed Jan. 19, 2005.

TECHNICAL FIELD

The present invention relates to a communication system, in particular, to one that performs tunnel communication.

BACKGROUND ART

Conventionally, tunnel communication, in which target data are encapsulated for communication, has been developed. Such technology is disclosed in Japanese Patent Laid-Open Application No. 2003-244188 (the first and other pages, and the third and other figures).

In tunnel communication, communication target data to be encapsulated also needs its IP address to be set by an information-processing device as a communication terminal. The IP address must be set so as not to overlap among each information-processing terminal. Meanwhile, methods of allocating an address include DHCP and AutoIP.

However, an address allocation method with DHCP, AutoIP or the like uses a heuristic algorithm. In AutoIP, for instance, an address range is set in advance and the following processes are repeated: an information-processing device at the client inquires at the server if a given IP address is available or not. If the address is not being used by another information-processing device, the address is used; otherwise, the device further inquires if still another address is available or not. This heuristic algorithm is complicated and has problems in that it takes a long time to determine an IP address to be used by an information-processing device at the client. Further, an IP address within a predetermined range is allocated by the client's information-processing device so as not to overlap, and thus the device is unable to allocate too many addresses to exceed a predetermined address range.

SUMMARY OF THE INVENTION

The present invention, in order to solve the above-mentioned problems, aims at providing a communication system and the like that determine an IP address to be used for communication target data encapsulated in tunnel communication, with a simple algorithm.

In order to achieve the above-mentioned objective, an information-processing device according to the present invention is an information-processing device for communication source that performs tunnel communication with a device for communication destination, where the information-processing device is equipped with: a tunnel communication part that encapsulates communication target data to perform tunnel communication; an identifier acceptor for accepting a communication destination device identifier for identifying a device at the communication destination; an identifier storage part that stores a communication source device identifier for identifying the information-processing device; and an address determination part for determining an address to be used for the communication target data, according to the communication destination device identifier and the communication source device identifier.

With such a makeup, an address to be used for communication target data in tunnel communication can be determined according to a communication destination device identifier and a communication source device identifier, with a simple algorithm. Consequently, an address does not need to be determined with DHCP or AutoIP, both using a heuristic algorithm, thus dispensing with a DHCP server and the like in a communication system.

An information-processing device according to the present invention is an information-processing device for communication source, that performs tunnel communication with a device for communication destination, where the information-processing device is equipped with: a tunnel communication part that performs the tunnel communication with communication target data encapsulated; a judgment part for judging whether the information-processing device is a caller or callee in the tunnel communication; and an address determination part for determining an address to be used for the communication target data, according to a determination by the judgment part.

With such a makeup, an address to be used for communication target data in tunnel communication can be determined with a simple algorithm, according to a determination that the information-processing device is a caller or callee. Consequently, an address does not need to be determined with DHCP or AutoIP, both using a heuristic algorithm, thus dispensing with a DHCP server and the like in a communication system.

An information-processing device according to the present invention is an information-processing device for communication source, that performs tunnel communication with a device for communication destination, where the information-processing device is equipped with: a tunnel communication part that performs the tunnel communication with communication target data encapsulated; an identifier acceptor for accepting a communication destination device identifier for identifying a device at the communication destination; an identifier storage part that stores a communication source device identifier for identifying the information-processing device; a tunnel communication identifier acceptor for accepting a tunnel communication identifier for identifying the tunnel communication; and an address determination part for determining an address to be used for the communication target data, according to the communication destination device identifier, to the communication source device identifier, and to the tunnel communication identifier.

With such a makeup, an address to be used for communication target data in tunnel communication can be determined with a simple algorithm, according to a communication destination device identifier, to a communication source device identifier, and to a tunnel communication identifier. Consequently, an address does not need to be determined with DHCP or AutoIP, both using a heuristic algorithm, thus dispensing with a DHCP server and the like in a communication system.

An information-processing device according to the present invention is an information-processing device for communication source, that performs tunnel communication with a device for communication destination, where the information-processing device is equipped with: a tunnel communication part that performs the tunnel communication with communication target data encapsulated; a judgment part for judging whether the information-processing device is a caller or callee in the tunnel communication; a tunnel communication identifier acceptor for accepting a tunnel communication identifier for identifying the tunnel communication; and an address determination part for determining an address to be used for the communication target data, according to a determination by the judgment part and the tunnel communication identifier.

With such a makeup, an address to be used for communication target data in tunnel communication can be determined with a simple algorithm, according to a determination that the information-processing device is a caller or callee, and to a tunnel communication identifier. Consequently, an address does not need to be determined with DHCP or AutoIP, both using a heuristic algorithm, thus dispensing with a DHCP server and the like in a communication system.

A server according to the present invention is equipped with: an identifier acceptor for accepting a first device identifier for identifying a first information-processing device, and a second device identifier for identifying a second information-processing device; an address determination part for determining a first address of the first information-processing device and a second address of the second information-processing device, both used for communication target data encapsulated in tunnel communication performed between the first information-processing device and the second information-processing device, according to the first device identifier and the second device identifier, both accepted by the identifier acceptor; and an address output part for outputting the first address and the second address that the address determination part has determined.

With such a makeup, an address to be used for communication target data in tunnel communication can be determined with a simple algorithm, according to a first device identifier and a second device identifier. Consequently, an address does not need to be determined with DHCP or AutoIP, both using a heuristic algorithm, thus dispensing with a DHCP server and the like in a communication system.

A server according to the present invention is equipped with: a judgment part for judging which is a caller or callee, the first information-processing device or second information-processing device in tunnel communication; an address determination part for determining a first address of the first information-processing device and a second address of the second information-processing device, both used for communication target data encapsulated in tunnel communication performed between the first information-processing device and the second information-processing device, according to a determination by the judgment part; and an address output part for outputting the first address and the second address that the address determination part has determined.

With such a makeup, an address to be used for communication target data in tunnel communication can be determined with a simple algorithm, according to a determination that the first information-processing device or second information-processing device is a caller or callee. Consequently, an address does not need to be determined with DHCP or AutoIP, both using a heuristic algorithm, thus dispensing with a DHCP server and the like in a communication system.

A server according to the present invention is equipped with: an identifier acceptor for accepting a first device identifier for identifying a first information-processing device, and a second device identifier for identifying a second information-processing device; a tunnel communication identifier acceptor for accepting a tunnel communication identifier for identifying tunnel communication performed between the first information-processing device and the second information-processing device; an address determination part for determining a first address of the first information-processing device and a second address of the second information-processing device, both used for communication target data encapsulated in tunnel communication performed between the first information-processing device and the second information-processing device, according to the first device identifier and the second device identifier, both accepted by the identifier acceptor, and a tunnel communication identifier accepted by the tunnel communication identifier acceptor; and an address output part for outputting the first address and the second address that the address determination part has determined.

With such a makeup, an address to be used for communication target data in tunnel communication can be determined with a simple algorithm, according to a first device identifier, to a second device identifier, and to a tunnel communication identifier. Consequently, an address does not need to be determined with DHCP or AutoIP, both using a heuristic algorithm, thus dispensing with a DHCP server and the like in a communication system.

A server according to the present invention is equipped with: a judgment part for judging which is a caller or callee, the first information-processing device or second information-processing device in tunnel communication; a tunnel communication identifier acceptor for accepting a tunnel communication identifier for identifying tunnel communication performed between the first information-processing device and the second information-processing device; an address determination part for determining a first address of the first information-processing device and a second address of the second information-processing device, both used for communication target data encapsulated in tunnel communication performed between the first information-processing device and the second information-processing device, according to a determination by the judgment part and a tunnel communication identifier accepted by the tunnel communication identifier acceptor; and an address output part for outputting the first address and the second address that the address determination part has determined.

With such a makeup, an address to be used for communication target data in tunnel communication can be determined with a simple algorithm, according to a determination that the first information-processing device or second information-processing device is a caller or callee, and to the tunnel communication identifier. Consequently, an address does not need to be determined with DHCP or AutoIP, both using a heuristic algorithm, thus dispensing with a DHCP server and the like in a communication system.

A server according to the present invention is equipped with: an address agreement information receiver for receiving address agreement information showing that two or more addresses are the same that are used for communication target data encapsulated in two or more tunnel communications; an address change information composition part for composing address change information that is related to address change, so as to resolve the address agreement; an address change information transmitter for transmitting the address change information.

With such a makeup, if it is detected in two or more tunnel communications that two or more addresses used for communication target data are the same, the two or more addresses can be resolved by composing and transmitting address change information.

In this way, an information-processing device and others according to the present invention allow an address used for communication target data encapsulated in tunnel communication to be determined with a simple method.

BRIEF DESCRIPTION OF THE DRAWINGS

FIG. 5A shows a data structure in the embodiment.

FIG. 5B shows a data structure in the embodiment.

FIG. 6 shows a table that is an example of correspondence between a digit number of a device in the embodiment and an IP address.

FIG. 7 shows the makeup of a first information-processing device according to embodiment 2 of the present invention.

FIG. 10 is a flowchart showing the action of a server in the $3^{rd}$ embodiment.

FIG. 11 shows an example of correspondence between a device identifier in the $3^{rd}$ embodiment and an IP address.

FIG. 12 is a block diagram showing the makeup of a first information-processing device according to embodiment 4 of the present invention.

FIG. 15A shows a table that is an example of correspondence between a caller and a callee in the $4^{th}$ embodiment, and an IP address.

FIG. 15B shows a table that is an example of correspondence between a caller and a callee in the $4^{th}$ embodiment, and an IP address.

FIG. 22A shows an example of the makeup of an address in the $7^{th}$ embodiment.

FIG. 22B shows a table that is an example of correspondence between a digit number of a device identifier in the $7^{th}$ embodiment and an IP address.

FIG. 23 shows the makeup of a communication system according to embodiment 8 of the present invention.

DETAILED DESCRIPTION OF PREFERRED EMBODIMENTS

Embodiment 1

A description is made for a communication system according to embodiment 1 of the present invention, referring to drawings.

Figure 1:
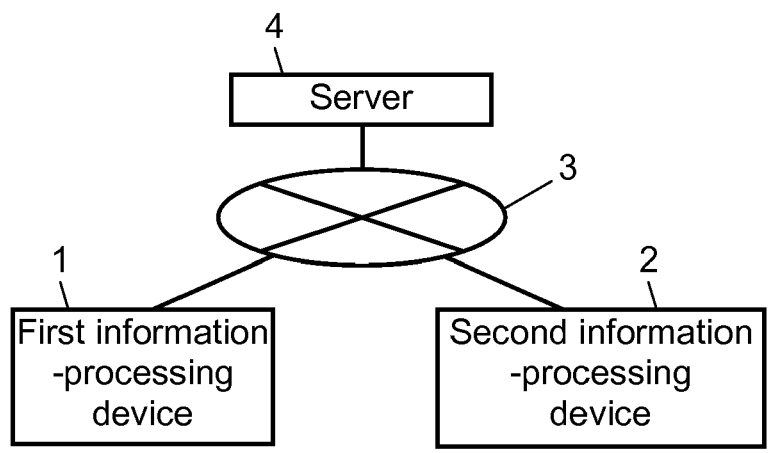
FIG. 1 shows the makeup of a communication system according to embodiment 1 of the present invention.

FIG. 1 shows the makeup of a communication system according to the embodiment. In FIG. 1, the communication system according to the embodiment is provided with: a first information-processing device 1, a second information-processing device 2, and a server 4, all connected to one another via a wired or wireless communication line 3. Communication line 3 is the Internet, for example. In this embodiment, an address used for communication target data being encapsulated in tunnel communication is to be determined by first information-processing device 1.

Figure 2:
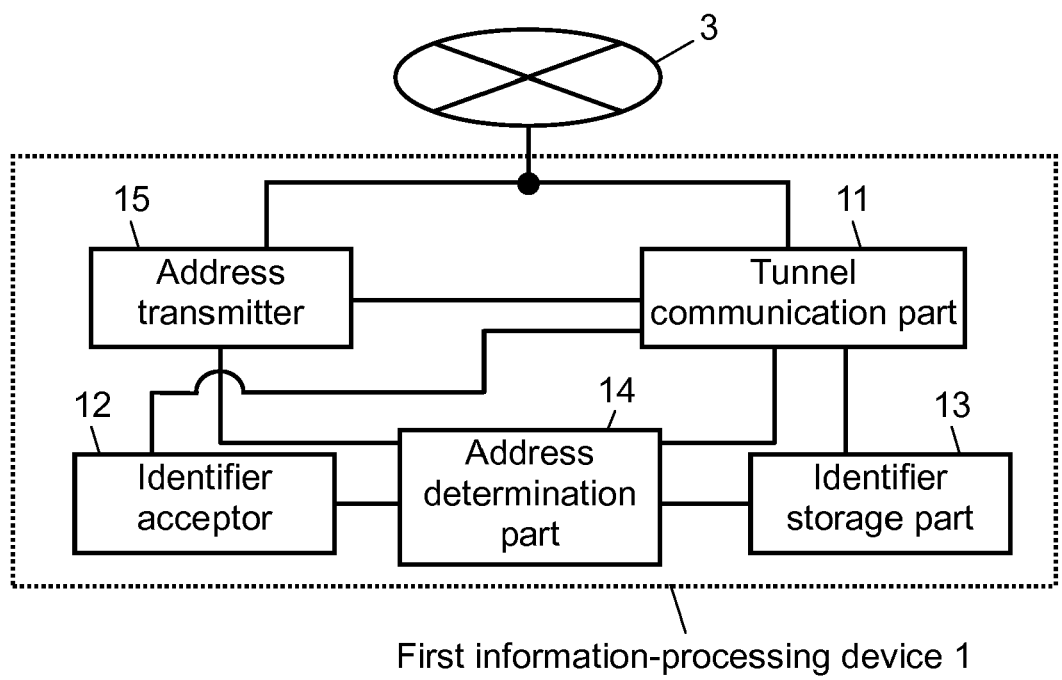
FIG. 2 is a block diagram showing the makeup of a first information-processing device according to the embodiment.

FIG. 2 is a block diagram showing the makeup of the first information-processing device 1. In FIG. 2, the first information-processing device 1 is equipped with a tunnel communication part 11, an identifier acceptor 12, an identifier storage part 13, an address determination part 14, and an address transmitter 15.

Tunnel communication part 11 performs tunnel communication between the first information-processing device 1 and the second information-processing device 2. Here, the tunnel communication refers to communication performed with encapsulated communication target data. Tunnel communication part 11 performs actions such as encapsulation of communication target data, and release of a capsule for transmitted encapsulated data. Encapsulation refers to encompassing communication target data with a header or the like prescribed by a protocol. Communication target data to be encapsulated may be optionally encrypted. Examples for tunnel communication include UDP tunnel communication, HTTP tunnel communication, and L2TP tunnel communication. Here, the tunnel communication part 11 may optionally include a communication device (e.g. modem and network card).

In this case, a communication device (not illustrated) may exist between the tunnel communication part 11 and the communication line 3, or software for passing data to the communication device may exist. Tunnel communication part 11 may be implemented with hardware, or software such as a driver for driving the communication device. Further, the tunnel communication part 11 may acquire communication target data, for example, by reading from a given recording medium (e.g. DVD and hard disk), or it may acquire communication target data by accepting data transmitted or input from a given device.

Identifier acceptor 12 accepts a communication destination device identifier for identifying a destination device for a communication destination, namely the second information-processing device 2. Here, the identifier acceptor 12 may accept a communication destination device identifier having been input from an input device (e.g. keyboard, mouse, or touch panel), it may accept a communication destination device identifier having been transmitted via a wired or wireless communication lines, or it may accept a communication destination device identifier having been read from a given recording medium (e.g. optical disc, magnetic disk, or semiconductor memory).

Identifier storage part 13 stores a communication source device identifier for identifying a source device for a communication source, namely the first information-processing device 1. Here, the identifier storage part 13 can be implemented with a given recording medium (e.g. semiconductor memory, magnetic disk, or optical disc). Storage in the identifier storage part 13 may utilize a temporary storage device such as a RAM indicated by a communication source device identifier read from an external storage device, for example, or may utilize a long-term storage device such as a ROM.

In this embodiment, the first information-processing device 1 regarded as a communication source, with the first information-processing device 1 as the reference device, and the second information-processing device 2 regarded as the communication destination. Therefore, the device identifier for identifying the first information-processing device 1 is referred to as a communication source device identifier, while the device identifier for identifying the second information-processing device 2 is referred to as a communication destination device identifier. However, the communication destination and the communication source are expediential, and thus both may be swapped if, for example, the second information-processing device 2 is the reference device. For instance, the device identifier for identifying the first information-processing device may be referred to as the communication destination device identifier.

In addition, the communication destination device identifier and communication source device identifier are different from each other, and a GUID (global unique ID) such as a MAC address or EU164-based address may be used.

Address determination part 14 determines an address (sometimes called a "virtual interface address" or a "tunnel mode address") used for communication target data encapsulated in the tunnel communication, according to the communication destination device identifier accepted by identifier acceptor 12, and to the communication source device identifier stored in the identifier storage part 13. It is sufficient if the addresses used for the destination device for communication destination (namely, the second information-processing device 2) and the device for the communication source (namely, the first information-processing device 1) are determined so that they are different each other, according to the communication destination device identifier and the communication source device identifier. Methods of determining an address include one using a given function, and one selecting from a plurality of predetermined addresses. The latter method includes one using a given table, and one that compares the communication destination device identifier with the communication source device identifier, and determining the address according to the comparison result. A concrete example of a method of determining an address is described hereinafter. In determining addresses, the addresses for a device for communication source and/or the one for communication destination may be determined. In this embodiment, a description is provided for a case where both addresses for the communication source and the communication destination are determined.

Address transmitter 15 transmits an address determined at the address determination part 14. This transmitting may be made either to the second information-processing device 2, to the server 4, or to another device administrating addresses. If the transmitting is performed to the server 4 or the like, the address may be passed from the server 4 or the like to the second information-processing device 2, directly (by transmitting, for example), or indirectly (by transmitting via another server or recording medium, for example). A target address to be transmitted may be only the address for the destination device for communication destination (namely, the second information-processing device 2), or may include one for the communication source (namely, the first information-processing device 1). Still, the address transmitter 15 may optionally include a transmission device (e.g. modem and network card). In this case, the communication device (not illustrated) may exist between the address transmitter 15 and the communication line 3, or software or the like for passing data to the communication device may exist. Address transmitter 15 may be implemented with hardware, or software such as a driver for driving the transmission device.

Figure 3:
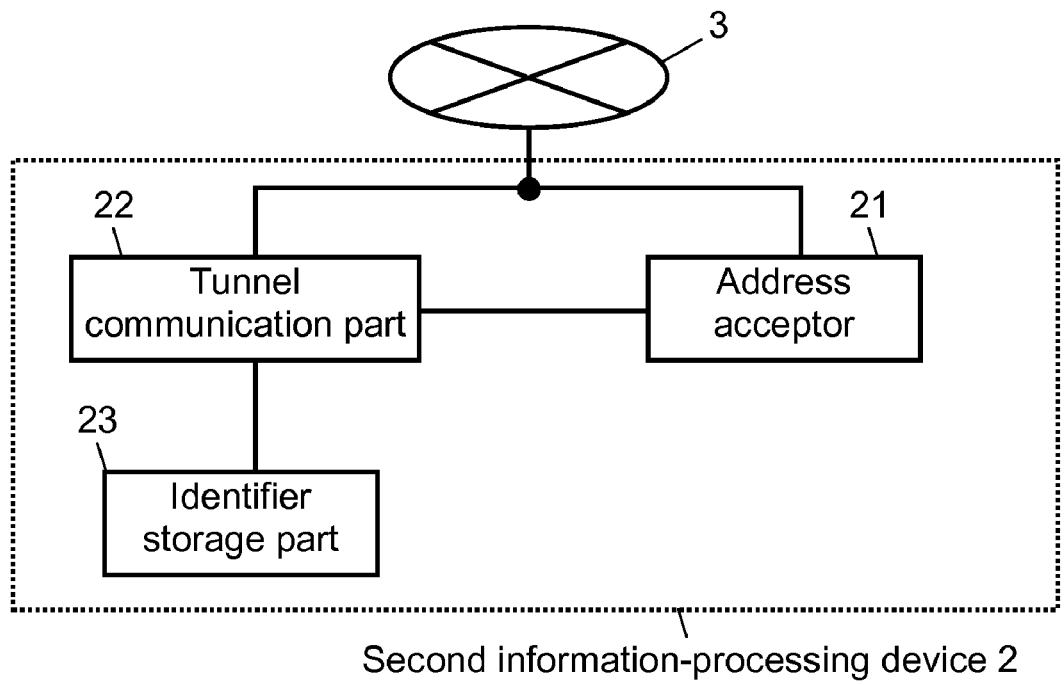
FIG. 3 is a block diagram showing the makeup of a second information-processing device according to the embodiment.

FIG. 3 is a block diagram showing the makeup of the second information-processing device 2. In FIG. 3, the second information-processing device 2 is equipped with an address acceptor 21, a tunnel communication part 22, and an identifier storage part 23. Address acceptor 21 accepts an address used for the communication target data in tunnel communication. Address acceptor 21, for example, may accept an address having been input from an input device (e.g. keyboard, mouse, or touch panel), may accept an address transmitted through wired or wireless communication lines, or may accept an address having been read from a given recording medium (e.g. optical disc, magnetic disk, or semiconductor memory). In this embodiment, the address transmitted from the first information-processing device 1 is to be accepted.

Tunnel communication part 22 performs tunnel communication with the first information-processing device 1. In the tunnel communication, an address accepted by the address acceptor 21 is used as the address used for the communication target data. The other makeup is the same as that of the tunnel communication part 11, and thus its description is omitted.

Identifier storage part 23 stores the communication destination device identifier for identifying the destination device for communication destination, namely the second information-processing device 2. Here, the identifier storage part 23 is the same as the identifier storage part 13 in the first information-processing device 1, except that it stores the communication destination device identifier instead of the communication source device identifier, and thus its description is omitted.

Server 4 performs processes related to establishing tunnel communication between the first information-processing device 1 and the second information-processing device 2. One such example is that the server 4 notifies the first information-processing device 1 of the address of the second information-processing device 2.

Figure 4:
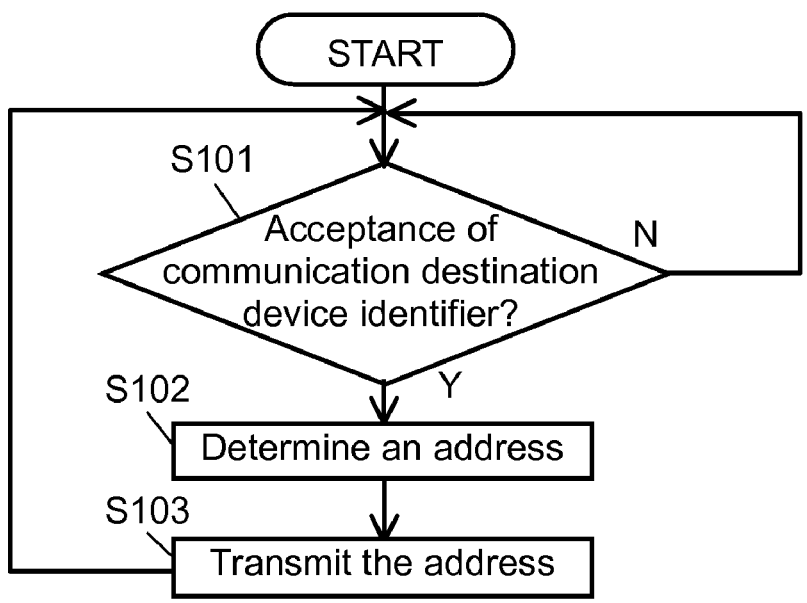
FIG. 4 is a flowchart showing the action of the first information-processing device in the embodiment.

Next, a description is made for the action of a communication system, in particular the action for determining an address by the first information-processing device 1, according to this embodiment. FIG. 4 is a flowchart showing the action for determining the address in first information-processing device 1.

(S101) Identifier acceptor 12 determines whether a communication destination device identifier has been accepted or not. If accepted, the process passes the communication destination device identifier to the address determination part 14, and then the flow goes to S102; otherwise, the action of S101 is repeated.

(S102) Address determination part 14 determines the address used for communication target data in the tunnel communication, according to the communication source device identifier stored in the identifier storage part 13, and according to the communication destination device identifier accepted by the identifier acceptor 12, and then passes the determined address to the tunnel communication part 11 and the address transmitter 15.

(S103) Address transmitter 15 transmits the address determined by the address determination part 14 to the second information-processing device 2, and then the flow returns to S101.

In the flowchart of FIG. 4, the process ends with an interruption of power off or a process end. Also, this flowchart illustrates a case where processes such as determining an address are performed when the identifier acceptor 12 accepts the communication destination device identifier. However, such timing is not limited to this case, but an address may be determined when the tunnel communication part 11 starts tunnel communication with the second information-processing device 2, using the communication destination device identifier having been accepted by that time, for example.

Next, a description is made for the action of the communication system according to this embodiment, using a concrete example. First, the makeup of the data in the tunnel communication is described using FIG. 5. FIG. 5 shows an example of communication target data before being encapsulated (FIG. 6A) and that after being encapsulated (FIG. 5B).

In FIG. 5A, the communication target data includes an IP header 101, a TCP/UDP header 102, and a payload 103. The address determined by the address determination part 14 is used as the IP address used in the IP header 101. The TCP/UDP header 102 may be a header for either TCP or UDP. Payload 103 includes the communication target data itself, namely information to be actually used by the application software in the first information-processing device 1, the second information-processing device 2, and others.

FIG. 5B shows data that is a UDP-encapsulated original packet (communication target data) shown in FIG. 5A. In FIG. 5B, the original packet is encrypted by adding an administration header (XX header 203) and a trailer (XX trailer 204) to the original packet, and is encapsulated by adding a UDP header 202 and an IP header 201. IP addresses used in the IP header 201 are those of the first information-processing device 1 and the second information-processing device 2.

Next, a description is made for processes such as acquiring an address before starting communication between the first information-processing device 1 and the second information-processing device 2. In this concrete example, the IP address of the first information-processing device 1 is to be "202.132.10.6", and then the communication source device identifier is to be "12345678". The IP address of the second information-processing device 2 is to be "131.206.10.240", and the communication destination device identifier is to be "98765432". Still, the IP address of the server 4 is to be "155.32.10.10".

Tunnel communication part 11 in the first information-processing device 1 is to retain the IP address of the server 4 in advance, and it transmits the communication source device identifier "12345678" stored in the identifier storage part 13 to the IP address "155.32.10.10" of the server 4. Then the communication source device identifier is received by the server 4. In addition, the server 4 acquires the IP address "202.132.10.6" of the first information-processing device 1 from the header of the transmitted communication source device identifier Server 4 retains the IP address "202.132.10.6" of the first information-processing device 1, and the communication source device identifier "12345678", making both correspond.

In the same way, the tunnel communication part 22 in the second information-processing device 2 transmits the communication destination device identifier "98765432" stored in the identifier storage part 23 to the server 4. Consequently, the server 4 retains the IP address "131.206.10.240" of the second information-processing device 2, and the communication destination device identifier "98765432", making both correspond.

If a user is assumed to attach a detachable recording medium with the communication destination device identifier recorded therein into a slot (not illustrated) of the first information-processing device 1, and the communication destination device identifier "98765432" recorded on the recording medium is accepted by the identifier acceptor 12 to be passed to the address determination part 14 and the tunnel communication part 11 (S101).

Tunnel communication part 11 transmits to the server 4, the communication destination device identifier "98765432" received from the identifier acceptor 12, and an instruction of transmitting the IP address of the device identified by the communication destination device identifier. Server 4 then receives them to transmit the IP address "131.206.10.240" being retained to the first information-processing device 1, corresponding to the communication destination device identifier "98765432".

Tunnel communication part 11 in the first information-processing device 1, when accepting the IP address "131.206.10.240" of the second information-processing device 2 from the server 4, retains the IP address.

Address determination part 14, when receiving the communication destination device identifier from the identifier acceptor 12, reads the communication source device identifier stored in the identifier storage part 13, and determines the IP address used for the communication target data in the tunnel communication, according to the communication destination device identifier and the communication source device identifier. Specifically, the address determination part 14 determines an address with one of the following three methods, for example (S102).

[Method of Determining an Address Using a Function]

Address determination part 14 has the function "Func (argument 1, argument 2)" for determining the address, where the communication source device identifier "12345678" is substituted for argument 1, and the communication destination device identifier "98765432" for argument 2. Consequently, the two IP addresses "192.168.0.1" and "192.168.0.2" are derived by calculation. Then, the former IP address "192.168.0.1" is determined as that for the first information-processing device 1, and the latter "192.168.0.2" for the second information-processing device 2. They are passed to the tunnel communication part 11 and the address transmitter 15.

[Method of Determining an Address Using a Table]

Address determination part 14 has the table shown by FIG. 6, which shows a correspondence between a digit number where the device identifier is different and an IP address.

Address determination part 14 determines the IP addresses corresponding to the values ("2" and "8") of the least significant digits of the communication destination device identifier "98765432" and the communication source device identifier "12345678", as the IP addresses for the first information-processing device 1 and the second information-processing device 2. In this case, the IP address for the first information-processing device 1 is "192.168.0.8", and the address for the second information-processing device 2 is "192.168.0.2". Here, if the values of the least significant digits of the communication destination device identifier and the communication source device identifier are identical (both "2", for example), determination is further made for the next digit (one digit to the left), and if they are also identical, determination is made for the further next digit. In this way, comparison is made from the least significant digit in order for the communication destination device identifier and communication source device identifier, and then the IP addresses are determined at the digit with different values, using the table of FIG. 6. The determined IP addresses for the first information-processing device 1 and the second information-processing device 2, namely "192.168.0.8" and "192.168.0.2" are passed to the tunnel communication part 11 and the address transmitter 15.

[Method of Determining an Address by Magnitude Comparison of Device Identifiers]

Address determination part 14 has the IP addresses "192.168.0.1" and "192.168.0.2", corresponding to those for the smaller and larger device identifiers, respectively. Comparison is made for the communication destination device identifier "98765432" and the communication source device identifier "12345678", and then the IP address "192.168.0.2" is allocated to the larger one, and "192.168.0.1" to the smaller. Consequently, the IP address for first information-processing device 1 is determined as "192.168.0.1", and the second information-processing device 2 as "192.168.0.2". Address determination part 14 passes these determined addresses to the tunnel communication part 11 and the address transmitter 15.

Here, the description is made for a case of magnitude comparison of device identifiers. However, an address may be determined in the following way. That is, another method of comparison is made with a given algorithm, and then selection is made from a plurality of (usually two) predetermined addresses.

One example is that the magnitude comparison is made for the least significant digit (if both values of the least significant digits are identical, a digit with different values, closest to the least significant one), and then an address is selected according to the comparison result. Another example is, if a device identifier is composed of alphabetical characters, to judge which device identifier is closer to "A" in so-called lexicographic order (in other words, the identifier is listed earlier in a dictionary).

In the above-mentioned concrete example, the description is made for three different methods of determining addresses. However, it is sufficient if the address determination part 14 determines an address according to two device identifiers, and thus another method of determining addresses may be used. For example, instead of using a table, the values of the least significant digit of the communication source device identifier and the communication destination device identifier may be substituted for a given function to calculate an IP address.

Address transmitter 15 transmits the IP address (to be "192.168.0.1") of the first information-processing device 1 and the IP address (to be "192.168.0.2") of the second information-processing device 2, both determined by the address determination part 14, to the IP address "131.206.10.240" of the second information-processing device 2, retained by the tunnel communication part 11 (S103). Consequently, these IP addresses are accepted by the address acceptor 21 in the second information-processing device 2 and passed to the tunnel communication part 22. Here, the IP addresses to be transmitted are to be identified as for the first information-processing device 1 or the second information-processing device 2, by the second information-processing device 2. One example is that a corresponding information-processing device may be predetermined according to the order of the IP addresses to be transmitted. Alternatively, information or flags for identifying an information-processing device, corresponding to the IP address, are transmitted, and a corresponding information-processing device may be predetermined according to the information or flags.

Tunnel communication part 11, when receiving the IP address "192.168.0.1" of the first information-processing device 1 and "192.168.0.2" of the second information-processing device 2, from the address determination part 14, performs the tunnel communication using these addresses. In other words, in the IP header 101, "192.168.0.1" is used as the IP address of the communication source (namely, the first information-processing device 1), and "192.168.0.2" as the communication destination (namely, the second information-processing device 2). Here, in the IP header 201 of the packet (illustrated in FIG. 5B) that is the communication target data having been encapsulated, "202.132.10.6" is used as the IP address of the communication source, and "131.206.10.240" as the communication destination. Similarly, in the IP header 101 for the second information-processing device 2, "192.168.0.1" is used as the IP address of the first information-processing device 1, and "192.168.0.2" as the second information-processing device 2. Further, in the IP header 201, "131.206.10.240" is used as the IP address of the communication destination (namely, the second information-processing device 2), and "202.132.10.6" as the communication source (namely, the first information-processing device 1). In such a way, communication is performed between the first information-processing device 1 and the second information-processing device 2.

This concrete example describes a case for UDP tunnel communication. However, tunnel communication is not limited to this type, but it may be an HTTP tunnel communication and others as mentioned above. Also, the data structure is not limited to that in FIG. 5.

As mentioned above, the communication system according to this embodiment determines addresses used for communication target data in tunnel communication, according to the communication destination device identifier and the communication source device identifier. Therefore, addresses can be determined with a deterministic algorithm, which is simpler than a heuristic algorithm. As a result, inquiries to a server and others are not required, enabling addresses to be determined in a short time. Meanwhile, an address to be used for communication target data encapsulated in the tunnel communication is different from that used in communication via the communication line 3, and thus for a different tunnel communication (namely, tunnel communication with a different set of information-processing devices for the communication source and destination), the same address can be used. This has an advantage of an unlimited number of allocation addresses, unlike in cases with DHCP or AutoIP.

In this embodiment, the description is made for a makeup where the first information-processing device 1 is equipped with the address transmitter 15. However, the first information-processing device 1 may have an address output part for outputting an address determined by the address determination part 14, instead of the address transmitter 15. Here, this output may be, for example, a display on a display device (e.g. CRT or liquid crystal display), a transmission to a given device via communication lines, a printing by a printer, a recording on a given recording medium, or a sound output by a speaker. The address output part may optionally include an output device (e.g. display device or printer). Also, the address output part may be implemented with hardware, or software such as a driver for driving such the device. The address having been output may be set in the second information-processing device 2, for example, by being recorded on a given recording medium, or by being sent to the user of second information-processing device 2 via email, facsimile, or the like Embodiment 2

A description is made for a communication system according to embodiment 2 of the present invention, referring to drawings. The communication system according to this embodiment determines an address used for communication target data in tunnel communication at the respective information-processing devices.

The communication system according to this embodiment is to be the same as that in FIG. 1, where the first information-processing device 1 is to correspond to a first information-processing device 1a, and the second information-processing device 2 to a second information-processing device 2a. FIG. 7 is a block diagram showing the makeup of the first information-processing device 1a according this embodiment. First information-processing device 1a according to this embodiment is equipped with an tunnel communication part 11, an identifier acceptor 12, the identifier storage part 13, and an address determination part 14. Here, the tunnel communication part 11, the identifier acceptor 12, the identifier storage part 13, and the address determination part 14 are the same as those in embodiment 1, and thus their descriptions are omitted.

Figure 8:
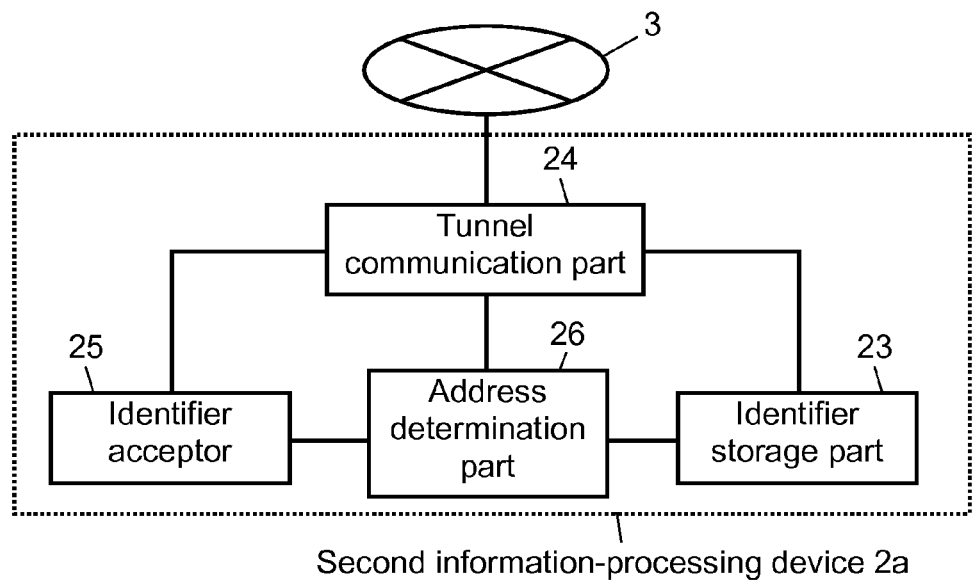
FIG. 8 shows the makeup of a second information-processing device according to the $2^{nd}$ embodiment.

FIG. 8 is a block diagram showing the makeup of the second information-processing device 2a according to this embodiment. Second information-processing device 2a according to this embodiment is equipped with an identifier storage part 23, an tunnel communication part 24, an identifier acceptor 25, and an address determination part 26. Here, the identifier storage part 23 is the same as that in embodiment 1, and thus its description is omitted. Also, the tunnel communication part 24, the identifier acceptor 25, and the address determination part 26 are the same as the tunnel communication part 11, the identifier acceptor 12, and the address determination part 14 in embodiment 1, respectively, and thus their descriptions are omitted.

In addition, the action for determining an address by the first information-processing device 1a in this embodiment is the same as that in FIG. 4 in embodiment 1, except that it does not perform the process to transmit the address at S103, and thus its description is omitted. Also, the action for determining an address by the second information-processing device 2a in this embodiment is the same as that in FIG. 4 in embodiment 1, except that it determines whether a communication source device identifier, instead of a communication destination device identifier, is accepted at S101, and it does not perform the process to transmit the address at S103, and thus its description is omitted.

Next, a description is made for the action of the communication system according to this embodiment, using a concrete example. In this concrete example, the data structure in the tunnel communication is to be the same as that shown in FIG. 5. Also, IP addresses, device identifiers, and others, of the first information-processing device 1a and others in this concrete example are to be the same as those described in embodiment 1.

First, a description is made for processes such as acquiring an address before the first information-processing device 1a and the second information-processing device 2a start communication. The following actions are the same as those of the concrete example in embodiment 1, and thus their descriptions are omitted. That is, the first information-processing device 1a and the second information-processing device 2a transmit their respective device identifiers to the server 4. Consequently, the server 4 retains the IP address "202.132.10.6" of the first information-processing device 1a, and the communication source device identifier "12345678", making both correspond; and the IP address "131.206.10.240" of the second information-processing device 2a, and the communication destination device identifier "98765432", making both correspond.

Next, the actions after a detachable recording medium with a communication device identifier recorded therein is attached into a slot (not illustrated) of the first information-processing device 1a, and before the IP address used for communication target data in tunnel communication is determined by the first information-processing device 1a, are also the same as those of the concrete example in embodiment 1, and thus their descriptions are omitted.

Here, the server 4 is assumed to transmit the IP address of the second information-processing device 2a to the first information-processing device 1a, and also transmits a communication source device identifier of the first information-processing device 1a to the second information-processing device 2a. Consequently, the communication source device identifier "12345678" is accepted by the identifier acceptor 25 through the tunnel communication part 24 of the second information-processing device 2a. Then, the identifier acceptor 25 determines that communication source device identifier has been accepted (S101) to perform an address determination process (S102). This process is performed in the same way as in the concrete example in embodiment 1, where a similar address is determined by the address determination part 14 in the first information-processing device 1a. One example is that the address of the first information-processing device 1a is determined as "192.168.0.1", and the second information-processing device 2a as "192.168.0.2".

However, when using a function to determine an address, the address determination part 26, in "Func(argument 1, argument 2)", substitutes the communication destination device identifier "98765432", which is the device identifier of the second information-processing device 2a, for argument 1; and communication source device identifier "12345678", which is the device identifier of the first information-processing device 1a, for argument 2. This function is assumed to reverse the order of the IP addresses if argument 1 and argument 2 are swapped. Consequently, two IP addresses "192.168.0.2" and "192.168.0.1" are derived, and the former IP address is determined as one for the second information-processing device 2a; the latter for the first information-processing device 1a, resulting in determining in the same way as in the address determination part 14.

The action of tunnel communication after this address determination is the same as that in the concrete example of embodiment 1, except that addresses are not transmitted, and thus its description is omitted.

As mentioned above, in the communication system according to this embodiment, the address used for communication target data in tunnel communication can be also determined by each information-processing device, according to the communication destination device identifier and the communication source device identifier. Determining the address by each information-processing device dispenses with transmitting the address.

In addition, a deterministic algorithm, where a communication destination device identifier and communication source device identifier are used, even if each information-processing device determines addresses, they can be determined without contradiction. Specifically, such situation can be avoided that the addresses of the first information-processing device 1a and the second information-processing device 2a, both determined by the first information-processing device 1a; and those of the first information-processing device 1a and the second information-processing device 2a, both determined by the second information-processing device 2a, lose their integrity.

In this embodiment, the description is made for a case where the addresses of the communication source and destination are determined by each information-processing device. However, when only the address of the first information-processing device is determined by the first information-processing device 1a, and when only the address of the second information-processing device is determined by the second information-processing device 2a, for example, they may be passed to the other party's information-processing device directly or indirectly.

Embodiment 3

A description is made for a communication system according to embodiment 3 of the present invention, referring to drawings. In the communication system according to this embodiment, an address used for communication target data in tunnel communication is determined by a server.

Figure 9:
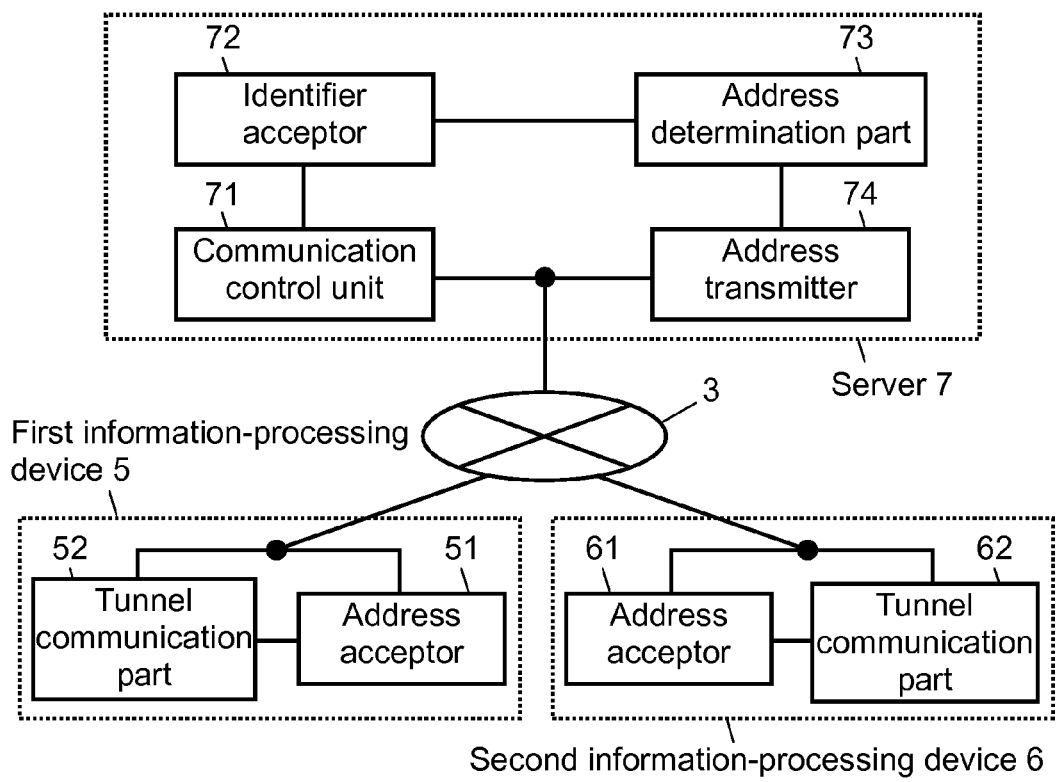
FIG. 9 shows the makeup of a communication system according to embodiment 3 of the present invention.

FIG. 9 shows the makeup of the communication system according to this embodiment. In FIG. 9, the communication system according to this embodiment is equipped with a first information-processing device 5, a second information-processing device 6, and a the server 7, all connected one another via a the communication line 3.

The first information-processing device 5 is equipped with an address acceptor 51 and a the tunnel communication part 52.

Address acceptor 51 accepts an address used for communication target data in tunnel communication performed between first the information-processing device 5 and the second information-processing device 6. Address acceptor 51 may, for example, accept an address having been input from an input device (e.g. keyboard, mouse, or touch panel), may accept an address transmitted through wired or wireless communication lines, or may accept an address read from a given recording medium (e.g. optical disc, magnetic disk, or semiconductor memory). In this embodiment, an address transmitted from the server 7 through the communication line 3 is to be accepted.

Tunnel communication part 52 performs tunnel communication between first the information-processing device 5 and the second information-processing device 6. Tunnel communication part 52 is assumed to retain a first device identifier for identifying first the information-processing device 5, and a second device identifier for identifying the second information-processing device 6. The second device identifier may be, for example, from an input of an input device, transmitted through a given communication line, or read from a given recording medium. Here, the makeup of the tunnel communication part 52 is the same as that of the tunnel communication part 11 in embodiment 1, except that the first device identifier corresponds to a communication source device identifier, and the second device identifier to the communication destination device identifier, and thus its description is omitted.

Second information-processing device 6 is equipped with an address acceptor 61 and a tunnel communication part 62. The address acceptor 61 and tunnel communication part 62 are the same as the address acceptor 51 and the tunnel communication part 52, respectively, and thus their descriptions are omitted. Here, the tunnel communication part 62 does not need to retain the first device identifier.

Server 7 performs a process to establish tunnel communication performed between first the information-processing device 5 and the second information-processing device 6, in the same way as the server 4 in embodiment 1, and also determines an address used in the tunnel communication, equipped with a communication control unit 71, an identifier acceptor 72, an address determination part 73, and an address transmitter 74.

Communication control unit 71 performs processes such as establishing tunnel communication between the first information-processing device 5 and the second information-processing device 6. More specifically, it transmits an address of the second information-processing device 6 to first the information-processing device 5, for example.

Identifier acceptor 72 accepts first device identifier and second device identifier. Identifier acceptor 72, for example, may accept the first device identifier and others having been input from an input device (e.g. keyboard, mouse, or touch panel), the first device identifier and others transmitted through wired or wireless communication lines, or the first device identifier and others read from a given recording medium (e.g. optical disc, magnetic disk, or semiconductor memory). In this embodiment, the first device identifier and others passed from the communication control unit 71 is to be accepted.

Address determination part 73 determines a first address of the first information-processing device 5 and a second address of the second information-processing device 6, according to a first device identifier and second device identifier accepted by the identifier acceptor 72. These addresses are used for communication target data in tunnel communication. The method of determining an address is the same as that by the address determination part 14 in embodiment 1, and thus its description is omitted.

Address transmitter 74 transmits a first address and second address determined by the address determination part 73, to the first information-processing device 5 and the second information-processing device 6. This transmission may be directly performed to the first information-processing device 5, or indirectly via a given server or the like.

Next, a description is made for the action of a communication system, in particular, the action for determining an address, according to this embodiment. FIG. 10 is a flowchart showing the action to determine an address by the server 7.

(S201) Identifier acceptor 72 determines whether the first device identifier and the second device identifier have been accepted. If accepted, the identifiers are passed to the address determination part 73, and then the flow goes to S202; otherwise, process S201 is repeated until they are accepted.

(S202) Address determination part 73 determines an address used for communication target data in tunnel communication, according to the first device identifier and the second device identifier received from the identifier acceptor 72. Then, the determined address is passed to the address transmitter 74.

(S203) Address transmitter 74 transmits two addressees determined by the address determination part 73, to the first information-processing device 5 and the second information-processing device 6, and then the flow returns to S101. In the flowchart of FIG. 10, the process ends with an interruption of power off or process end. Also, this flowchart illustrates a case where processes such as determining an address are performed when the identifier acceptor 72 accepts a first device identifier and others. However, such a timing is not limited to this case, but an address may be determined when the first information-processing device 5 and the second information-processing device 6 start tunnel communication, using a first device identifier and others having been accepted by that time, for example.

In addition, in the flowchart of FIG. 10, the description is made for a case where the first device identifier and the second device identifier are accepted simultaneously at S201. However, these device identifiers may be accepted simultaneously, or at different timings. However, it is after both device identifiers are accepted that the address is determined, which is the same as in the flowchart of FIG. 10.

Next, a description is made for the action of the communication system according to this embodiment, using a concrete example. In this concrete example, the data structure in tunnel communication is assumed to be the same as in FIG. 5. Further, the IP address of the first information-processing device 5 is assumed to be "202.132.10.6", and the first device identifier, "12345678". Also, the IP address of the second information-processing device 6 is assumed to be "131.206.10.240", and the second device identifier, "98765432". Still, the IP address of the server 7 is assumed to be "155.32.10.10".

Tunnel communication part 52 in the first information-processing device 5 is assumed to retain an IP address of the server 7 in advance. Then, the tunnel communication part 52 transmits the retained first device identifier "12345678" to the IP address "155.32.10.10" of the server 7. Consequently, the first device identifier is received by communication control unit 71 of the server 7. Then, the IP address "202.132.10.6" of first the first information-processing device 5 is acquired from the header of the first device identifier. Communication control unit 71 retains the IP address of the the first information-processing device 5, making it correspond with the first device identifier.

In the same way, tunnel communication part 62 in the second information-processing device 6 also transmits the second device identifier "98765432" to the server 7. Consequently, in communication control unit 71, address identifier correspondence information, which is information with a device identifier and IP address, both corresponding, is to be retained, as shown in FIG. 11.

Next, the tunnel communication part 52 of the first information-processing device 5 transmits to the server 7, a second device identifier for identifying the second information-processing device 6, and a request to perform tunnel communication with the second information-processing device 6. Consequently, the information is received by communication control unit 71. Communication control unit 71 acquires an IP address of the first information-processing device 5 from the header of a packet transmitted from the first information-processing device 5, refers to address identifier correspondence information shown in FIG. 11, and acquires the first device identifier "12345678" of the first information-processing device 5. Communication control unit 71 acquires the IP address "131.206.10.240" corresponding to the second device identifier "98765432" transmitted from the first information-processing device 5, referring to the address identifier correspondence information. Then, communication control unit 71 passes first device identifier "12345678" and second device identifier "98765432" to identifier acceptor 72, and also transmits the IP address "131.206.10.240" of the second information-processing device 6 to the first information-processing device 5.

Identifier acceptor 72, when accepting the first device identifier "12345678" and second device identifier "98765432" from communication control unit 71 (S201), passes them to address determination part 73. Address determination part 73 receives these device identifiers, determines addresses according to the device identifiers, and passes the determined addresses, making them correspond to the device identifiers, to address transmitter 74 (S202). This method of determining an address is the same as that of the concrete example in embodiment 1, and thus its description is omitted.

Address transmitter 74, when receiving from address determination part 73 a set of the device identifier "12345678" and its corresponding IP address "192.168.0.1", and a set of the device identifier "98765432" and its corresponding IP address "192.168.0.2", acquires the IP addresses of the information-processing devices corresponding to the respective IP addresses, referring to address identifier correspondence information retained in communication control unit 71. Then, address transmitter 74 transmits the two sets of the device identifiers and IP addresses to the IP address "202.132.10.6" of the first information-processing device 5 and "131.206.10.240" of the second information-processing device 6.

Address acceptor 51, when accepting these sets, passes them to the tunnel communication part 52. Tunnel communication part 52 receives the IP address of the second information-processing device 6 transmitted from communication control unit 71, and further receives a set of the IP address and device identifier accepted by the address acceptor 51. Then, the tunnel communication part 52 uses the IP address "192.168.0.1" corresponding to the first device identifier "12345678" of first the first information-processing device 5, as an IP address of the communication source (namely, the first information-processing device 5) in IP header 101, and also uses the IP address "192.168.0.2" corresponding to the second device identifier "98765432" of the second information-processing device 6, as an IP address of the communication destination (namely, the second information-processing device 6) in IP header 101. Then, the tunnel communication part 52 encapsulates the data, composes a UDP packet as shown in FIG. 5B, and transmits the packet to the second information-processing device 6 to start tunnel communication.

Address acceptor 61 in the second information-processing device 6 also accepts a set of an IP address and device identifier to pass them to tunnel communication part 62. Tunnel communication part 62 uses an IP address corresponding to the second device identifier of the second information-processing device 6, as an IP address of the second information-processing device 6 for communication target data in tunnel communication. In this way, tunnel communication is performed between the first information-processing device 5 and the second information-processing device 6.

As mentioned above, in the communication system according to this embodiment, the server 7 can determine an address used for communication target data in tunnel communication performed between the first information-processing device 5 and the second information-processing device 6, according to a communication destination device identifier and a communication source device identifier. This enables an address to be easily determined with a simple deterministic algorithm.

In this embodiment, the description is made for a case where address transmitter 74 transmits an address determined by address determination part 73. However, an address output part for outputting an address determined by address determination part 73 may be equipped instead of address transmitter 74. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the first information-processing device 5 and the second information-processing device 6, for example, by being recorded on a given recording medium, or by being sent to the user of first information-processing device 1 or second information-processing device 2 by the administrator of the server 7 via email, facsimile, or the like Further, in this embodiment, the description is made for a case where address transmitter 74 of the server 7 transmits two addressees determined by address determination part 73 to the second information-processing device 6. However, address transmitter 74 may transmit only the address "192.168.0.2" of the second information-processing device 6 to the second information-processing device 6. In this case, the second information-processing device 6 can acquire an address of the first information-processing device 5 from the header of encapsulated communication target data transmitted from the first information-processing device 5

In addition, in this embodiment, the description is made for a case where the server 7 transmits addresses of both the first information-processing device 5 and the second information-processing device 6. However, the server 7 may transmit the address "192.168.0.1" of the first information-processing device 5 to the first information-processing device 5 first; the address "192.168.0.2" of the second information-processing device 6, to the second information-processing device 6, and then the server 7 may transmit an address of the other party when an inquiry related to the address of the other party in tunnel communication is made from the information-processing device.

Embodiment 4

A description is made for a communication system according to embodiment 4 of the present invention, referring to drawings. The communication system according to this embodiment determines an address used for communication target data in tunnel communication, according to a determination that the information-processing device is a caller or callee.

The communication system according to this embodiment is assumed to be the same as that in FIG. 1. However, the first information-processing device 1 corresponds to a first information-processing device 1b, and the second information-processing device 2 to a second information-processing device 2b.

FIG. 12 is a block diagram showing the makeup of the first information-processing device 1b according to this embodiment. The first information-processing device 1b according to this embodiment is equipped with the tunnel communication part 11, the address determination part 14b, address transmitter 15, and judgment part 16. Here, the tunnel communication part 11 and address transmitter 15 are the same as those in embodiment 1, and thus their descriptions are omitted. In addition, in the first information-processing device 1b according to this embodiment, although an identifier storage part is not illustrated clearly, the device identifier of the first information-processing device 1b is assumed to be stored in an accessible recording medium in the tunnel communication part 11.

Address determination part 14b determines an address used for communication target data encapsulated in tunnel communication, according to a determination by the judgment part 16. It is sufficient if the address used in a device for communication destination (e.g. the second information-processing device 2b) and that for communication source (e.g. the first information-processing device 1b) are different each other. Methods of determining an address include one with a given function used, and one by selecting from a plurality of predetermined addresses. A concrete example of a method of determining an address is described hereinafter. In determining addresses, an address for a device for communication source and/or one for communication destination may be determined. In this embodiment, a description is made for a case where both addresses for a communication source and communication destination are determined.

Judgment part 16 determines whether the first information-processing device 1b is a caller or callee in tunnel communication. It is sufficient if the first information-processing device 1b is judged as a caller or callee. In other words, the first information-processing device 1b may be judged as a caller or callee by judging the second information-processing device 2b, which is the device at the other end, is a caller or callee. Alternatively, determination is made for both the first information-processing device 1b and the second information-processing device 2b. Here, a caller and callee may be those in communication for a protocol of tunnel (namely, a protocol encompassing communication target data) in tunnel communication, or those for communication target data (namely, target data for encapsulation). In this embodiment, the former case is described. In addition, a caller is a device that starts communication, and a callee is a device that performs communication according to a call-out from an information-processing device as a caller.

Figure 13:
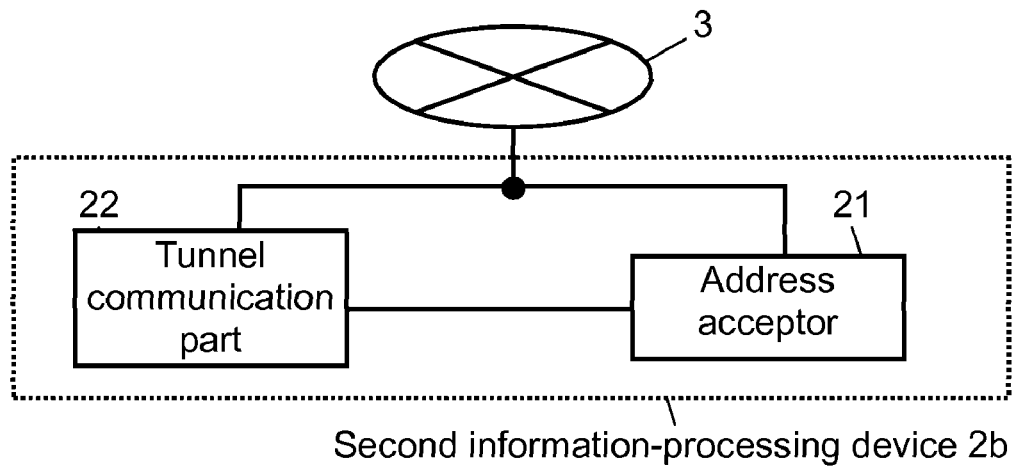
FIG. 13 is a block diagram showing the makeup of a second information-processing device according to the $4^{th}$ embodiment.

FIG. 13 is a block diagram showing the makeup of the second information-processing device 2b according to this embodiment. Second information-processing device 2b according to this embodiment is equipped with an address acceptor 21 and a tunnel communication part 22. Here, the address acceptor 21 and a the tunnel communication part 22 are the same as those in embodiment 1, and thus their descriptions are omitted. In addition, in the second information-processing device 2b according to this embodiment, although an identifier storage part is not illustrated clearly, the device identifier of the second information-processing device 2b is assumed to be stored in an accessible recording medium in the tunnel communication part 22.

Figure 14:
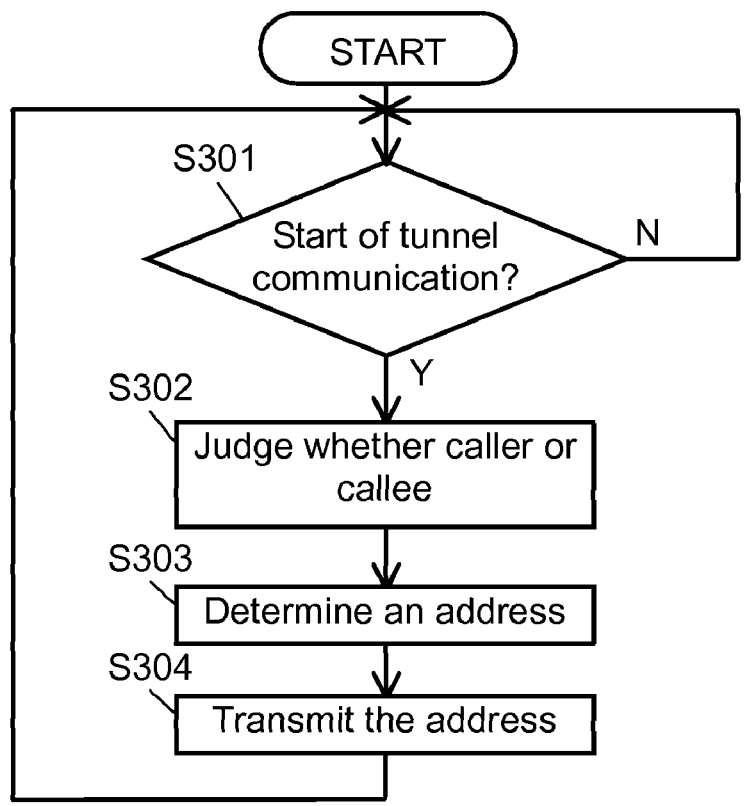
FIG. 14 is a flowchart showing the action of a first information-processing device in the $4^{th}$ embodiment.

Next, a description is made for the action of a communication system, in particular, the action for determining an address in the first information-processing device 1b, according to this embodiment. FIG. 14 is a flowchart showing the action to determine an address in the first information-processing device 1b.

(S301) Tunnel communication part 11 determines whether or not to start tunnel communication. Starting this tunnel communication includes two cases: a case where the first information-processing device 1b actively starts tunnel communication, and a case where tunnel communication starts according to a request from another device (the second information-processing device 2b, here). In either case, the tunnel communication part 11 determines that tunnel communication is to be started. If started, the flow goes to S302; otherwise, repeats process S301 until tunnel communication is started.

(S302) Judgment part 16 determines whether the first information-processing device 1b is a caller or callee.

(S303) Address determination part 14b determines an address used for communication target data in tunnel communication according to a determination by the judgment part 16, namely whether the first information-processing device 1b is a caller or callee.

(S304) Address transmitter 15 transmits an address determined by the address determination part 14b to the second information-processing device 2b. Then the flow returns to S301. Here, in the flowchart of FIG. 14, the process ends with an interruption of power off or process end. Still, this flowchart illustrates only a process for determining an address; however, it is obvious that this determined address is used for tunnel communication.

Next, a description is made for the action of the communication system according to this embodiment, using a concrete example. First, the data structure in the tunnel communication is the same as that in FIG. 5 in embodiment 1. In addition, the IP addresses and device identifiers of information-processing devices and a server are assumed to be the same as those in the concrete example in embodiment 1. Further, the processes in which the first information-processing device 1b and the second information-processing device 2b respectively register IP addresses and device identifying information to the server 4 are the same as those in embodiment 1, and thus their descriptions are omitted.

It is assumed that a detachable recording medium with a communication destination device identifier recorded therein is attached to the first information-processing device 1b, and the communication destination device identifier "98765432" stored in the recording medium is accepted by an acceptor (not illustrated) and is passed to the tunnel communication part 11.

Then, the tunnel communication part 11 determines that tunnel communication is to be started (S301), and transmits to the server 4 the received communication destination device identifier and an instruction of transmitting an IP address of a device identified by the communication destination device identifier. Consequently, the server 4 receives them, and then transmits the retained IP address "131.206.10.240", corresponding to the communication destination device identifier "98765432", to the first information-processing device 1b. Tunnel communication part 11 of the first information-processing device 1b, when accepting the IP address "131.206.10.240" of the second information-processing device 2b from the server 4, retains the IP address.

Judgment part 16 determines that the first information-processing device 1b is a caller because the tunnel communication part 11 is a caller in communication for a protocol of tunnel in tunnel communication (S302), and then passes the determination to the address determination part 14b.

Address determination part 14b, when receiving a determination from judgment part 16, determines an IP address used for communication target data in tunnel communication according to the determination. Specifically, the address determination part 14b determines an address according to, for example, any one of the following three methods (S303).

[Method of Determining an Address by a Caller and Callee]

Address determination part 14b has the table shown in FIG. 16A. The table of FIG. 15A shows correspondence between information showing a caller or callee, and IP addresses. Address determination part 14b determines an IP address of the first information-processing device 1b as "192.168.0.1" using the table of FIG. 15A, because judgment part 16 has judged that the first information-processing device 1b is a caller. Meanwhile, the address determination part 14b determines an IP address of the second information-processing device 2b as "192.168.0.2", because the second information-processing device 2b is a callee. Here, FIG. 15A shows correspondence of information showing a caller or callee with IP addresses in a tabular form. However, they may be made correspond with a means other than a tabular form.

[Method of Determining an Address by Selecting from a Plurality of Addresses]

Address determination part 14b has a table shown in FIG. 15B. The table of FIG. 15B shows correspondence between information showing a caller or callee, and IP addresses, where four IP addresses correspond to a piece of information showing a caller or callee. Therefore, the address determination part 14b is to select one IP address from the four IP addresses. This selection may be made, for example, in a random order, or in a sequential order. In this concrete example, the address determination part 14b determines an IP address of the first information-processing device 1b as "192.168.0.1" using the table of FIG. 15B, because judgment part 16 has judged that the first information-processing device 1b is a caller. Meanwhile, the address determination part 14b determines an IP address of the second information-processing device 2b as "192.168.0.2", because the second information-processing device 2b is a callee.

[Method of Determining an Address Using a Function]

Address determination part 14b has the function "Func (argument 1)" for determining an address. When calculating an address of caller, "0" is substituted for argument 1. Consequently, the IP address "192.168.0.1" is derived. This IP address "192.168.0.1" becomes an IP address of the first information-processing device 1b at the caller side. Meanwhile, when calculating an address of a callee, "1" is substituted for argument 1. Consequently, the IP address "192.168.0.2" is derived. This IP address "192.168.0.2" becomes an IP address of the second information-processing device 2b at the callee side.

Here, the description is made for three different methods of determining an address. However, it is sufficient if the address determination part 14b determines an address according to a determination that the information-processing device is caller or callee, and thus an address may be determined with a method other than these methods.

Address transmitter 15, in the same way as in the concrete example in embodiment 1, transmits the determined IP addresses "192.168.0.1" of the first information-processing device 1b and "192.168.0.2" of the second information-processing device 2b, to the second information-processing device 2b (S304). Consequently, these IP addresses are accepted by the address acceptor 21 in the second information-processing device 2b and passed to the tunnel communication part 22. Meanwhile, the tunnel communication part 11, in the same way as in the concrete example in embodiment 1, uses the determined address to perform tunnel communication, and the tunnel communication part 22 uses an address accepted by the address acceptor 21 to perform tunnel communication.

As mentioned above, the communication system according to this embodiment can determine an address used for communication target data in tunnel communication, according to whether the information-processing device is a caller or callee, which is a deterministic algorithm, simpler than a heuristic one. Consequently, this embodiment has the same advantage as embodiment 1.

In this embodiment, the description is made for a structure where the first information-processing device 1b has address transmitter 15. However, the first information-processing device 1b may have an address output part for outputting an address determined by the address determination part 14b, instead of address transmitter 15. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the second information-processing device 2b, for example, by being recorded on a given recording medium, or by being sent to the user of the second information-processing device 2b via email, facsimile, or the like Embodiment 5

A description is made for a communication system according to embodiment 5 of the present invention, referring to drawings. In the communication system according to this embodiment, each information-processing device determines an address used for communication target data in tunnel communication, according to a determination whether an information-processing device is a caller or callee.

Figure 16:
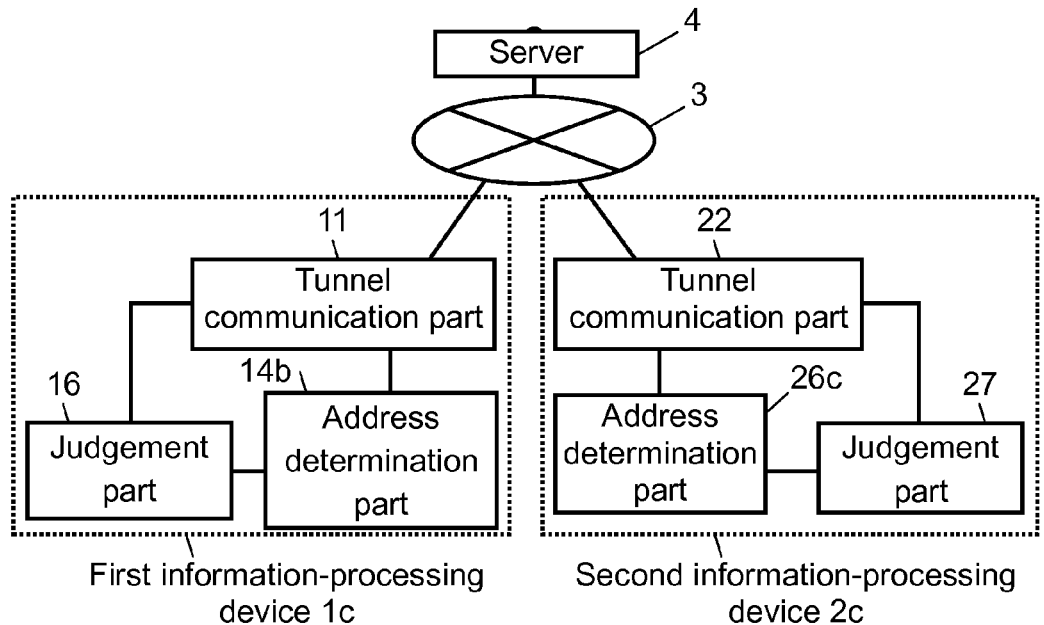
FIG. 16 shows the makeup of a communication system according to embodiment 5 of the present invention.

FIG. 16 shows the makeup of the communication system according to this embodiment. The communication system is the same as that in FIG. 1 in embodiment 1, except that it has a first information-processing device 1c instead of the first information-processing device 1, and a second information-processing device 2c instead of the second information-processing device 2 in FIG. 16, and thus their descriptions are omitted.

In FIG. 16, the first information-processing device 1c according to this embodiment is equipped with the tunnel communication part 11, the address determination part 14b, and the judgment part 16. Here, the tunnel communication part 11, the address determination part 14b, and the judgment part 16 are the same as those in embodiment 4, and thus their descriptions are omitted.

In FIG. 16, the second information-processing device 2c according to this embodiment is equipped with a tunnel communication part 22, an address determination part 26c, and a judgment part 27. Here, the tunnel communication part 22 is the same as that in embodiment 4. Further, the address determination part 26c and judgment part 27 are the same as the address determination part 14b and the judgment part 16, respectively, in embodiment 4, and thus their descriptions are omitted.

In addition, the action to determine an address in the first information-processing device 1c is the same as shown in FIG. 14 in embodiment 4 except for the process of transmitting an address at S304, and thus its description is omitted. Also, the action to determine an address in the second information-processing device 2c in this embodiment is the same as shown in FIG. 14 in embodiment 4, except that the tunnel communication part 11, the address determination part 14b, and judgment part 16 correspond to the tunnel communication part 22, the address determination part 26c, and the judgment part 27, respectively, an that they do not perform a process of transmitting an address at S304, and thus their descriptions are omitted.

Next, a description is made for the action of the communication system according to this embodiment, using a concrete example. Here, it is assumed that the first information-processing device 1c is a caller and the second information-processing device 2c is a callee. Still, the action to determine an IP address in the first information-processing device 1c is the same as that of the concrete example in embodiment 4, and thus its description is omitted.

Server 4 transmits the IP address of the second information-processing device 2c to the first information-processing device 1c, according to a request from the first information-processing device 1c, and also transmits information showing that the first information-processing device 1c is requesting tunnel communication with the second information-processing device 2c, to the second information-processing device 2c.

Tunnel communication part 22 of the second information-processing device 2c, when receiving information transmitted from its the server 4, determines that tunnel communication is to be started (S301), and judgment part 27 determines that the second information-processing device 2c is a callee (S302). Consequently, the address determination part 26c determines an address in the same way as in the concrete example in embodiment 4 (S303). Here, it is assumed that the IP address "192.168.0.2" of the second information-processing device 2c has been determined by the address determination part 26c, and that the IP address "192.168.0.1" of the first information-processing device 1c has been determined.

The action in which tunnel communication is performed after this address determination is the same as that in the concrete example in embodiment 4, except that an address is not transmitted, and thus its description is omitted.

As mentioned above, in the communication system according to this embodiment, respective information-processing devices can also determine an address used for communication target data in tunnel communication, according to a determination whether the information-processing device is a caller or callee. Each information-processing device determines its own address, thus dispensing with transmitting an address, bringing the same effect as that in embodiment 2.

In this embodiment, the description is made for a case where the addresses of a communication source and destination are determined by each information-processing device. However, if only the address of the first information-processing device 1c is determined by itself, and when only the address of the second information-processing device 2c is determined by itself, for example, they may be passed to the other party's information-processing device directly or indirectly.

Embodiment 6

A description is made for a communication system according to embodiment 6 of the present invention, referring to drawings. In the communication system according to this embodiment, an address used for communication target data in tunnel communication is determined by a server, according to a determination whether the information-processing device is a caller or callee.

Figure 17:
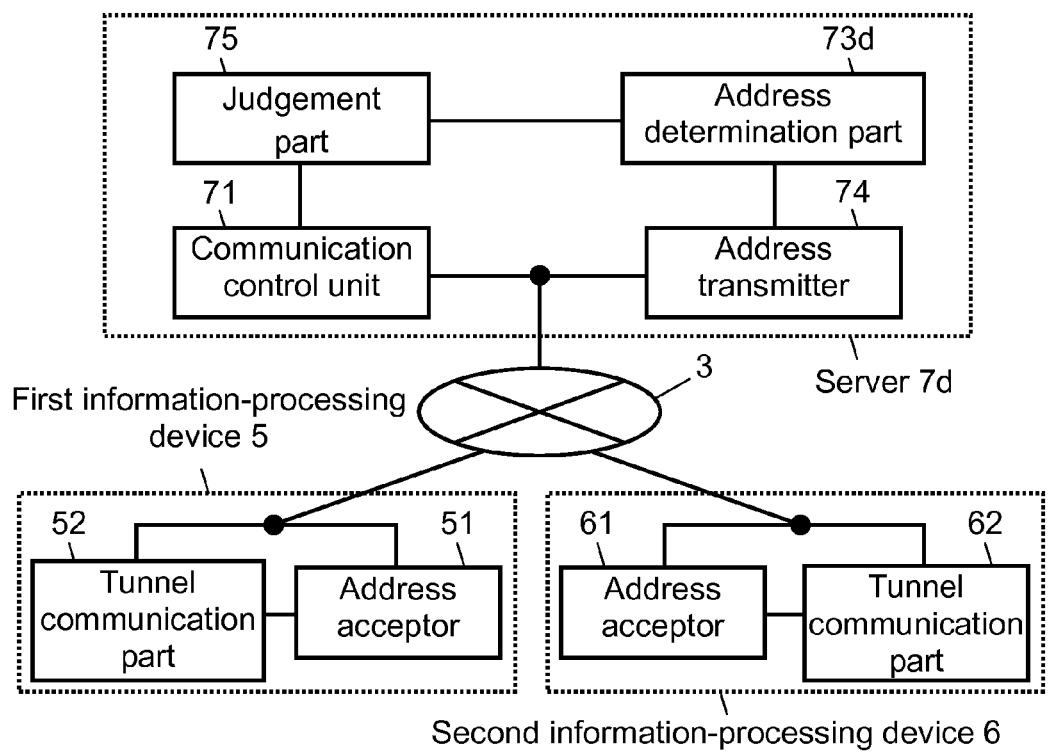
FIG. 17 shows the makeup of a communication system according to embodiment 6 of the present invention.

FIG. 17 shows the makeup of the communication system according to this embodiment. The communication system according to this embodiment is equipped with the first information-processing device 5, the second information-processing device 6, and the server 7d, all connected one another via the communication line 3. Here, the first information-processing device 5 and the second information-processing device 6 are the same as those in embodiment 3, and thus their descriptions are omitted.

Server 7d performs a process to establish tunnel communication performed between the first information-processing device 5 and the second information-processing device 6, in the same way as the server 4 in embodiment 1, and also determines an address used in the tunnel communication, equipped with a communication control unit 71, an address determination part 73d, an address transmitter 74, and a judgment part 75. Here, the communication control unit 71 and the address transmitter 74 are the same as those in embodiment 3, and thus their descriptions are omitted.

Address determination part 73d determines a first address of the first information-processing device 5 and a second address of the second information-processing device 6, both used for communication target data in tunnel communication encapsulated in tunnel communication performed between the first information-processing device 5 and the second information-processing device 6, according to a determination judged by judgment part 75. The method of determining an address is the same as that by the address determination part 14b in embodiment 4, and thus its description is omitted.

The judgment part 75 determines which is a caller or callee, tunnel communication performs the first information-processing device 5 or the second information-processing device 6. It is sufficient if the first information-processing device 5 and the second information-processing device 6 are judged as a caller or callee in this determination. In other words, the first information-processing device 5 may be judged as a caller or callee by judging whether the second information-processing device 6 is a caller or callee. Alternatively, determination may be made for both the first information-processing device 5 and the second information-processing device 6.

Figure 18:
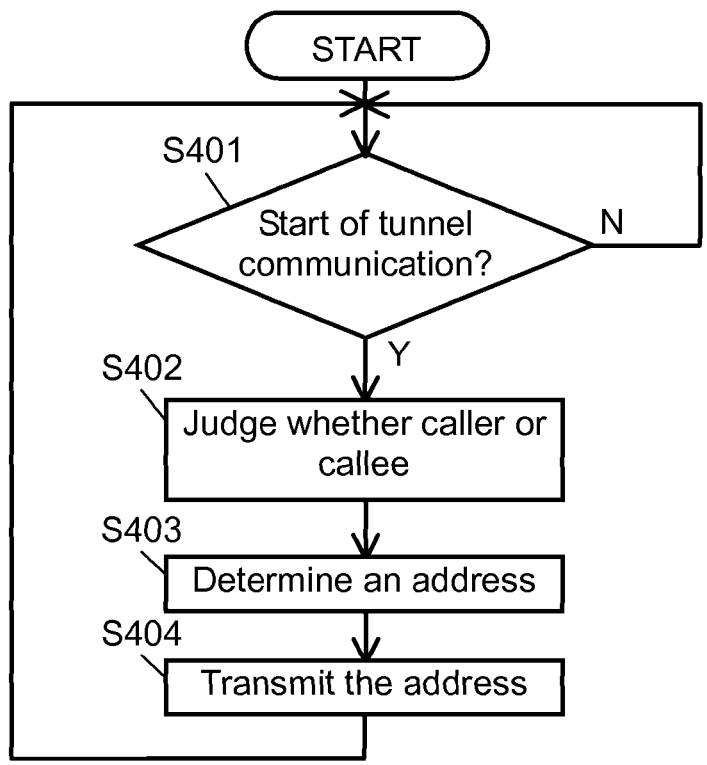
FIG. 18 is a flowchart showing the action of a server in the $6^{th}$ embodiment.

Next, a description is made for the action of a communication system, in particular, the action for determining an address, according to this embodiment. FIG. 18 is a flowchart showing the action to determine an address by the server 7d.

(S401) Communication control unit 71 determines whether tunnel communication is to be started between the first information-processing device 5 and the second information-processing device 6. If started, the flow goes to S402; otherwise, repeats process S401 until tunnel communication is started.

(S402) Judgment part 75 determines whether each of the first information-processing device 5 and second information-processing device is a caller or callee.

(S403) Address determination part 73d determines addresses of the first information-processing device 5 and the second information-processing device 6, both used for communication target data in tunnel communication, according to a determination judged by the judgment part 75.

(S404) Address transmitter 74 transmits two addresses determined by the address determination part 73d, to the first information-processing device 5 and the second information-processing device 6, and then the flow returns to S401.

In the flowchart of FIG. 18, the process ends with an interruption of power off or process end.

Next, a description is made for the action of the communication system according to this embodiment, using a concrete example. First, the data structure in tunnel communication is the same as in FIG. 5. Also, the IP addresses and device identifiers of the information-processing devices and a server are assumed to be the same as those in the concrete example in embodiment 3. Further, the processes in which the first information-processing device 5 and the second information-processing device 6 register their IP addresses and device identifying information to a server 7d are the same as in embodiment 3, respectively, and thus their descriptions are omitted.

Next, the tunnel communication part 52 of the first information-processing device 5 transmits to the server 7d, a second device identifier for identifying the second information-processing device 6, and a request to perform tunnel communication with the second information-processing device 6. Consequently, the information is received by the communication control unit 71. Communication control unit 71 determines that tunnel communication is to be started (S401), acquires an IP address of the first information-processing device 5 from the header of a packet transmitted from the first information-processing device 5, refers to the address identifier correspondence information shown in FIG. 11, and acquires the first device identifier "12345678" of the first information-processing device 5. Communication control unit 71 also acquires the IP address "131.206.10.240" corresponding to the device identifier "98765432" transmitted from the first information-processing device 5, referring to the address identifier correspondence information shown in FIG. 11. Communication control unit 71 then transmits the IP address "131.206.10.240" of the second information-processing device 6 to the first information-processing device 5.

Judgment part 75, because the communication control unit 71 has received information transmitted from the first information-processing device 5, requesting tunnel communication with the second information-processing device 6, determines that the first information-processing device 5 is a caller and the second information-processing device 6 is a callee (S402). Judgment part 75 then passes to the address determination part 73d, information showing that the information-processing device identified by the device identifier "12345678" is a caller, and "98765432" is a callee. Consequently, address determination part 73d determines an address according to the determination and passes the determined address along with its device identifier to the address transmitter 74 (S403). Here, this method of determining an address is the same as that in the concrete example in embodiment 4, and thus its description is omitted.

Address transmitter 74, when receiving from the address determination part 73d a set of the device identifier "12345678" and its corresponding IP address "192.168.0.1", and a set of the device identifier "98765432" and its corresponding IP address "192.168.0.2", acquires the IP addresses of the information-processing devices corresponding to the respective device identifiers, referring to address identifier correspondence information retained in the communication control unit 71. Then, the address transmitter 74 transmits the two sets of the device identifiers and IP addresses to the IP address "202.132.10.6" of the first information-processing device 5 and "131.206.10.240" of the second information-processing device 6 (S404). The processes hereafter are the same as those in the concrete example in embodiment 3, and thus their descriptions are omitted.

As mentioned above, in the communication system according to this embodiment, the server 7d can determine an address used for communication target data in tunnel communication performed between the first information-processing device 5 and the second information-processing device 6, according to a determination whether information-processing device is a caller or callee. This enables an address to be easily determined with a simple deterministic algorithm.

In this embodiment, the description is made for a case where the address transmitter 74 transmits an address determined by the address determination part 73d. However, an address output part for outputting an address determined by the address determination part 73d may be equipped instead of the address transmitter 74. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the first information-processing device 5 or the second information-processing device 6, for example, by being recorded on a given recording medium, or alternatively by being sent to the user of the second information-processing device 6 by the administrator of the server 7 via email, facsimile, or others.

In this embodiment, the description is made for a case where the address transmitter 74 of the server 7d transmits to the second information-processing device 6, two addresses determined by the address determination part 73d. However, the server 7d may first transmit the address "192.168.0.1" of the first information-processing device 5 to the first information-processing device 5, and "192.168.0.2" of the second information-processing device 6 to the second information-processing device 6, and then transmit the address of the other party, when an inquiry related to the address of the other party in tunnel communication is made from an information-processing device.

Embodiment 7

A description is made for a communication system according to embodiment 7 of the present invention, referring to drawings. The communication system according to this embodiment determines an address used for communication target data in tunnel communication, according to the device identifier of an information-processing device and a tunnel communication identifier for identifying tunnel communication.

The communication system according to this embodiment is assumed to be the same as that in FIG. 1, where the first information-processing device 1 is assumed to correspond to the first information-processing device 1e, and the server 4 to correspond to the server 4e. In addition, the second information-processing device 2 is assumed to correspond to the second information-processing device 2b in embodiment 4.

Figure 19:
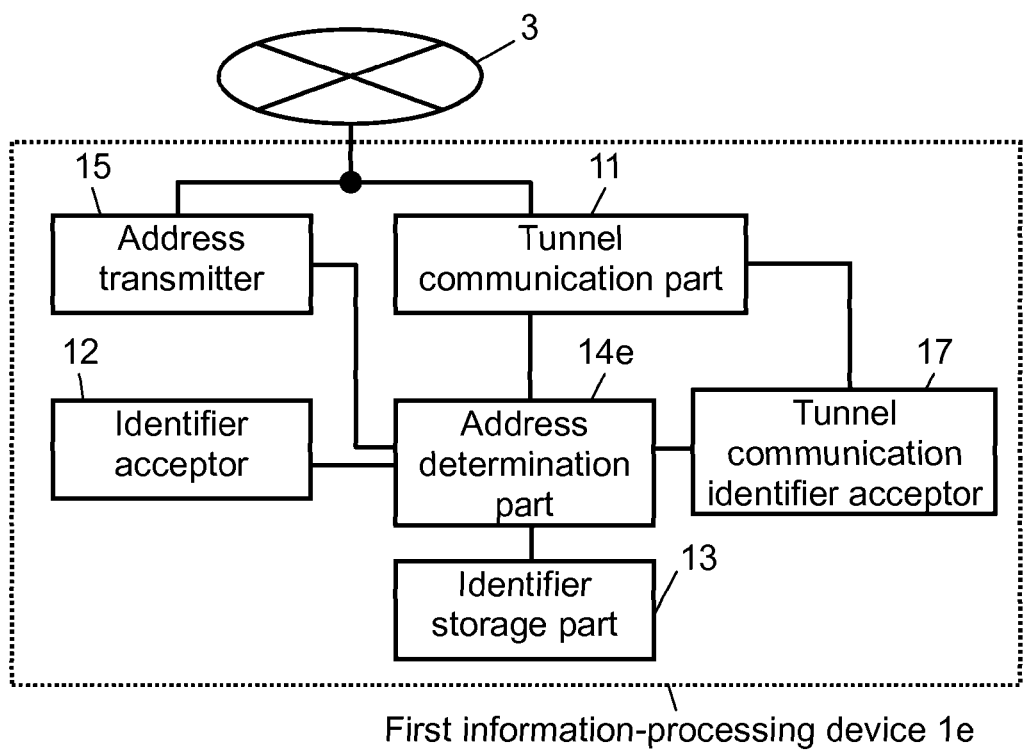
FIG. 19 is a block diagram showing the makeup of a first information-processing device according to embodiment 7 of the present invention.

FIG. 19 is a block diagram showing the makeup of the first information-processing device 1e according to this embodiment. The first information-processing device 1e according to this embodiment is equipped with the tunnel communication part 11, the identifier acceptor 12, the identifier storage part 13, the address determination part 14e, the address transmitter 15, and the tunnel communication identifier acceptor 17. Here, the tunnel communication part 11, the identifier acceptor 12, the identifier storage part 13, the address transmitter 15 are the same as those in embodiment 1, and thus their descriptions are omitted.

Address determination part 14e determines an address used for communication target data encapsulated in tunnel communication, according to a communication destination device identifier accepted by the identifier acceptor 12, a communication source device identifier stored in the identifier storage part 13, and a tunnel communication identifier accepted by the tunnel communication identifier acceptor 17. Here, the tunnel communication identifier refers to an identifier for identifying tunnel communication performed between information-processing devices. It is sufficient if the address used in a device for communication destination (i.e. the second information-processing device 2b) and that for communication source (i.e. the first information-processing device 1e) are different each other in this address determination. Methods of determining an address include one with a given function used, and one by selecting from a plurality of predetermined addresses. In addition, the address determination part 14e may determine a part of an address used for communication target data, according to a communication destination device identifier and communication source device identifier; the other part of the address used for the communication target data, according to a tunnel communication identifier. A concrete example of a method of determining an address is described hereinafter. In determining addresses, an address for a device for communication source and/or one for communication destination may be determined. In this embodiment, a description is made for a case where both addresses for a communication source and communication destination are determined.

Tunnel communication identifier acceptor 17 accepts a tunnel communication identifier. Tunnel communication identifier acceptor 17 may, for example, receive a tunnel communication identifier transmitted (from the server 4e, for example) via wired or wireless communication lines, may accept a tunnel communication identifier having been input to the first information-processing device 1e through a given input device (e.g. keyboard, mouse, or touch panel), may accept a tunnel communication identifier read from a given recording medium (e.g. optical disc, magnetic disk, or semiconductor memory), or may accept a tunnel communication identifier generated by the first information-processing device 1e. In this embodiment, a description is made for a case where accepting a tunnel communication identifier transmitted from the server 4e. Here, the tunnel communication identifier acceptor 17 may optionally include a device for accepting (e.g. modem or network card). Also, the tunnel communication identifier acceptor 17 may be implemented by means of hardware, or software such as a driver for driving a given device.

Figure 20:
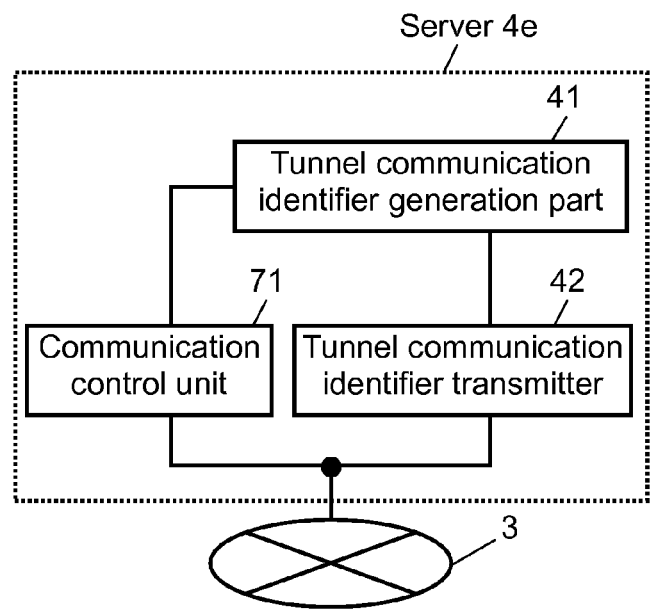
FIG. 20 is a block diagram showing the makeup of a server according to the $7^{th}$ embodiment.

FIG. 20 is a block diagram showing the makeup of the server 4e according to this embodiment. Server 4e is equipped with a tunnel communication identifier generation part 41, a tunnel communication identifier transmitter 42, and a communication control unit 71. Here, the communication control unit 71 is the same as that in embodiment 3, and thus its description is omitted.

Tunnel communication identifier generation part 41 generates a tunnel communication identifier. If this tunnel communication identifier can identify tunnel communication performed among a plurality of information-processing devices, that is sufficient. Therefore, a tunnel communication identifier may be a GUID (Globally Unique Identifier), for example, or may be reused for other tunnel communication after the current one ends. Tunnel communication identifier generation part 41 may generate a tunnel communication identifier by means of calculation or the like using a given function or the like, or by means of selecting from a table including a plurality of tunnel communication identifiers. However, as long as a tunnel communication identifier capable of identifying tunnel communication can be determined, whatever method may be used.

Tunnel communication identifier transmitter 42 transmits a tunnel communication identifier generated by the tunnel communication identifier generation part 41, to an information-processing device performing tunnel communication identified by the tunnel communication identifier. Here, the tunnel communication identifier transmitter 42, for example, may transmit a tunnel communication identifier to only devices that determine an address, or to all devices that perform tunnel communication. In this embodiment, a description is made for a case where a tunnel communication identifier is transmitted to only devices that determine an address. In addition, the tunnel communication identifier transmitter 42 may optionally include a transmission device for transmitting (e.g. modem or network card). In this case, a transmission device (not illustrated) is to exist between the tunnel communication identifier transmitter 42 and the communication line 3. Also, the tunnel communication identifier transmitter 42 may be implemented by means of hardware, or software such as a driver for driving such a given device.

Figure 21:
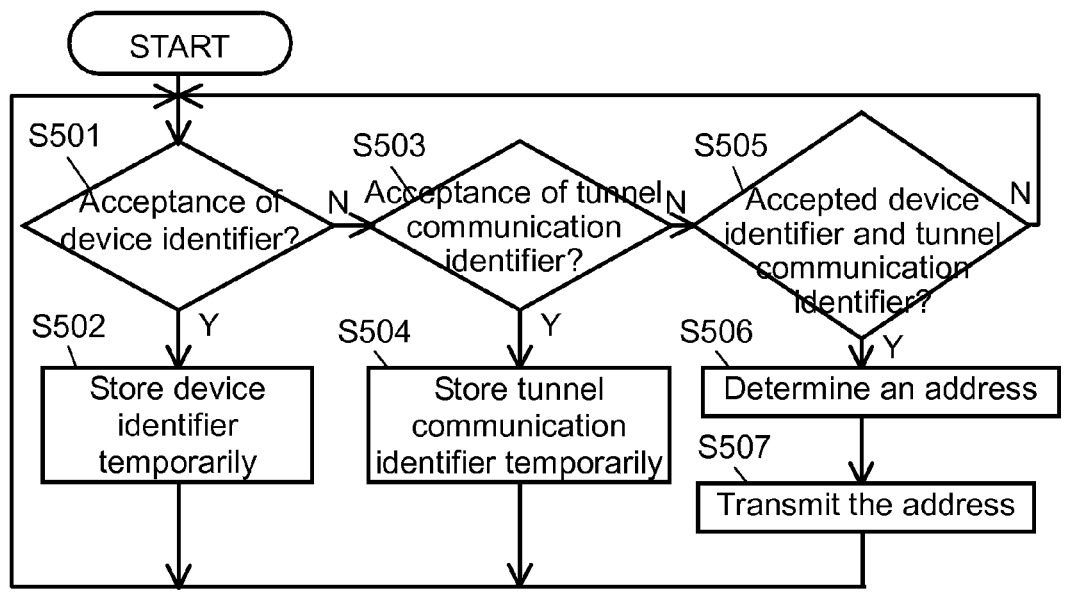
FIG. 21 is a flowchart showing the action of a first information-processing device in the $7^{th}$ embodiment.

Next, a description is made for the action of a communication system, in particular, the action in which an address is determined by the first information-processing device 1e, according to this embodiment. FIG. 21 is a flowchart showing the action in which an address is determined by the first information-processing device 1e.

(S501) Identifier acceptor 12 determines whether a communication destination device identifier has been accepted. If accepted, the flow goes to S502; otherwise, to S503.

(S502) Address determination part 14e temporarily stores a communication destination device identifier (not illustrated) accepted by the identifier acceptor 12 in a recording medium, and then the flow returns to S501.

(S503) Tunnel communication identifier acceptor 17 determines whether a tunnel communication identifier has been accepted. If accepted, the flow goes to S504; otherwise, to S505.

(S504) Address determination part 14e temporarily stores a tunnel communication identifier (not illustrated) accepted by the tunnel communication identifier acceptor 17 in a recording medium, and then the flow returns to S501.

(S505) Address determination part 14e determines whether the communication destination device identifier and tunnel communication identifier have been accepted. This judgment is made, for example, by whether the communication destination device identifier and tunnel communication identifier are stored in a recording medium (not illustrated) included in the address determination part 14e. If accepted, the flow goes to S506; otherwise, returns to S501.

(S506) Address determination part 14e determines an address using a communication destination device identifier and a tunnel communication identifier, temporarily stored in a recording medium (not illustrated), and a communication source device identifier stored in the identifier storage part 13. This method of determining an address is described hereinafter.

(S507) Address transmitter 15 transmits an address determined by the address determination part 14e to the second information-processing device 2b, and the flow returns to S501.

In the flowchart of FIG. 21, the process ends with an interruption of power off or process end. In addition, this flowchart illustrates a case where actions such as an address determination are performed when judged that communication destination device identifier and tunnel communication identifier have been accepted. However, such timing is not limited to this case, but actions such as an address determination may be performed, for example, when the tunnel communication identifier acceptor 17 accepts a tunnel communication identifier. In addition, if a communication destination device identifier has not been accepted when a tunnel communication identifier is accepted, a request may be made for transmission and input of a communication destination device identifier, for example. Further, this flowchart illustrates a case where the accepted communication destination device identifier and tunnel communication identifier are temporarily stored in a recording medium (not illustrated) included in the address determination part 14e. However, the accepted communication destination identifier and others may be temporarily stored in another recording medium. Still, this flowchart illustrates only a process for determining an address; however, it is obvious that this determined address is used for tunnel communication.

Next, a description is made for the action of the communication system according to this embodiment, using a concrete example. First, the data structure in tunnel communication is the same as that in FIG. 5 in embodiment 1. Also, the IP addresses and device identifiers of an information-processing device and a server are assumed to be the same as those in the concrete example in embodiment 1. Further, the processes in which the first information-processing device 1e and the second information-processing device 2b respectively register IP addresses and device identifying information to the server 4e are the same as those in embodiment 1, and thus their descriptions are omitted.

When a detachable recording medium with a communication destination device identifier recorded therein is attached to the first information-processing device 1e, it is assumed that the communication destination device identifier "98765432" stored in the recording medium has been accepted by the identifier acceptor 12, and is passed to the tunnel communication part 11 and the address determination part 14e (S501). Address determination part 14e temporarily stores the communication destination device identifier in a memory (not illustrated) (S502).

Tunnel communication part 11, when receiving the communication destination device identifier "98765432" from the identifier acceptor 12, determines that tunnel communication is to be started, and transmits to the server 4e, the received communication destination device identifier and an instruction of transmitting an IP address of a device identified by the communication destination device identifier. Consequently, the server 4e receives them and transmits the retained IP address "131.206.10.240" corresponding to the communication destination device identifier "98765432" to the first information-processing device 1e. Tunnel communication part 11 of the first information-processing device 1e, when accepting the IP address "131.206.10.240" of the second information-processing device 2b from the server 4e, retains the IP address.

In addition, the server 4e determines that tunnel communication is to be started between the first information-processing device 1e and the second information-processing device 2b. Then, tunnel communication identifier generation part 41 generates a tunnel communication identifier "111222333" for determining tunnel communication performed between the first information-processing device 1e and the second information-processing device 2b. Tunnel communication identifier transmitter 42 transmits the tunnel communication identifier to the first information-processing device 1e that is a caller, and that determines an address. The address of the first information-processing device 1e is one acquired from the header of a packet including a communication destination device identifier transmitted from the first information-processing device 1e. The transmitted tunnel communication identifier "111222333" is accepted by the tunnel communication identifier acceptor 17 of the first information-processing device 1e (S503). The tunnel communication identifier is passed to the address determination part 14e. Address determination part 14e temporarily stores in a memory (not illustrated) a tunnel communication identifier accepted from the tunnel communication identifier acceptor 17 (S504).

After that, the address determination part 14e determines that communication destination device identifier and tunnel communication identifier have been accepted (S505), and determines an IP address used for communication target data in tunnel communication, according to the communication destination device identifier "98765432" and the tunnel communication identifier "111222333", temporarily stored in a memory (not illustrated) included in the address determination part 14e, and the communication source device identifier "12345678" read from the identifier storage part 13. Specifically, the address determination part 14e determines an address with one of the following three methods, for example (S506).

[Method of Determining an Address Using a Table]

The address determined by the address determination part 14e has a structure shown in FIG. 22A. That is, the first eight bits show "169", and next eight bits, "254". The first 12 bits of the further next 16 bits indicate a network address, which uses a remainder after dividing a tunnel communication identifier by "4,096". The last four bits show a host address, which is determined using the table of FIG. 22B. The table of FIG. 22B shows correspondence between a digit number where the device identifier is different and its host address. Address determination part 14e determines a host address corresponding to the values ("2" and "8") of the least significant digits of the communication destination device identifier "98765432" and communication source device identifier "12345678", using the table of FIG. 22B. Consequently, the host address of the first information-processing device 1e is "8", and that of the second information-processing device 2b is "2". The remainder "3645", after dividing the tunnel communication identifier "111222333" by "4,096", is a network address common to the first information-processing device 1e and the second information-processing device 2b. Therefore, the address determination part 14e determines the IP address of the first information-processing device 1e as "169.254.227.216". ("111000111101", which is binary notation for "3645", and "1000", which is binary notation for "8", are divided into eight bits each, "11100011" and "11011000". They are "227" and "216", respectively in decimal notation.) In the same way, the address determination part 14e determines the IP address of the second information-processing device 2b as "169.254.227.210". Then, the address determination part 14e passes these addresses to the tunnel communication part 11 and the address transmitter 15. Here, if the addresses are determined in this way, "255.255.255.248" is used as a subnet mask in each information-processing device. As in this way where an address is determined using a table, the address determination part 14e may determine a part of the address according to a communication destination device identifier and communication source device identifier, and may determine the other part of the address according to a tunnel communication identifier.

[Method of Determining an Address Using a Function]

Address determination part 14e has the function "Func (argument 1, argument 2, argument 3)" for determining an address. The communication source device identifier "12345678" is substituted for argument 1, the communication destination device identifier "98765432" for argument 2, and the tunnel communication identifier "111222333" for argument 3. Consequently, the two addresses "192.168.0.1" and "192.168.0.2" are derived. Then, the former IP address is determined as that of the first information-processing device 1e, and the latter as the second information-processing device 2b. Next, the address determination part 14e passes these addresses to the tunnel communication part 11 and the address transmitter 15.

[Method of Determining an Address according to Magnitude Comparison Between Device Identifiers]

In this method also, an address determined by the address determination part 14e is assumed to have the structure shown in FIG. 22A. In addition, the method of determining a network address according to a tunnel communication identifier is assumed to be the same as "a method of determining an address using a table" aforementioned. Address determination part 14e is to allocate "2" to the host address of the information-processing device with the larger device identifier; "1", to the smaller. Therefore, the host address of the first information-processing device 1e is to be "1" because the device identifier "12345678" of the first information-processing device 1e is smaller than the device identifier "98765432" of the second information-processing device 2b. Consequently, the address determination part 14e determines the IP address of the first information-processing device 1e as "169.254.227.209". Also, the address determination part 14e determines the IP address of the second information-processing device 2b as "169.254.227.210". Then the address determination part 14e passes these addresses to the tunnel communication part 11 and the address transmitter 15. Also in this case, "255.255.255.248" is to be used as a subnet mask in each information-processing device.

Hereinbefore, three different methods of determining an address are described. However, it is sufficient if the address determination part 14e determines an address according to a communication source device identifier, communication destination device identifier, and tunnel communication identifier, and thus an address may be determined with a method of determining an address other than these.

Address transmitter 15, in the same way as in the concrete example in embodiment 1, transmits the determined IP addresses of the first information-processing device 1e and the second information-processing device 2b, to the second information-processing device 2*b* (S507). Consequently, these IP addresses are accepted by the address acceptor 21 in the second information-processing device 2*b* and passed to the tunnel communication part 22. Further, the tunnel communication part 11, in the same way as in the concrete example in embodiment 1, performs tunnel communication using the determined address, and so does the tunnel communication part 22 using the address accepted by the address acceptor 21.

As mentioned above, the communication system according to this embodiment can determine an address used for communication target data in tunnel communication, according to the device identifier of an information-processing device performing tunnel communication, and a tunnel communication identifier for identifying tunnel communication, which is a deterministic algorithm, simpler than a heuristic one. Consequently, this embodiment has the same advantage as embodiment 1.

In this embodiment, the description is made for a structure where the first information-processing device 1*e* has the address transmitter 15. However, the first information-processing device 1*e* may have an address output part for outputting an address determined by the address determination part 14*e*, instead of the address transmitter 15. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the second information-processing device 2*b*, for example, by being recorded on a given recording medium, or by being sent to the user of the second information-processing device 2*b* via email, facsimile, or the like In this embodiment, a tunnel communication identifier generated by the server 4*e* is transmitted only to the first information-processing device 1*e*. However, the tunnel communication identifier may be transmitted to the second information-processing device 2*b* as well as to the first information-processing device 1*e*.

Embodiment 8

A description is made for a communication system according to embodiment 8 of the present invention, referring to drawings. In the communication system according to this embodiment, respective information-processing devices determine an address used for communication target data in tunnel communication, according to a device identifier of each information-processing device and a tunnel communication identifier.

FIG. 23 shows the makeup of the communication system according to this embodiment. The communication system according to this embodiment is equipped with the first information-processing device 1*f*, the second information-processing device 2*f*, and the server 4*e*. Server 4*e* is the same as that in embodiment 7, and thus its descriptions is omitted. However in this embodiment, the server 4*e* is assumed to transmit the generated tunnel communication identifier to both the first information-processing device 1*f* and the second information-processing device 2*f*, because addresses are determined by the first information-processing device 1*f* and the second information-processing device 2*f*.

The first information-processing device 1*f* is equipped with the tunnel communication part 11, the identifier acceptor 12, the identifier storage part 13, the address determination part 14*e*, and the tunnel communication identifier acceptor 17. Here, the tunnel communication part 11, the identifier acceptor 12, the identifier storage part 13, the address determination part 14*e*, and the tunnel communication identifier acceptor 17 are the same as those in embodiment 7, and thus their descriptions are omitted.

Second information-processing device 2*f* is equipped with the tunnel communication part 22, the identifier storage part 23, the identifier acceptor 25, the address determination part 26*f*, and the tunnel communication identifier acceptor 28. Here, the tunnel communication part 22 is the same as that in embodiment 4; the identifier storage part 23 and the identifier acceptor 25 are the same as those in embodiment 2; and the address determination part 26*f* and the tunnel communication identifier acceptor 28 are the same as the address determination part 14*e* and the tunnel communication identifier acceptor 17 in embodiment 7, respectively, and thus their descriptions are omitted.

In addition, the action to determine an address in the first information-processing device 1*f* is the same as shown in FIG. 21 in embodiment 7, except that the address transmission process at S507 is not performed, and thus its description is omitted. Also, the action to determine an address in the second information-processing device 2*f* is the same as shown in FIG. 21 in embodiment 7, except that the tunnel communication part 11, the identifier acceptor 12, the identifier storage part 13, the address determination part 14*e*, and the tunnel communication identifier acceptor 17 correspond to the tunnel communication part 22, the identifier acceptor 25, the identifier storage part 23, the address determination part 26*f*, and the tunnel communication identifier acceptor 28, respectively, and that the address transmission process at S507 is not performed, and thus their descriptions are omitted.

Next, a description is made for the action of the communication system according to this embodiment, using a concrete example. Here, the action in which an IP address is determined in the first information-processing device 1*f* is the same as that in the concrete example in embodiment 7, and thus its description is omitted. Still, as aforementioned, a tunnel communication identifier is assumed to be transmitted to the second information-processing device 2*f* as well as to the first information-processing device 1*f*.

Server 4*e* transmits the IP address of the second information-processing device 2*f* to the first information-processing device 1*f*, according to a request from the first information-processing device 1*f*, while transmitting a device identifier of the first information-processing device 1*f* and information showing that the first information-processing device 1*f* is requesting tunnel communication with the second information-processing device 2*f*, to the second information-processing device 2*f*. In addition, the server 4*e* generates a tunnel communication identifier and transmits it to the first information-processing device 1*f* and the second information-processing device 2*f*.

Identifier acceptor 25 of the second information-processing device 2*f* accepts a device identifier of the first information-processing device if transmitted from the server 4*e* through the tunnel communication part 22 (S501). The device identifier is temporarily stored in a memory (not illustrated) in the address determination part 26*f* (S502). Further, the tunnel communication identifier acceptor 28 of the second information-processing device 2*f* accepts through the tunnel communication part 22, a tunnel communication identifier transmitted from the server 4*e* (S503). The tunnel communication identifier is temporarily stored in a memory (not illustrated) of the address determination part 26f (S504). After that, the address determination part 26f determines that a device identifier and tunnel communication identifier have been accepted (S505), and the IP addresses of the first information-processing device 1f and the second information-processing device 2f are determined, according to a device identifier and a tunnel communication identifier, stored in a memory (not illustrated) of the address determination part 26f; and a device identifier of the second information-processing device 2f, read from the identifier storage part 23. These processes are the same as those in embodiment 7, and thus their descriptions are omitted.

However, if an address is determined using a function, as described in the concrete example in embodiment 2, the device identifier of the second information-processing device 2f is to be substituted for argument 1, and the device identifier of the first information-processing device 1f for argument 2. Further, this function is assumed to reverse the order of the IP addresses if argument 1 and argument 2 are swapped. In this case, the first address of the addresses determined by the address determination part 26f using the function is to be the IP address of the second information-processing device 2f, and the second to be the first information-processing device 1f.

The action in which tunnel communication is performed after this address determination is the same as that in the concrete example in embodiment 7, except that an address is not transmitted, and thus its descriptions is omitted.

As mentioned above, in the communication system according to this embodiment, it is also possible that respective information-processing devices determine an address used for communication target data in tunnel communication, according to a device identifier of the information-processing device and a tunnel communication identifier. Each information-processing device determines its own address, thus dispensing with transmitting an address, bringing the same effect as that in embodiment 2.

In this embodiment, the description is made for a case where the addresses of a communication source and destination are determined by each information-processing device. However, when only the address of the first information-processing device 1f is determined by itself, and when only the address of the second information-processing device 2f is determined by itself, for example, they may be passed to the other party's information-processing device directly or indirectly.

Embodiment 9

A description is made for a communication system according to embodiment 9 of the present invention, referring to drawings. In the communication system according to this embodiment, a server determines an address used for communication target data in tunnel communication, according to the device identifier and tunnel communication identifier of the information-processing device.

Figure 24:
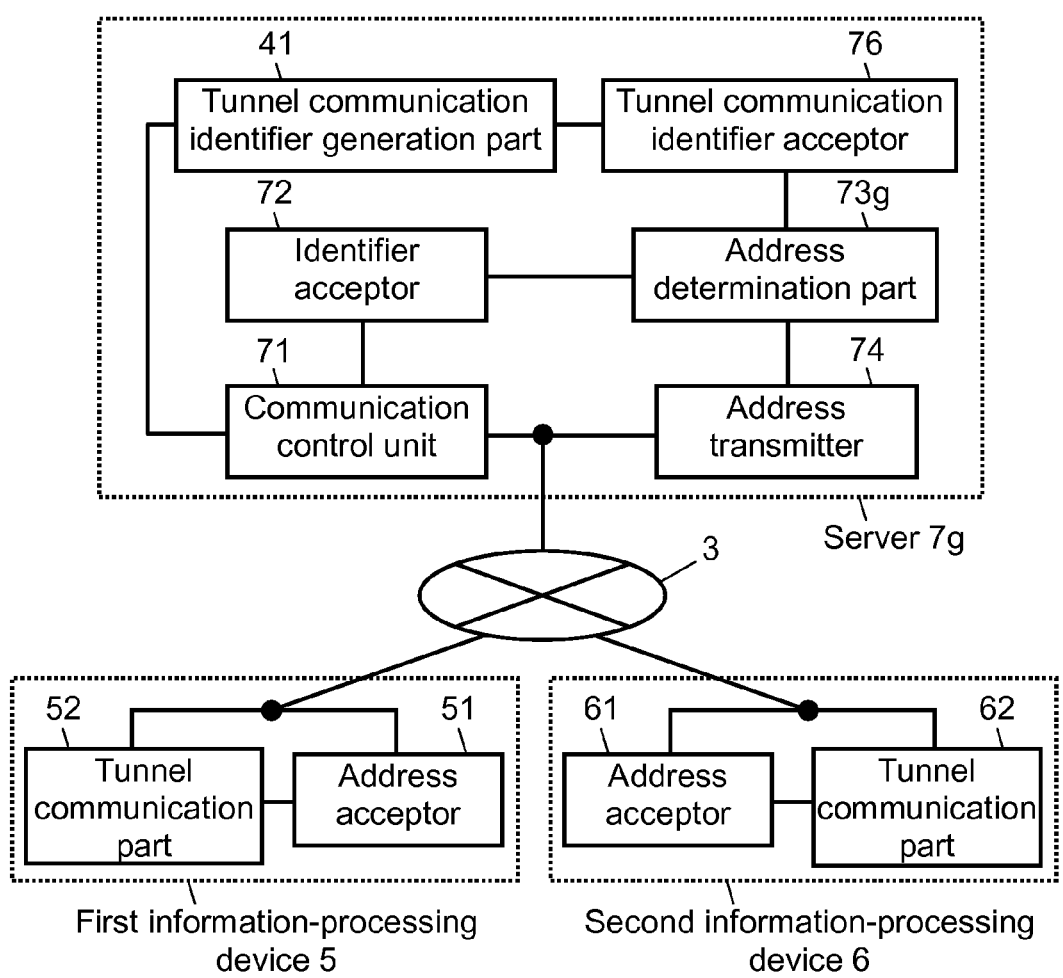
FIG. 24 shows the makeup of a communication system according to embodiment 9 of the present invention.

FIG. 24 shows the makeup of the communication system according to this embodiment. In FIG. 24, the communication system according to this embodiment is equipped with the first information-processing device 5, the second information-processing device 6, and the server 7g, all connected one another via the communication line 3. Here, the first information-processing device 5 and the second information-processing device 6 are the same as those in embodiment 3, and thus their descriptions are omitted.

Server 7g, in the same way as the server 4 in embodiment 1, performs a process to establish tunnel communication performed between the first information-processing device 5 and the second information-processing device 6, and also determines an address used in the tunnel communication, equipped with a communication control unit 71, an identifier acceptor 72, an address determination part 73g, an address transmitter 74, a tunnel communication identifier generation part 41, and a tunnel communication identifier acceptor 76. Here, the communication control unit 71, the identifier acceptor 72, and the address transmitter 74 are the same as those in embodiment 3, and the tunnel communication identifier generation part 41 is the same as that in embodiment 7, and thus their descriptions are omitted.

Address determination part 73g determines a first address of the first information-processing device 5 and a second address of the second information-processing device 6, both used for communication target data in tunnel communication encapsulated in tunnel communication performed between the first information-processing device 5 and the second information-processing device 6, according to a first device identifier for identifying the first information-processing device 5 and a second device identifier for identifying the second information-processing device 6, both accepted by identifier acceptor 72, and to a tunnel communication identifier accepted by the tunnel communication identifier acceptor 76. The method of determining an address is the same as that by the address determination part 14e in embodiment 7, and thus its description is omitted.

Tunnel communication identifier acceptor 76 accepts a tunnel communication identifier. Tunnel communication identifier acceptor 76 may, for example, receive a tunnel communication identifier transmitted (from another server, for example) via wired or wireless communication lines, may accept a tunnel communication identifier having been input to the server 7g through a given input device (e.g. keyboard, mouse, or touch panel), may accept a tunnel communication identifier read from a given recording medium (e.g. optical disc, magnetic disk, or semiconductor memory), or may accept a tunnel communication identifier generated by the server 7g. In this embodiment, a description is made for a case where accepting a tunnel communication identifier generated by tunnel communication identifier generation part 41 of the server 7g. Here, the tunnel communication identifier acceptor 76 may optionally include a device for accepting (e.g. modem or network card). Also, the tunnel communication identifier acceptor 76 may be implemented by means of hardware, or software such as a driver for driving a given device.

Figure 25:
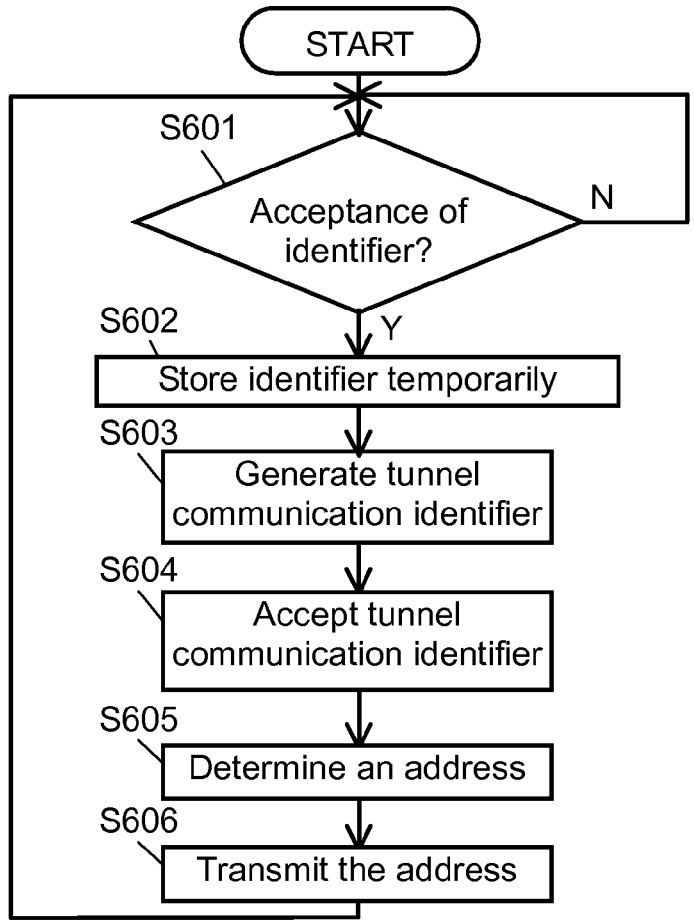
FIG. 25 is a flowchart showing the action of a server in the $9^{th}$ embodiment.

Next, a description is made for the action of the communication system, in particular, the action for determining an address, according to this embodiment. FIG. 25 is a flowchart showing the action in which the server 7g determines an address.

(S601) Identifier acceptor 72 determines whether the first device identifier and second device identifier have been accepted. If accepted, the flow goes to S602; otherwise, process S601 is repeated until they are accepted.

(S602) Address determination part 73g temporarily stores a first device identifier and second device identifier accepted by the identifier acceptor 72 in a recording medium (not illustrated).

(S603) Tunnel communication identifier generation part 41 generates a tunnel communication identifier and passes the generated tunnel communication identifier to the tunnel communication identifier acceptor 76.

(S604) Tunnel communication identifier acceptor 76 accepts the tunnel communication identifier passed from the tunnel communication identifier generation part 41.

(S605) Address determination part 73g determines an address according to the tunnel communication identifier accepted by the tunnel communication identifier acceptor 76, and to the first device identifier and second device identifier, both accepted by the identifier acceptor 72 and temporarily stored in a recording medium (not illustrated). This method of determining an address is the same as that in the concrete example in embodiment 7, and thus its description is omitted.

(S606) Address transmitter 74 transmits the addresses of the first information-processing device 5 and the second information-processing device 6, both determined by the address determination part 73g, to the first information-processing device 5 and the second information-processing device 6, and then the flow returns to S601.

Here, in the flowchart of FIG. 25, the process ends with an interruption of power off or process end. Also, this flowchart illustrates a case where processes such as determining an address are performed when the identifier acceptor 72 accepts a first device identifier and others. However, such a timing is not limited to this case, but an address may be determined when the first information-processing device 5 and the second information-processing device 6 start tunnel communication, using a first device identifier and others having been accepted by the identifier acceptor 72 by that time, for example.

Next, a description is made for the action of the communication system according to this embodiment, using a concrete example. First, data structure in tunnel communication is the same as that in FIG. 5. In addition, the IP addresses and device identifiers of information-processing devices and a server are assumed to be the same as those in the concrete example in embodiment 3. Further, the processes in which the first information-processing device 5 and the second information-processing device 6 respectively register the IP addresses and device identifying information to the server 7g are the same as that in embodiment 3, and thus their description are omitted.

Tunnel communication part 52 of the first information-processing device 5 transmits a second device identifier for identifying the second information-processing device 6 and a request for tunnel communication with the second information-processing device 6, to the server 7g. Then, they are received by the communication control unit 71. Communication control unit 71 acquires an IP address of the first information-processing device 5 from the header of a packet transmitted from the first information-processing device 5, refers to the address identifier correspondence information shown in FIG. 11, and acquires the first device identifier "12345678" of the first information-processing device 5. In addition, communication control unit 71 acquires the IP address "131.206.10.240" corresponding to the second device identifier "98765432" transmitted from the first information-processing device 5, referring to the address identifier correspondence information. Then, the communication control unit 71 passes the first device identifier and the second device identifier to identifier acceptor 72, and also transmits the IP address of the second information-processing device 6 to the first information-processing device 5.

Identifier acceptor 72, when accepting the first device identifier and second device identifier from the communication control unit 71 (S601), passes them to the address determination part 73g. Address determination part 73g temporarily stores the first device identifier and others in a memory (not illustrated) (S602).

Further, the tunnel communication identifier generation part 41, corresponding to a fact that the communication control unit 71 has received information showing that tunnel communication is to be started, generates a new tunnel communication identifier "111222333" and passes the generated tunnel communication identifier to the tunnel communication identifier acceptor 76 (S603). Consequently, the tunnel communication identifier is accepted by the tunnel communication identifier acceptor 76 (S604).

After that, the address determination part 73g determines IP addresses to be used by the first information-processing device 5 and the second information-processing device 6, according to the tunnel communication identifier accepted by the tunnel communication identifier acceptor 76, and to the first device identifier and second device identifier stored in a memory (not illustrated), and then passes the determined address, making it correspond to the device identifier, to the address transmitter 74 (S605). This method of determining an address is the same as that in the concrete example in embodiment 7, and thus its description is omitted.

Address transmitter 74, when receiving a set of the IP address of the first information-processing device 5 determined by address determination part 73g, and the device identifier of the first information-processing device 5; and a set of the IP address of the second information-processing device 6, and the device identifier of the the second information-processing device 6, refers to the address identifier correspondence information retained by the communication control unit 71 to acquire IP addresses of information-processing devices corresponding to the respective device identifiers. Then, the address transmitter 74 transmits the two sets of the device identifiers and IP addresses to the first information-processing device 5 and the second information-processing device 6 (S606). The processes hereafter are the same as that in the concrete example in embodiment 3, and thus their descriptions are omitted.

As mentioned above, in the communication system according to this embodiment, the server 7g can determine an address used for communication target data in tunnel communication performed between the first information-processing device 5 and the second information-processing device 6, according to the device identifier of an information-processing device and a tunnel communication identifier. This enables an address to be easily determined with a simple deterministic algorithm.

In this embodiment, the description is made for a case where the address transmitter 74 transmits an address determined by the address determination part 73g. However, an address output part for outputting an address determined by the address determination part 73g may be equipped instead of the address transmitter 74. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the first information-processing device 5 or the second information-processing device 6, for example, by being recorded on a given recording medium, or alternatively by being sent to the user of the first information-processing device 5 or the second information-processing device 6 by the administrator of the server 7g via email, facsimile, or others.

Further, in this embodiment, the description is made for a case where address transmitter 74 of the server 7g transmits two addresses determined by address determination part 73g to the second information-processing device 6. However, address transmitter 74 may transmit only the address of the second information-processing device 6 to the second information-processing device 6. In this case, the second information-processing device 6 can acquire an address of the first information-processing device 5 from the header of encapsulated communication target data transmitted from the first information-processing device 5.

In this embodiment, the description is made for a case where the server 7g transmits both the addresses of the first information-processing device 5 and the second information-processing device 6. However, the server 7g may first transmit the address of the first information-processing device 5 to the first information-processing device 5, and that of the second information-processing device 6 to the second information-processing device 6, and then transmit the address of the other party, when an inquiry related to the address of the other party in tunnel communication is made from an information-processing device.

Embodiment 10

A description is made for a communication system according to embodiment 10 of the present invention, referring to drawings. The communication system according to this embodiment determines an address used for communication target data in tunnel communication, according to a determination related to whether the information-processing device is a caller or callee, and to a tunnel communication identifier for identifying tunnel communication.

The communication system according to this embodiment is assumed to be the same as that in FIG. 1 However, the first information-processing device 1 is assumed to correspond to the first information-processing device 1h; second information-processing device, to the second information-processing device 2b in embodiment 4; and the server 4, to the server 4e in embodiment 7.

Figure 26:
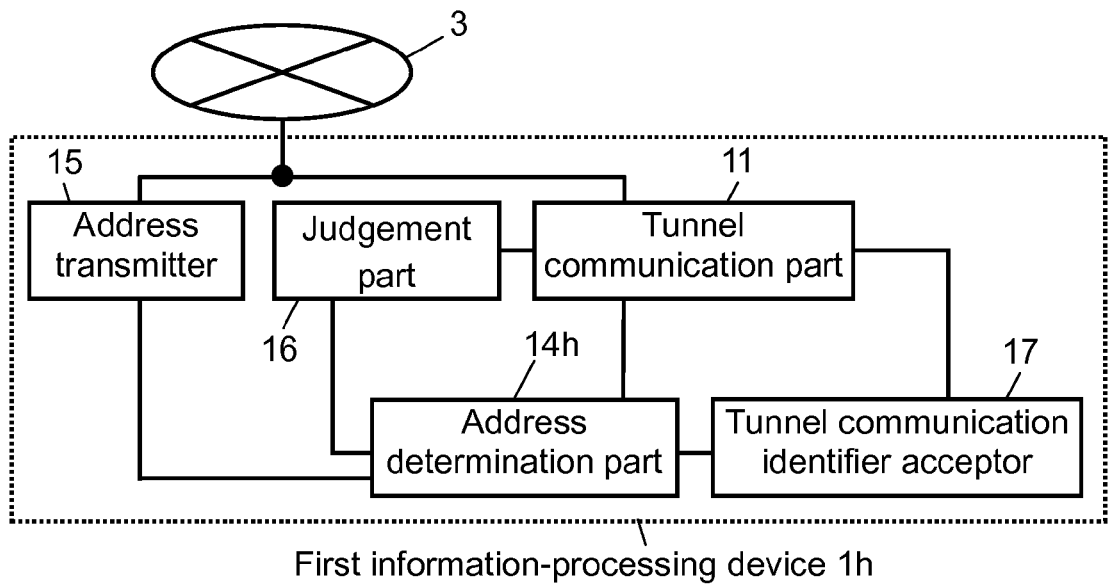
FIG. 26 is a block diagram showing the makeup of a first information-processing device according to embodiment 10 of the present invention.

FIG. 26 is a block diagram showing the makeup of the first information-processing device 1h according to this embodiment. The first information-processing device 1h according to this embodiment is equipped with the tunnel communication part 11, the address determination part 14h, the address transmitter 15, judgment part 16, and the tunnel communication identifier acceptor 17. Here, the tunnel communication part 11 and the address transmitter 15 are the same as those in embodiment 1; judgment part 16, in embodiment 4; and the tunnel communication identifier acceptor 17, in embodiment 7, and thus these descriptions are omitted.

Address determination part 14h determines an address used for communication target data encapsulated in tunnel communication, according to a determination by judgment part 16 and a tunnel communication identifier accepted by the tunnel communication identifier acceptor 17. Here, tunnel communication identifier refers to an identifier for identifying tunnel communication performed between information-processing devices. In this address determination, it is sufficient if an address used in a device (e.g. the second information-processing device 2b) at the communication destination, and that in a device (e.g. the first information-processing device 1h) at the communication source are determined differently, according to a determination by judgment part 16 and a tunnel communication identifier. Methods of determining an address include one with a given function used, and one by selecting from a plurality of predetermined addresses. In addition, the address determination part 14h may determine a part of an address used for communication target data, according to the communication destination device identifier and the communication source device identifier; and the other part of the address used for the communication target data, according to the tunnel communication identifier. A concrete example of a method of determining an address is described hereinafter. In determining the address, an address for a device for communication source and/or one for communication destination may be determined. In this embodiment, a description is made for a case where both addresses for a communication source and communication destination are determined.

Figure 27:
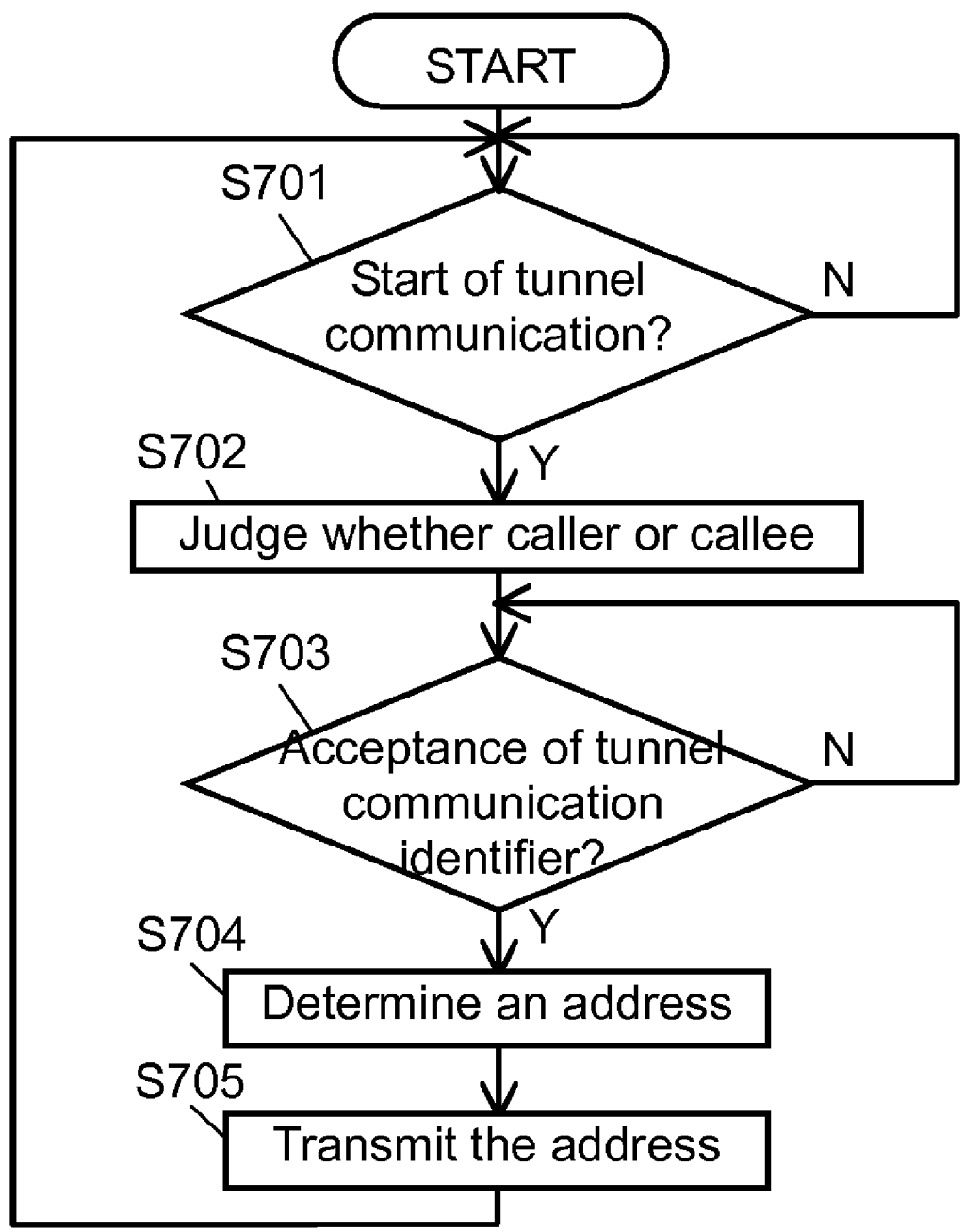
FIG. 27 is a flowchart showing the action of a first information-processing device in the $10^{th}$ embodiment.

Next, a description is made for the action of a communication system, in particular, the action in which the first information-processing device 1h determines an address, according to this embodiment. FIG. 27 is a flowchart showing the action for determining an address in the first information-processing device 1h.

(S701) Tunnel communication part 11 determines whether or not to start tunnel communication. To start this tunnel communication includes two cases: a case where the first information-processing device 1h actively starts tunnel communication, and a case where tunnel communication starts according to a request from another device (the second information-processing device 2b, here). In either case, the tunnel communication part 11 determines that the tunnel communication is to be started. If started, the flow goes to S702; otherwise, repeats process S701 until tunnel communication is started.

(S702) Judgment part 16 determines whether the first information-processing device 1h is a caller or callee.

(S703) Tunnel communication identifier acceptor 17 determines whether a tunnel communication identifier has been accepted. If accepted, the flow goes to S704; otherwise, repeats process S703 until a tunnel communication identifier is accepted.

(S704) Address determination part 14h determines an address using a determination by the judgment part 16 and a tunnel communication identifier accepted by the tunnel communication identifier acceptor 17. This method of determining an address is described hereinafter.

(S705) Address transmitter 15 transmits the address determined by the address determination part 14h to the second information-processing device 2b, and then the flow returns to S701.

Here, in the flowchart of FIG. 27, the process ends with an interruption of power off or process end. Still, this flowchart illustrates only a process for determining an address; however, it is obvious that this determined address is used for tunnel communication.

Next, a description is made for the action of the communication system according to this embodiment, using a concrete example. First, the data structure in tunnel communication is the same as that in FIG. 5 in embodiment 1. In addition, the IP addresses and device identifiers of information-processing devices and a server are assumed to be the same as those in the concrete example in embodiment 1. Further, the processes in which the first information-processing device 1h and the second information-processing device 2b respectively register IP addresses and device identifying information to the server 4e are the same as those in embodiment 1, and thus their descriptions are omitted.

It is assumed that a detachable recording medium with a communication destination device identifier recorded therein is attached to the first information-processing device 1h, and the communication destination device identifier "98765432" stored in the recording medium is accepted by an acceptor (not illustrated) and is passed to the tunnel communication part 11.

Then, the tunnel communication part 11 determines that tunnel communication is to be started (S701), and transmits to the server 4e the received communication destination device identifier and an instruction of transmitting an IP address of a device identified by the communication destination device identifier. Consequently, the server 4*e* receives them to transmit the retained IP address "131.206.10.240", corresponding to the communication destination device identifier "98765432", to the first information-processing device 1*h*. Tunnel communication part 11 of the first information-processing device 1*h*, when accepting the IP address "131.206.10.240" of the second information-processing device 2*b* from the server 4*e*, retains the IP address.

Judgment part 16 determines that the first information-processing device 1*h* is a caller because the tunnel communication part 11 is a caller in communication for a protocol of tunnel in tunnel communication (S702), and then passes the determination to the address determination part 14*h*.

In addition, the server 4*e* determines that tunnel communication is started between the first information-processing device 1*h* and the second information-processing device 2*b*. Then, tunnel communication identifier generation part 41 generates the tunnel communication identifier "111222333" for identifying tunnel communication performed between the first information-processing device 1*h* and the second information-processing device 2*b*. Tunnel communication identifier transmitter 42 transmits the tunnel communication identifier to the first information-processing device 1*h*. The address of the first information-processing device 1*h* is one acquired from the header of a packet including a communication destination device identifier transmitted from the first information-processing device 1*h*. The transmitted tunnel communication identifier "111222333" is accepted by the tunnel communication identifier acceptor 17 of the first information-processing device 1*e* (S703). The tunnel communication identifier is passed to the address determination part 14*h*.

Address determination part 14*h*, when receiving a determination from the judgment part 16, and a tunnel communication identifier from the tunnel communication identifier acceptor 17, determines an IP address used for communication target data in tunnel communication, according to the determination and tunnel communication identifier. Specifically, the address determination part 14*h* determines an address with either of the following two methods, for example (S704).

[Method of Determining an Address Using a Table]

Figures 28A, 28B, 28C:
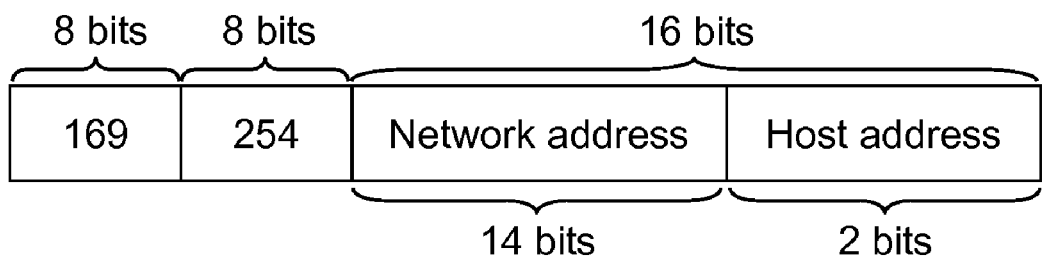
FIG. 28A shows an example of the makeup of an address in the $10^{th}$ embodiment.
FIG. 28B shows a table that is an example of correspondence between a caller or callee and a host address in the $10^{th}$ embodiment.
FIG. 28C shows a table that is an example of correspondence between a caller or callee and a host address in the $10^{th}$ embodiment.

The address determined by the address determination part 14*h* has the structure shown in FIG. 28A. That is, the first eight bits show "169" and next eight bits, "254". The first four bits of the further next 16 bits indicates a network address, which is a remainder after dividing a tunnel communication identifier by "16,384". The last two bits show a host address, which is determined using the table of FIG. 28B. The table of FIG. 28B shows correspondence between information indicating a caller or callee and its IP address. The first information-processing device 1*h* has been judged as a caller by judgment part 16, and thus the address determination part 14*h* determines the host address of the first information-processing device 1*h* as "1", using the table of FIG. 28B. Also, the second information-processing device 2*b* is a callee, and thus the address determination part 14*h* determines the host address of the second information-processing device 2*b* as "2". FIG. 28B shows correspondence of information showing a caller or callee to an IP address in a tabular form. However, they may be made correspond with a means other than a tabular form. Further, the remainder "7741", after dividing the tunnel communication identifier "111222333" by "16,384", is a network address common to the first information-processing device 1*h* and the second information-processing device 2*b*. Therefore, the address determination part 14*h* determines the IP address of the first information-processing device 1*h* as "169.254.120.245". ("01111000111101", which is binary notation for "7741", and "01", which is binary notation for "1", are divided into eight bits each, "01111000" and "11110101". They are "120" and "245", respectively in decimal notation.) In the same way, the address determination part 14*h* determines the IP address of the second information-processing device 2*b* as "169.254.120.246". Then, the address determination part 14*h* passes these addresses to the tunnel communication part 11 and the address transmitter 15. Here, if the addresses are determined in this way, "255.255.255.252" is used as a subnet mask in each information-processing device. As in this way where the address is determined using a table, the address determination part 14*h* may determine a part of the address, according to a communication destination device identifier and communication source device identifier; and the other part of the address, according to a tunnel communication identifier.

Here, the address determination part 14*h* may determine a host address by selecting from a plurality of predetermined addresses. One such example is that, when the address determination part 14*h* has the table shown in FIG. 28C, and if the information-processing device is a caller, the host address may be selected from "1", "3", or "6", and if a callee, from "2", "4", or "6".

[Method of Determining an Address Using a Function]

Address determination part 14*h* has the function "Func (argument 1, argument 2)" for determining an address. When calculating an address of a caller, "0" is substituted for argument 1; a callee, "1" is substituted for argument 1. For argument 2, tunnel communication identifier is substituted. In this concrete example, it is assumed that the address determination part 14*h* substitutes "0" for argument 1; "111222333" for argument 2; and the function returns the value "192.168.0.1". This IP address is to be that of the first information-processing device 1*h*. Meanwhile, it is assumed that the address determination part 14*h* substitutes "1" for argument 1; "111222333" for argument 2; and the function returns the value "192.168.0.2". This IP address is to be that of the second information-processing device 2*b*. Then, the address determination part 14*h* passes these addresses to the tunnel communication part 11 and the address transmitter 15.

Here, the description is made for two different methods of determining an address. However, it is sufficient if the address determination part 14*h* determines the address according to a determination by judgment part 16 and a tunnel communication identifier, and thus the address may be determined with a method of determining an address other than these.

Address transmitter 15, in the same way as in the concrete example in embodiment 1, transmits the determined IP addresses of the first information-processing device 1*h* and the second information-processing device 2*b*, to the second information-processing device 2*b* (S705). Consequently, these IP addresses are accepted by the address acceptor 21 in the second information-processing device 2*b* and passed to the tunnel communication part 22. Further, the tunnel communication part 11, in the same way as in the concrete example in embodiment 1, performs tunnel communication using the determined address, and so does the tunnel communication part 22 using the address accepted by the address acceptor 21.

As mentioned above, the communication system according to this embodiment can determine the address used for communication target data in tunnel communication, according to a determination by the judgment part 16 and the tunnel communication identifier for identifying tunnel communication, which is a deterministic algorithm, simpler than a heuristic one. Consequently, this embodiment has the same advantage as embodiment 1.

In this embodiment, the description is made for a structure where the first information-processing device 1h has the address transmitter 15. However, the first information-processing device 1h may have an address output part for outputting an address determined by the address determination part 14h, instead of the address transmitter 15. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the second information-processing device 2b, for example, by being recorded on a given recording medium, or by being sent to the user of the second information-processing device 2b via email, facsimile, or the like.

In this embodiment, the description is made for a case where a tunnel communication identifier generated by the server 4e is transmitted only to the first information-processing device 1h. However, the tunnel communication identifier may be transmitted to the second information-processing device 2b as well as to the first information-processing device 1h.

Embodiment 11

A description is made for a communication system according to embodiment 11 of the present invention, referring to the drawings. In the communication system according to this embodiment, each information-processing device determines the address used for communication target data in tunnel communication, according to a determination related to whether each information-processing device is a caller or callee, and to a tunnel communication identifier.

Figure 29:
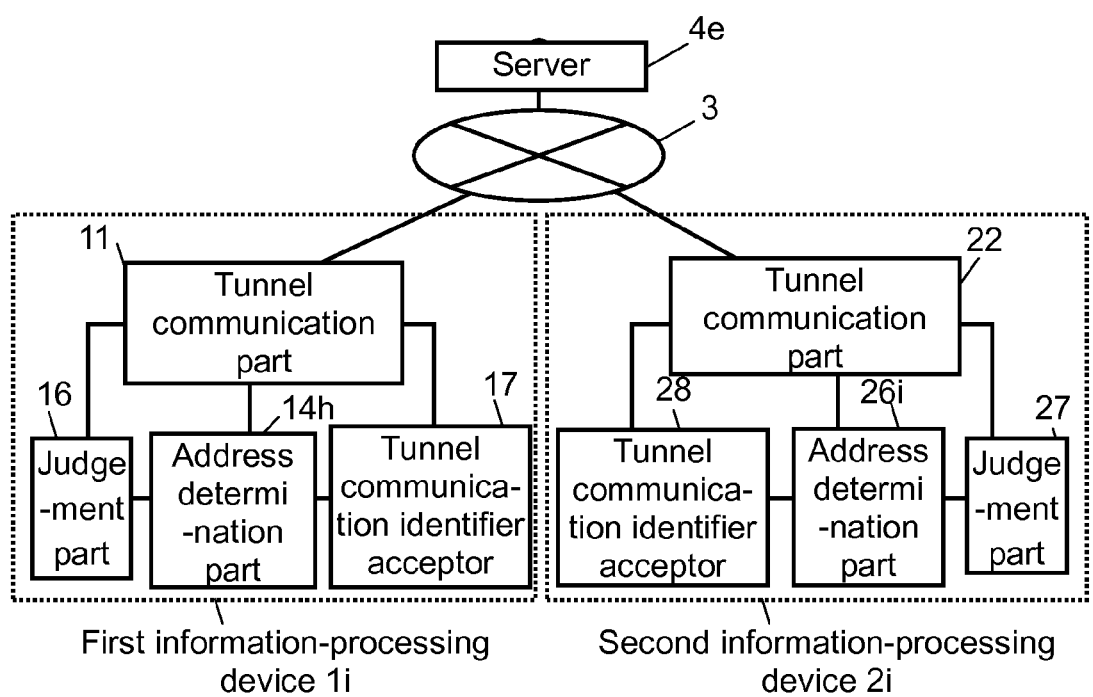
FIG. 29 shows the makeup of a communication system according to embodiment 11 of the present invention.

FIG. 29 shows the makeup of the communication system according to this embodiment. The communication system according to this embodiment is equipped with the first information-processing device 1i, the second information-processing device 2i, and the server 4e, all connected one another via the communication line 3. Server 4e is the same as that in embodiment 7, and thus its description is omitted. However, in this embodiment, addresses are determined by the first information-processing device 1i and the second information-processing device 2i, and thus the server 4e is to transmit the generated tunnel communication identifier to the first information-processing device 1i and the second information-processing device 2i, respectively.

The first information-processing device 1i is equipped with the tunnel communication part 11, the address determination part 14h, judgment part 16, and the tunnel communication identifier acceptor 17. Here, the tunnel communication part 11, the address determination part 14h, judgment part 16, and the tunnel communication identifier acceptor 17 are the same as those in embodiment 10, and thus their descriptions are omitted.

Second information-processing device 2i is equipped with a tunnel communication part 22, an address determination part 26i, a judgment part 27, and a tunnel communication identifier acceptor 28. Here, the tunnel communication part 22 is the same as that in embodiment 4; the tunnel communication identifier acceptor 28, in embodiment 8; the address determination part 26i, the address determination part 14h in embodiment 10, and thus their descriptions are omitted.

In addition, the action in which the first information-processing device 1i determines an address is the same as that shown in FIG. 27 in embodiment 10, except that the process for transmitting an address at S705 is not performed, and thus its description is omitted. Further, the action in which the second information-processing device 2i in this embodiment determines an address is the same as that shown in FIG. 27 in embodiment 10, except that the tunnel communication part 11, the address determination part 14h, the judgment part 16, and the tunnel communication identifier acceptor 17 correspond to the tunnel communication part 22, the address determination part 26i, judgment part 27, and the tunnel communication identifier acceptor 28 at S705, respectively, and that they do not transmit addresses, and thus their descriptions are omitted.

Next, a description is made for the action of the communication system according to this embodiment, using a concrete example. Here, the action in which the first information-processing device 1i determines the IP address is the same as that in the concrete example in embodiment 10, and thus its description is omitted. From the server 4e, a tunnel communication identifier is assumed to be transmitted to the second information-processing device 2i as well as to the first information-processing device 1i.

Server 4e, according to a request from the first information-processing device 1i, transmits the IP address of the second information-processing device 2i to the first information-processing device 1i, and also information showing that the first information-processing device 1i is requesting tunnel communication with the second information-processing device 2i, to the second information-processing device 2i. In addition, the server 4e generates the tunnel communication identifier and transmits the tunnel communication identifier to the first information-processing device 1i and the second information-processing device 2i.

Tunnel communication part 22 of the second information-processing device 2i, when receiving information transmitted from the server 4e, determines that tunnel communication is to be started (S701), and the judgment part 27 determines that the second information-processing device 2i is a callee (S702). Tunnel communication identifier acceptor 28 accepts a tunnel communication identifier transmitted from the server 4e through the tunnel communication part 22 (S703). Here, the process in which the address determination part 26i determines the IP addresses of the first information-processing device 1i and the second information-processing device 2i, according to a determination by the judgment part 27 and a tunnel communication identifier is the same as that in embodiment 10, and thus its description is omitted. Also, the actions in which tunnel communication is performed after this address determination are the same as those in the concrete example in embodiment 10, except that an address is not transmitted, and thus its description is omitted.

As mentioned above, in the communication system according to this embodiment, each information-processing device can also determine the address used for communication target data in tunnel communication, according to a determination whether the information-processing device is a caller or callee, and to a tunnel communication identifier. Each information-processing device determines its own address, thus dispensing with transmitting the address, bringing the same effect as that in embodiment 2.

In this embodiment, the description is made for a case where the addresses of a communication source and destination are determined by each information-processing device.

However, when only the address of the first information-processing device 1*i* is determined by itself, and when only the address of the second information-processing device 2*i* is determined by itself, for example, they may be passed to the other party's information-processing device directly or indirectly.

Embodiment 12

A description is made for a communication system according to embodiment 12 of the present invention, referring to drawings. The communication system according to this embodiment determines an address used for communication target data in tunnel communication, according to a determination related to whether the information-processing device is a caller or callee, and to a tunnel communication identifier.

Figure 30:
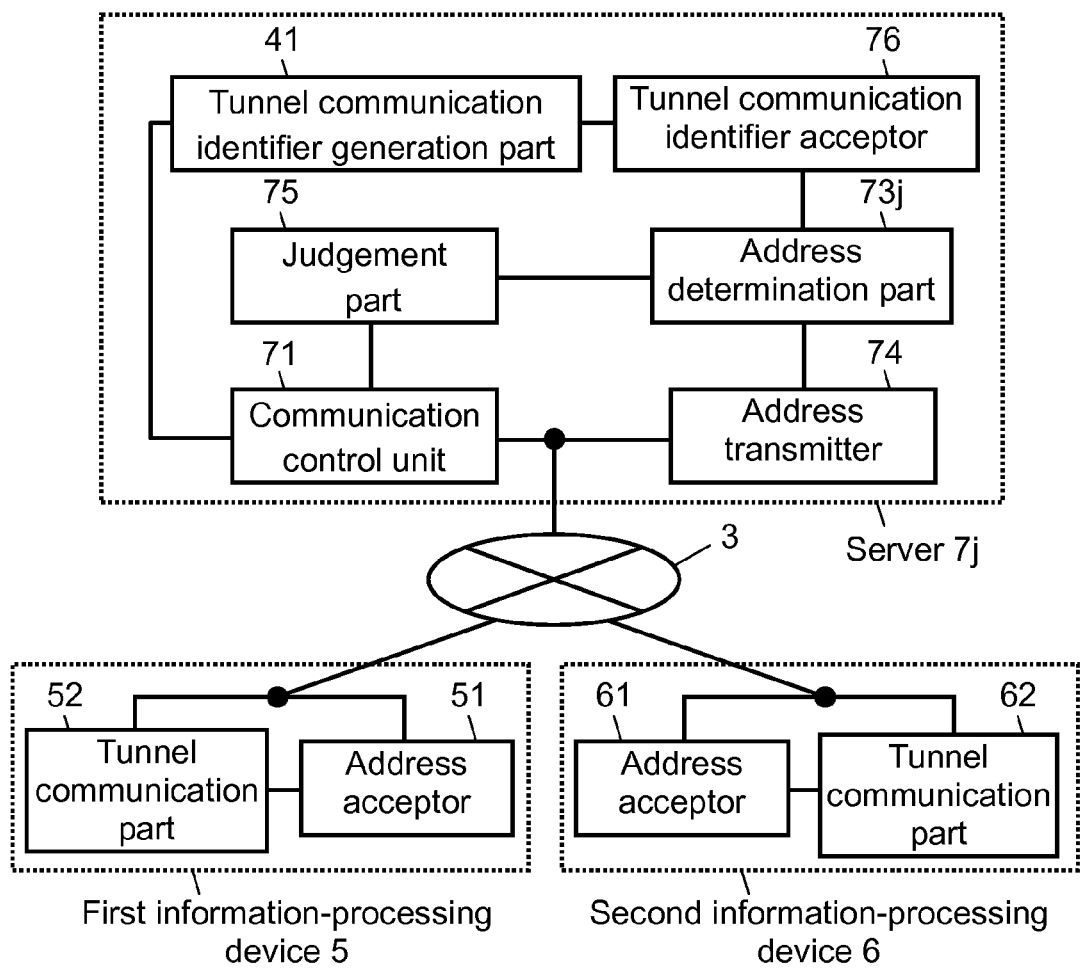
FIG. 30 shows the makeup of a communication system according to embodiment 12 of the present invention.

FIG. 30 shows the makeup of the communication system according to this embodiment. The communication system according to this embodiment is equipped with the first information-processing device 5, the second information-processing device 6, and the server 7*j*, all connected one another via the communication line 3. Here, the first information-processing device 5 and the second information-processing device 6 are the same as those in embodiment 3, and thus their descriptions are omitted.

Server 7*j*, in the same way as the server 4 in embodiment 1, performs a process to establish tunnel communication performed between the first information-processing device 5 and the second information-processing device 6, and also determines an address used in the tunnel communication, equipped with a communication control unit 71, an address determination part 73*j*, an address transmitter 74, a judgment part 75, a tunnel communication identifier generation part 41, and a tunnel communication identifier acceptor 76. Here, the communication control unit 71 and the address transmitter 74 are the same as those in embodiment 3; the judgment part 75, in embodiment 6; the tunnel communication identifier generation part 41 and the tunnel communication identifier acceptor 76, in embodiment 9, and thus their descriptions are omitted.

Address determination part 73*j* determines a first address of the first information-processing device 5 and a second address of the second information-processing device 6, both used for communication target data in tunnel communication encapsulated in tunnel communication performed between the first information-processing device 5 and the second information-processing device 6, according to a determination by the judgment part 75 and a tunnel communication identifier accepted by the tunnel communication identifier acceptor 76. The method of determining the address is the same as that by the address determination part 14*h* in embodiment 10, and thus its description is omitted.

Figure 31:
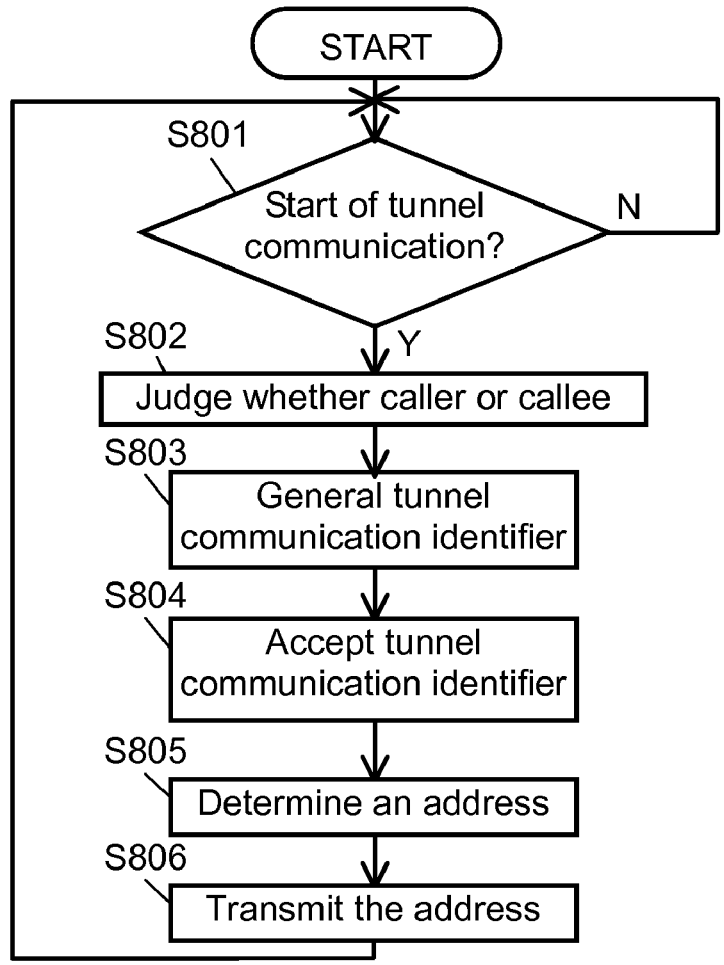
FIG. 31 is a flowchart showing the action of a server in the $12^{th}$ embodiment.

Next, a description is made for the action of a communication system, in particular, the action for determining an address, according to this embodiment. FIG. 31 is a flowchart showing the action for determining an address in the server 7*j*.

(S801) Communication control unit 71 determines whether tunnel communication between the first information-processing device 5 and the second information-processing device 6 is to be started. If started, the flow goes to S802; otherwise, repeats process S801 until tunnel communication is started.

(S802) Judgment part 75 determines whether the first information-processing device 5 and the second information-processing device 6 are a caller or callee, respectively.

(S803) Tunnel communication identifier generation part 41 generates the tunnel communication identifier and passes the generated tunnel communication identifier to the tunnel communication identifier acceptor 76.

(S804) Tunnel communication identifier acceptor 76 accepts the tunnel communication identifier passed from the tunnel communication identifier generation part 41.

(S805) Address determination part 73*j* determines the address according to a tunnel communication identifier accepted by the tunnel communication identifier acceptor 76 and a determination by judgment part 75. This method of determining the address is the same as that in the concrete example in embodiment 10, and thus its description is omitted.

(S806) Address transmitter 74 transmits the addresses of the first information-processing device 5 and the second information-processing device 6, both determined by the address determination part 73*j*, to the first information-processing device 5 and the second information-processing device 6, and then the flow returns to S801.

Here, in the flowchart of FIG. 31, the process ends with an interruption of power off or process end.

Next, a description is made for the action of the communication system according to this embodiment, using a concrete example. First, the data structure in tunnel communication is the same as that in FIG. 5. In addition, the IP addresses and device identifiers of information-processing devices and a server are assumed to be the same as those in the concrete example in embodiment 3. Further, the processes in which the first information-processing device 5 and the second information-processing device 6 respectively register IP addresses and device identifying information to the server 7*j* are the same as those in embodiment 3, and thus their descriptions are omitted.

Next, the tunnel communication part 52 of the first information-processing device 5 transmits a second device identifier for identifying the second information-processing device 6 and a request for tunnel communication with the second information-processing device 6, to the server 7*j*. Then, they are received by the communication control unit 71. Communication control unit 71 determines that tunnel communication is to be started (S801), acquires the IP address of the first information-processing device 5 from the header of a packet transmitted from the first information-processing device 5, refers to the address identifier correspondence information shown in FIG. 11, and acquires the device identifier "12345678" of the first information-processing device 5.

Communication control unit 71 further acquires the IP address "131.206.10.240" corresponding to the device identifier "98765432" transmitted from the first information-processing device 5, referring to the address identifier correspondence information shown in FIG. 11. Then, the communication control unit 71 transmits the IP address of the second information-processing device 6 to the first information-processing device 5.

The judgment part 75, because the communication control unit 71 has received information transmitted from the first information-processing device 5, requesting tunnel communication with the second information-processing device 6, determines that the first information-processing device 5 is a caller and the second information-processing device 6 is a callee (S802). Judgment part 75 then passes to the address determination part 73*j*, information showing that the information-processing device identified by the device identifier "12345678" is a caller, and "98765432" is a callee.

Tunnel communication identifier generation part 41, corresponding to the fact that the communication control unit 71 has received information showing that the tunnel communication is to be started, generates a new tunnel communication identifier "111222333" and passes the generated tunnel communication identifier to the tunnel communication identifier acceptor 76 (S803). Consequently, the tunnel communication identifier is accepted by the tunnel communication identifier acceptor 76 (S804).

After that, the address determination part 73j determines IP addresses to be used by the first information-processing device 5 and the second information-processing device 6, according to the tunnel communication identifier accepted by the tunnel communication identifier acceptor 76, and to a determination received from the judgment part 75, and passes the determined address, making it correspond to the device identifier, to address transmitter 74 (S805). This method of determining an address is the same as that in the concrete example in embodiment 10, and thus its description is omitted.

Address transmitter 74, when receiving a set of the IP address of the first information-processing device 5 determined by address determination part 73j and the device identifier of the first information-processing device 5, and a set of the IP address of the second information-processing device 6 and the device identifier of the second information-processing device 6, refers to the address identifier correspondence information retained by communication control unit 71 to acquire IP addresses of information-processing devices corresponding to the respective device identifiers. Then, the address transmitter 74 transmits the two sets of the device identifiers and IP addresses to the first information-processing device 5 and the second information-processing device 6 (S806). The processes hereafter are the same as those in the concrete example in embodiment 3, and thus their descriptions are omitted.

As mentioned above, in the communication system according to this embodiment, the server 7j can determine an address used for communication target data in tunnel communication performed between the first information-processing device 5 and the second information-processing device 6, according to a determination related to whether the information-processing device is a caller or callee, and to a tunnel communication identifier. This enables an address to be easily determined with a simple deterministic algorithm.

In this embodiment, the description is made for a case where the address transmitter 74 transmits an address determined by the address determination part 73j. However, an address output part for outputting an address determined by address determination part 73j may be equipped instead of the address transmitter 74. Here, this output may be, for example, display on a display device (e.g. CRT or liquid crystal display), transmission to a given device via communication lines, printing by a printer, recording on a given recording medium, or sound output by a speaker. The address output part may optionally include an output device (e.g. display device or printer). Also, the address output part may be implemented with hardware, or software such as a driver for driving such a device. The address having been output may be set in the first information-processing device 5 or the second information-processing device 6, for example, by being recorded on a given recording medium, or alternatively by being sent to the user of the second information-processing device 6 by the administrator of the server 7j via email, facsimile, or others.

Further, in this embodiment, the description is made for a case where the address transmitter 74 of the server 7j transmits two addresses determined by address determination part 73j to the second information-processing device 6. However, address transmitter 74 may transmit only the address of the second information-processing device 6 to the second information-processing device 6. In this case, the second information-processing device 2j can acquire an address of the first information-processing device 5 from the header of encapsulated communication target data transmitted from the first information-processing device 5.

In this embodiment, the description is made for a case where the server 7j transmits both the addresses of the first information-processing device 5 and the second information-processing device 6. However, the server 7j may first transmit the address of the first information-processing device 5 to the first information-processing device 5, and that of the second information-processing device 6 to the second information-processing device 6, and then transmit the address of the other party, when an inquiry related to the address of the other party in tunnel communication is made from an information-processing device.

In embodiments 9 and 12, the description is made for a case where the tunnel communication identifier acceptor 76 accepts a tunnel communication identifier generated by the tunnel communication identifier generation part 41. However, as aforementioned, the tunnel communication identifier acceptor 76 may accept a tunnel communication identifier having been input by an input device, or a tunnel communication identifier read from a recording medium, for example.

Embodiment 13

A description is made for a communication system according to embodiment 13 of the present invention, referring to drawings. The communication system according to this embodiment, when detecting that two or more addresses used for communication target data in tunnel communication are the same, changes such addresses.

Figure 32:
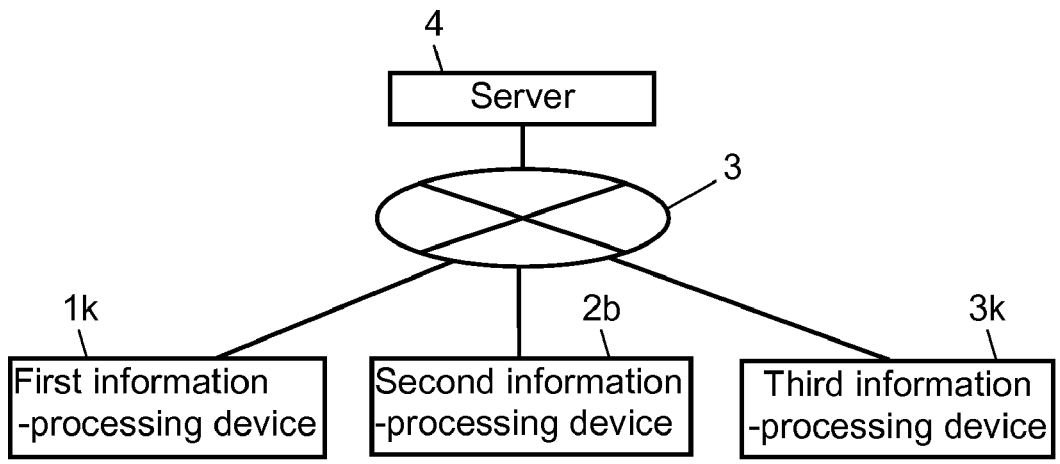
FIG. 32 shows the makeup of a communication system according to embodiment 13 of the present invention.

FIG. 32 shows the makeup of the communication system according to this embodiment. The communication system according to this embodiment is equipped with a first information-processing device 1k, a second information-processing device 2b, a third information-processing device 3k, and a server 4, all connected one another via the communication line 3. Here, the second information-processing device 2b is the same as that in embodiment 4; the server 4, in embodiment 1, and thus their descriptions are omitted.

The first information-processing device 1k according to this embodiment is assumed to perform tunnel communication with two or more information-processing devices. In other words, the first information-processing device 1k is assumed to perform tunnel communication with the second information-processing device 2b and the third information-processing device 3k. In such a case, if an address used for communication target data in tunnel communication between the first information-processing device 1k and the second information-processing device 2b is "192.168.0.1", and if that between the first information-processing device 1k and the third information-processing device 3k is "192.168.0.1", for example, the address with which the first information-processing device 1k uses in tunnel communication with the second information-processing device 2b, and the third information-processing device 3k results in agreement. In tunnel communication, like communication using a virtual network interface, if addresses to be used are the same, addresses allocated to the virtual network interface are also the same. (Communication is performed using two NICs with an identical addresses, for example.) Consequently, the first information-processing device 1k is unable to perform communication. In such a case, the first information-processing device 1k according to this embodiment changes at least one address to enable itself to simultaneously perform two or more tunnel communications.

Figure 33:
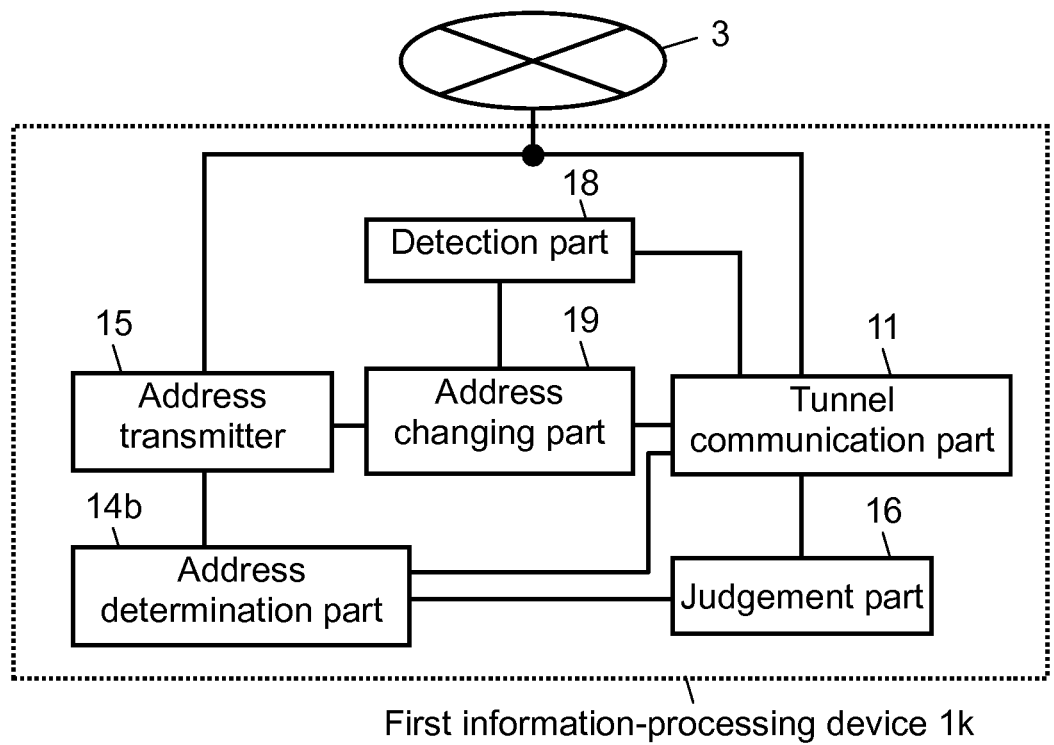
FIG. 33 is a block diagram showing the makeup of a first information-processing device according to the $13^{th}$ embodiment.

FIG. 33 is a block diagram showing the makeup of the first information-processing device 1k according to this embodiment. The first information-processing device 1k according to this embodiment is equipped with the tunnel communication part 11, the address determination part 14b, the address transmitter 15, the judgment part 16, detection part 18, and address changing part 19. Here, the tunnel communication part 11, the address determination part 14b, the address transmitter 15, and the judgment part 16 are the same as those in embodiment 4, except that the tunnel communication part 11 performs tunnel communication with two or more devices for communication destination, and that the address transmitter 15 transmits a changed address as well, and thus their descriptions are omitted.

Detection part 18 detects in two or more tunnel communications that two or more addresses used for communication target data are the same. For example, detection is performed for comparision of the address of the first information-processing device 1k that the tunnel communication part 11 uses for communication target data in tunnel communication with the second information-processing device 2b, and that with the third information-processing device 3k.

Address changing part 19, when detection part 18 detects two or more addresses are the same, changes an address used for communication target data. Here, in this address change, only the address of the first information-processing device 1k may be changed, or both the addresses of the first information-processing device 1k and of an information-processing device as a communication destination for the first information-processing device 1k may be changed, for example, out of the addresses used for communication target data in tunnel communication. Address changing part 19 may change some addresses out of two or more addresses that are the same, so detected by the detection part 18, so that these addresses are not the same (If two addresses agree, for example, only one address may be changed), or all the addresses may be changed. (If two addresses are the same, for example, both addresses may be changed.) A concrete method of changing an address is described hereinafter.

Figure 34:
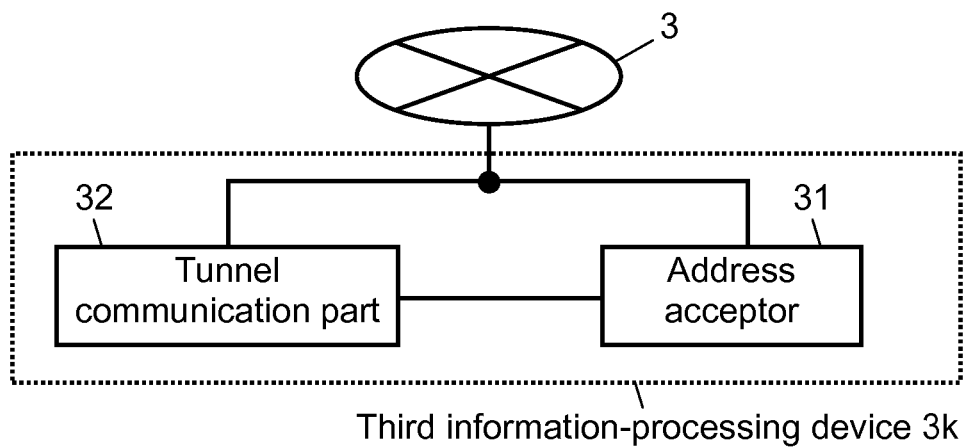
FIG. 34 is a block diagram showing the makeup of a third information-processing device according to the $13^{th}$ embodiment.

FIG. 34 is a block diagram showing the makeup of the third information-processing device 3k according to this embodiment. Third information-processing device 3k according to this embodiment is equipped with an address acceptor 31 and a tunnel communication part 32. Address acceptor 31 and tunnel communication part 32 are the same as the address acceptor 21 and the tunnel communication part 22 in the second information-processing device 2b according to embodiment 4, respectively, and thus their descriptions are omitted.

Figure 35:
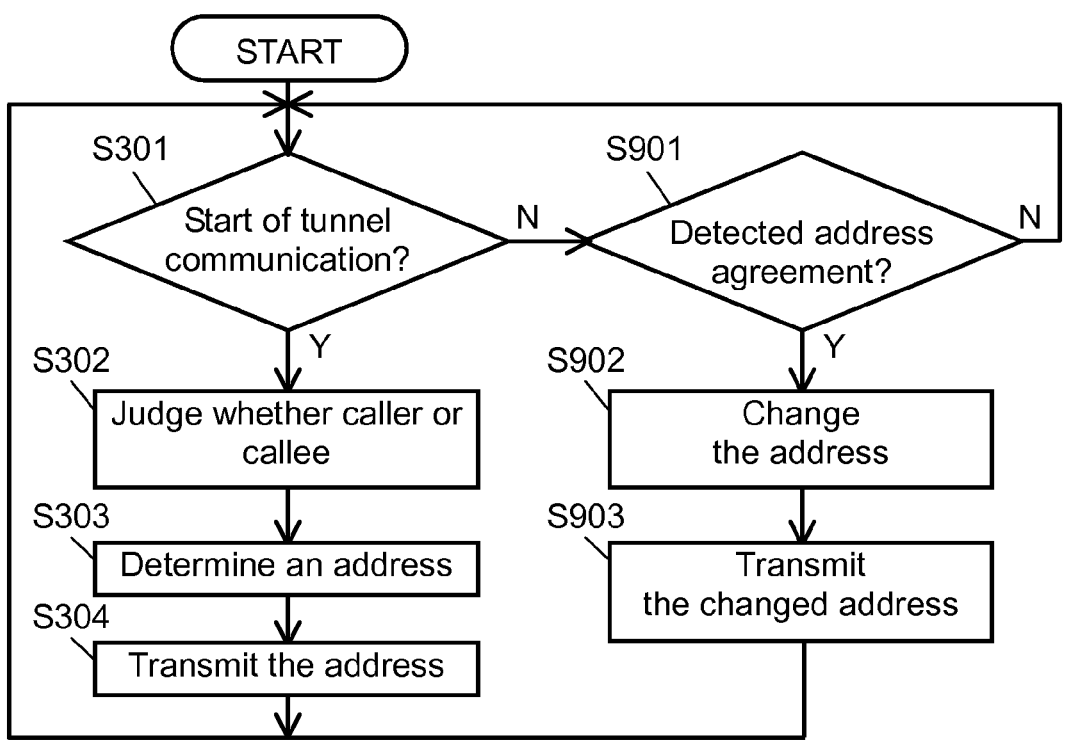
FIG. 35 is a flowchart showing the action of a first information-processing device in the $13^{th}$ embodiment.

Next, a description is made for the action of a communication system, in particular, the action for determining and changing an address, according to this embodiment. FIG. 35 is a flowchart showing the action for determining an address in the first information-processing device 1k. Here, in the flowchart of FIG. 35, processes S301 through S304 are the same as those in the flowchart of FIG. 14, and thus their descriptions are omitted.

(S901) Detection part 18 determines whether two or more addresses used for communication target data are the same in two or more tunnel communications performed by the tunnel communication part 11. If detected as agreeing, the flow goes to S902; otherwise, returns to S301.

(S902) Address changing part 19 changes an address used for communication target data.

(S903) Address transmitter 15 transmits an address changed by the address changing part 19. The destination to which this address is transmitted is an information-processing device that performs communication related to the address changed by the address changing part 19. If an address used for communication target data in tunnel communication with the second information-processing device 2b has been changed, for example, the changed address is transmitted to the second information-processing device 2b. If an address used for communication target data in tunnel communication with the third information-processing device 3k has been changed, the changed address is transmitted to the third information-processing device 3k. Then, the flow returns to S301.

Here, in the flowchart of FIG. 35, the process ends with an interruption of power off or process end. In addition, the flowchart of FIG. 35 shows a case where the processes related to address determination (S301 through S304) and those related to address change (S901 through S903) are performed separately. However, the following process may be performed. That is, determines whether the addresses are the same immediately after the addresses are determined. If the addresses are not the same, the address transmission process is performed; otherwise, the changed addresses are transmitted.

Next, a description is made for the action of the communication system according to this embodiment, using a concrete example. First, the data structure in tunnel communication is the same as that in FIG. 5. In addition, the IP addresses and device identifiers of information-processing devices and a server, are the same as those in the concrete example in embodiment 3. Further, the processes in which the first information-processing device 1k, the second information-processing device 2b, and the third information-processing device 3k respectively register IP addresses and device identifying information to a server are the same as those in embodiment 3, and thus their descriptions are omitted. The process in which tunnel communication is started between the first information-processing device 1k and the second information-processing device 2b is the same as that in embodiment 4, and thus its description is omitted. Also, the process in which tunnel communication is started between the first information-processing device 1k and the third information-processing device 3k is the same as that in embodiment 4, and thus its description is omitted. Here, it is assumed that the process for starting tunnel communication between the first information-processing device 1k and the third information-processing device 3k is executed, and in the tunnel communication, the IP address "192.168.0.1" of the first information-processing device 1k, used for communication target data, has agreed with the IP address "192.168.0.1" of the first information-processing device 1k, used for communication target data in tunnel communication with the second information-processing device 2b.

Consequently, the detection part 18 determines that both addresses are the same (S901), and the address changing part 19 changes an address used for communication target data in tunnel communication performed between the first information-processing device 1k and the third information-processing device 3k. Specifically, the address changing part 19 changes an address with one of the following three methods, for example (S902). Here, the address is assumed to be "192.168.0.2" of the third information-processing device 3k used for communication target data in tunnel communication performed between the first information-processing device 1k and the third information-processing device 3k. Further, in this address, the last eight bits are assumed to represent a host address. (That is, the subnet mask is "255.255.255.0".)

[Method of Changing a Host Address]

Address changing part 19 adds "1" to the host address of the IP address "192.168.0.1" of the first information-processing device 1k to determine the IP address of the first information-processing device 1k as "192.168.0.2". Address changing part 19 also adds "1" to the host address of the IP address "192.168.0.2" of the third information-processing device 3k to determine the IP address of the third information-processing device 3k as "192.168.0.3".

[Method of Changing a Network Address]

Address changing part 19 adds "1" to the network address of the IP address "192.168.0.1" of the first information-processing device 1k to determine the IP address of the first information-processing device 1k as "192.168.1.1". Address changing part 19 also adds "1" to the network address of the IP address "192.168.0.20" the third information-processing device 3k to determine the IP address of the third information-processing device 3k as "192.168.1.2".

[Method of Changing a Host Address and Network Address]

Address changing part 19 adds "1" to the network address of IP address "192.168.0.1" of the first information-processing device 1k and to the host address to determine the IP address of the first information-processing device 1k as "192.168.1.2". Address changing part 19 also adds "1" to the network address of the IP address "192.168.0.2" of the third information-processing device 3k and to the host address to determine the IP address of the third information-processing device 3k as "192.168.1.3".

Here, the description is made for three different methods of determining an address. However, it is sufficient if the address changing part 19 changes an address so as to resolve address agreement, and thus an address may be changed with an address change method other than these. For example, in this concrete example, only the IP address of the first information-processing device 1k may be changed as long as it is possible that the IP addresses of the first information-processing device 1k and the third information-processing device 3k are not the same.

In addition, if it is possible that a changed address is determined so as to be different from an address used for communication target data in tunnel communication with another information-processing device, the address may be determined again as a different one. In this case, if only the address of one information-processing device in tunnel communication is changed, it is required not to overlap with that of the other information-processing device in tunnel communication.

Address transmitter 15, in the same way as in the concrete example in embodiment 1, transmits the changed IP address of the first information-processing device 1k and the IP address of the third information-processing device 3k, to the third information-processing device 3k (S903). Consequently, these IP addresses are accepted by address acceptor 31 in the third information-processing device 3k and passed to tunnel communication part 32. Further, the tunnel communication part 11 performs tunnel communication using the changed address, and tunnel communication part 32 performs tunnel communication using the changed address accepted by address acceptor 31.

As mentioned above, in the communication system according to this embodiment, even if addresses used for communication target data in tunnel communication are the same, they can be changed. Consequently, a situation can be avoided where two or more tunnel communications are disabled, enabling two or more tunnel communications to be performed appropriately.

Here, in this embodiment, namely a communication system according to embodiment 4, the description is made for a case where a first information-processing device is equipped with the detection part 18 and the address changing part 19. However, also in a communication system other than that in embodiment 4, an information-processing device may be equipped with a detection part and an address changing part. For example, in a communication system according to embodiments 7 and 10, when a first information-processing device performs tunnel communication with two or more devices where the first information-processing device is equipped with a detection part and an address changing part, if addresses used for communication target data are the same, tunnel communication with two or more devices may be appropriately performed by changing at least one of the addresses.

Embodiment 14

A description is made for a communication system according to embodiment 14 of the present invention, referring to drawings. The communication system according to this embodiment changes an address in respective information-processing devices.

The communication system according to this embodiment is assumed to be the same as that in FIG. 32. However, the first information-processing device 1k is assumed to correspond to the first information-processing device 1m; the second information-processing device 2b, to the second information-processing device 2m.

Figure 36:
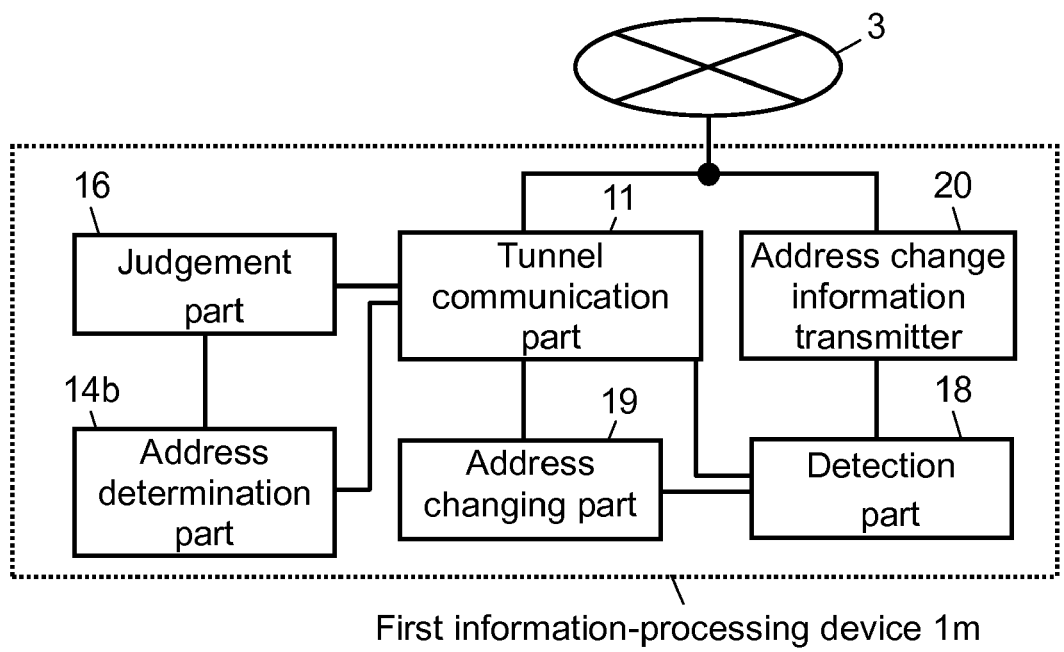
FIG. 36 is a block diagram showing the makeup of a first information-processing device according to embodiment 14 of the present invention.

FIG. 36 is a block diagram showing the makeup of a first information-processing device 1m according to this embodiment. The first information-processing device 1m according to this embodiment is equipped with the tunnel communication part 11, the address determination part 14b, the judgment part 16, the detection part 18, the address changing part 19, and the address change information transmitter 20. Here, the tunnel communication part 11, the address determination part 14b, and the judgment part 16 are the same as those in embodiment 4; the detection part 18 and the address changing part 19 are the same as, in embodiment 13, and thus their descriptions are omitted.

Address change information transmitter 20, when the detection part 18 detects two or more addresses are the same, transmits address change information. Here, the address change information refers to one related to change of an address used for communication target data in tunnel communication. Address change information may be one for only a direction to change an address, or one including a direction related to how to change an address. Address change information is transmitted to an information-processing device for communication destination performing tunnel communication for changing an address used for communication target data. Here, address change information transmitter 20 may optionally include a transmission device for transmitting (e.g. modem or network card). In this case, a transmission device (not illustrated) is to exist between the address change information transmitter 20 and the communication line 3. Also, the address change information transmitter 20 may be implemented by means of hardware, or software such as a driver for driving the transmission device.

Figure 37:
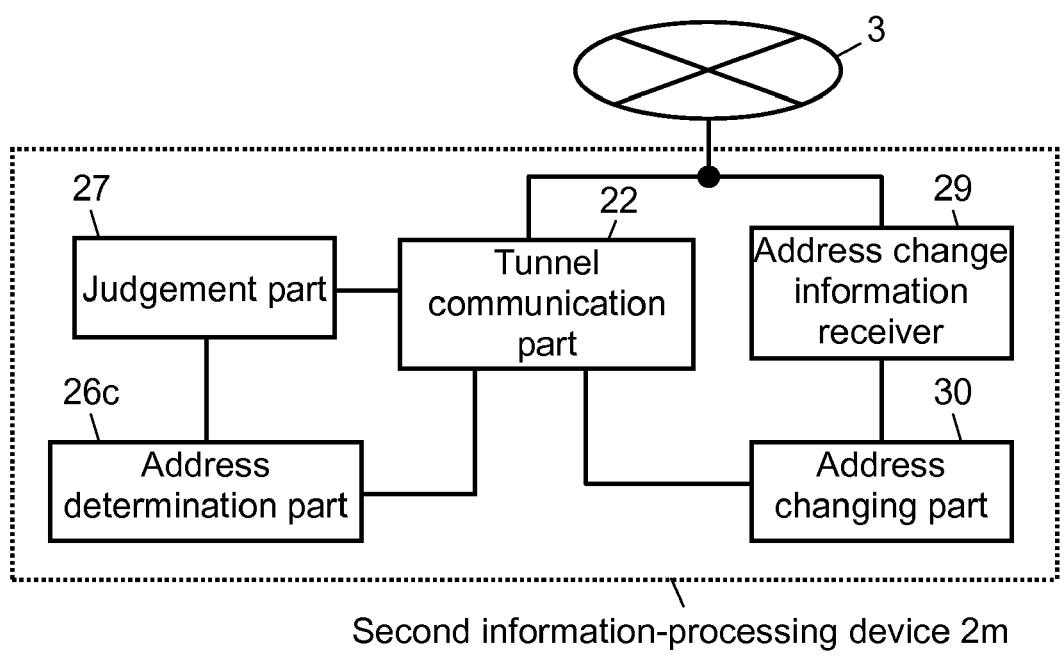
FIG. 37 is a block diagram showing the makeup of a second information-processing device according to the $14^{th}$ embodiment.

FIG. 37 is a block diagram showing the makeup of the second information-processing device 2m according to this embodiment. Second information-processing device 2m according to this embodiment is equipped with the tunnel communication part 22, the address determination part 26*c*, judgment part 27, the address change information receiver 29, and address changing part 30. Here, the tunnel communication part 22, the address determination part 26*c*, and the judgment part 27 are the same as those in embodiment 5, and thus their descriptions are omitted.

Address change information receiver 29 receives address change information. Here, the address change information receiver 29 may optionally include a receiving device for receiving (e.g. modem or network card). In this case, a receiving device (not illustrated) is to exist between address change information receiver 29 and the communication line 3. Also, address change information receiver 29 may be implemented by means of hardware, or software such as a driver for driving the receiving device.

Address changing part 30, when the address change information receiver 29 receives address change information, changes the address used for communication target data in tunnel communication. This process in which the address changing part 30 changes the address is the same as that by the address changing part 19 according to embodiment 13, and thus its description is omitted.

Figure 38:
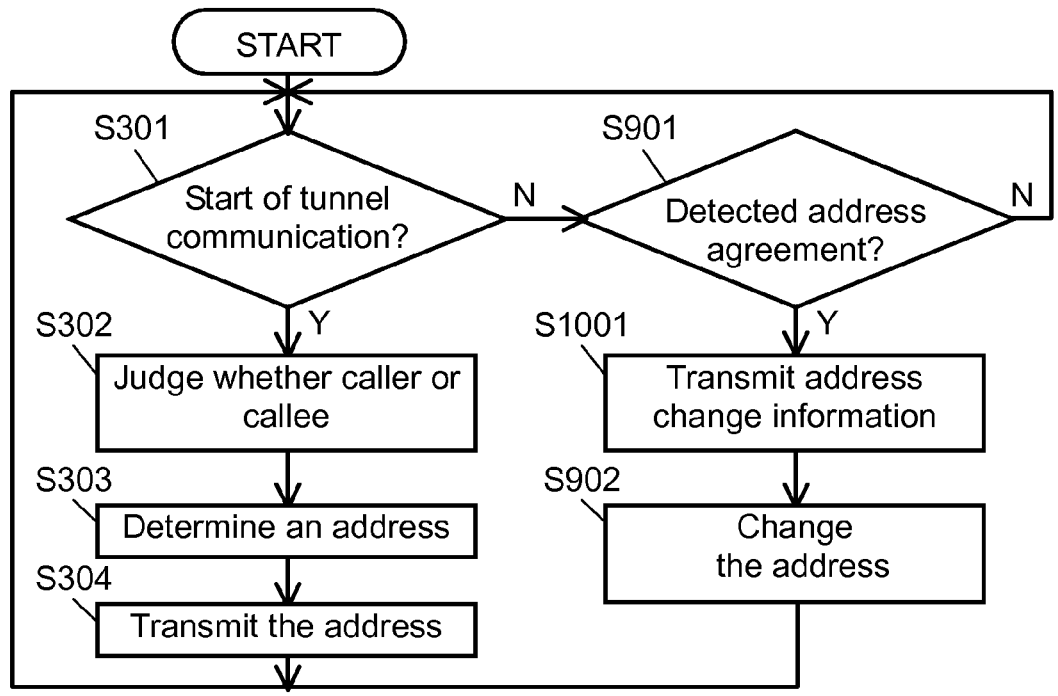
FIG. 38 is a flowchart showing the action of a first information-processing device in the $14^{th}$ embodiment.

Next, a description is made for the action of a communication system, in particular, the action for determining and changing an address, according to this embodiment. FIG. 38 is a flowchart showing the action for determining and changing an address by the first information-processing device 1*m*. Here, in FIG. 38, the processes other than that of S1001 is the same as those in the flowchart of FIG. 35 in embodiment 13, and thus their descriptions are omitted.

(S1001) Address change information transmitter 20 transmits address change information. The transmission destination of this address change information is an information-processing device for communication destination performing tunnel communication for changing an address used for communication target data. Here, in the flowchart of FIG. 38, the process ends with an interruption of power off or process end.

Figure 39:
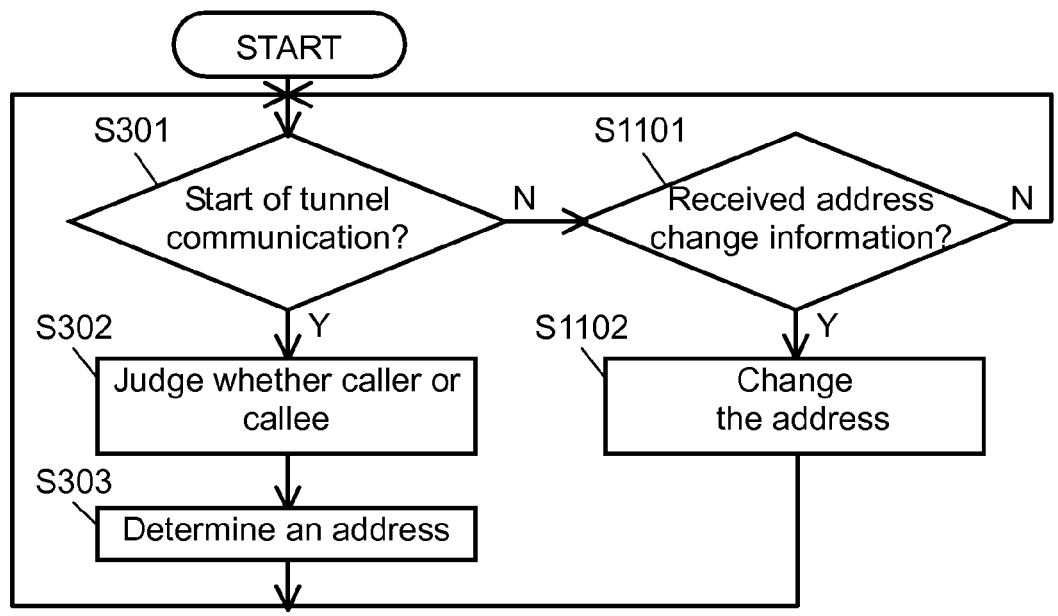
FIG. 39 is a flowchart showing the action of a second information-processing device in the $14^{th}$ embodiment.

FIG. 39 is a flowchart showing the action for determining and changing an address by the second information-processing device 2*m*. Here, in FIG. 39, the processes other than S1101 and S1102 are the same as those in the flowchart of FIG. 35 in embodiment 13, except that the tunnel communication part 11 is the tunnel communication part 22; the address determination part 14*b*, the address determination part 26*c*; judgment part 16, judgment part 27, and thus their descriptions are omitted.

(S1101) Address change information receiver 29 determines whether address change information has been received. If accepted, the flow goes to S1102; otherwise, returns to S301.

(S1102) Address changing part 30 changes the address used for communication target data in tunnel communication. After that, the tunnel communication part 22 is to perform tunnel communication using the changed address. Then the flow returns to S301.

Here, in the flowchart of FIG. 39, the process ends with an interruption of power off or process end.

Next, a description is made for the action of the communication system according to this embodiment, using a concrete example. First, the data structure in tunnel communication is the same as that in FIG. 5. In addition, the IP address and device identifiers of the information-processing devices and a server are assumed to be the same as those in the concrete example in embodiment 13. First, the process in which the first information-processing device 1*m* and the third information-processing device 3*k* start tunnel communication, and after that, the first information-processing device 1*m* and the second information-processing device 2*m* start tunnel communication, is the same as that in embodiment 5, and thus its description is omitted.

It is assumed that, after the first information-processing device 1*m* and the second information-processing device 2*m* start tunnel communication, the IP address of the first information-processing device 1*m*, that the first information-processing device 1*m* uses for communication target data in tunnel communication with the third information-processing device 3*k*, and the IP address of the first information-processing device 1*m*, that the first information-processing device 1*m* uses for communication target data in tunnel communication with the second information-processing device 2*m*, are both "192.168.0.1", and the agreement is detected by the detection part 18 (S901). Consequently, address change information transmitter 20 transmits the address change information to the second information-processing device 2*m* (S1001). Further, the address changing part 19 of the first information-processing device 1*m*, in the same way as in embodiment 13, changes the IP address used for communication target data in tunnel communication with the second information-processing device 2*m* (S902).

Address change information receiver 29 of the second information-processing device 2*m* accepts address change information transmitted from the first information-processing device 1*m* through the tunnel communication part 22 (S1101). Then, the address changing part 30 changes the IP address that the second information-processing device 2*m* uses for communication target data in tunnel communication with the first information-processing device 1*m* (S1102). This address change in address changing part 30 is to be made in the same way as in the address changing part 19 in the first information-processing device 1*m*. Therefore, even if addresses are changed separately in the first information-processing device 1*m* and the second information-processing device 2*m*, the changed addresses are assumed to be the same in the first information-processing device 1*m* and the second information-processing device 2*m*.

Here, address change information may include information showing how the addresses are to be changed. For example, when the first information-processing device 1*m* performs address change where "1" is added to the host address of the first information-processing device 1*m* and the second information-processing device 2*m*, if the address change information transmitter 20 transmits address change information including information showing the address change to the second information-processing device 2*m*, the second information-processing device 2*m* can perform address change where "1" is added to the host address of the first information-processing device 1*m* and the second information-processing device 2*m*. Consequently, even if the first information-processing device 1*m* and the second information-processing device 2*m* separately change addresses, the changed addresses are identical.

As mentioned above, In the communication system according to this embodiment, when the first information-processing device 1*m* detects that two or more addresses are the same, the second information-processing device 2*m*, as a result that the address is changed and also address change information is transmitted to the second information-processing device 2*m* at the communication destination, can change an address in the same way as performed in the first information-processing device 1*m*. Consequently, the first information-processing device 1*m* and the second information-processing device 2*m* can perform tunnel communication using the changed addresses, and also resolve the address agreement that has occurred in the first information-processing device 1*m*.

Here, in this embodiment, namely a communication system according to embodiment 5, the description is made for a case where a first information-processing device is equipped with the detection part 18 and others, and a second information-processing device is equipped with the address change information receiver 29 and others. However, in a communication system other than that in embodiment 5, first information-processing device and others may be also equipped with the detection part 18 and others. In a communication system according to embodiments 8 and 11, for example, as a result that first information-processing device and second information-processing device are equipped with a detection part and an address changing part, when first information-processing device performs tunnel communication with two or more devices, tunnel communication with two or more devices may be appropriately performed by changing at least one of the addresses if an address used for communication target data agrees.

Embodiment 15

A description is made for a communication system according to embodiment 15 of the present invention, referring to drawings. In the communication system according to this embodiment, a server, when detecting that two or more addresses used for communication target data in tunnel communication are the same, changes the address.

The communication system according to this embodiment is assumed to be the same as that in FIG. 32. However, the first information-processing device 1*k* is assumed to correspond to a first information-processing device 1*n*; the second information-processing device 2*b*, to a second information-processing device 2*n*; the server 4, to a server 7*n*. Here, a third information-processing device 3*k* is assumed to be the same as in embodiment 13.

Figure 40:
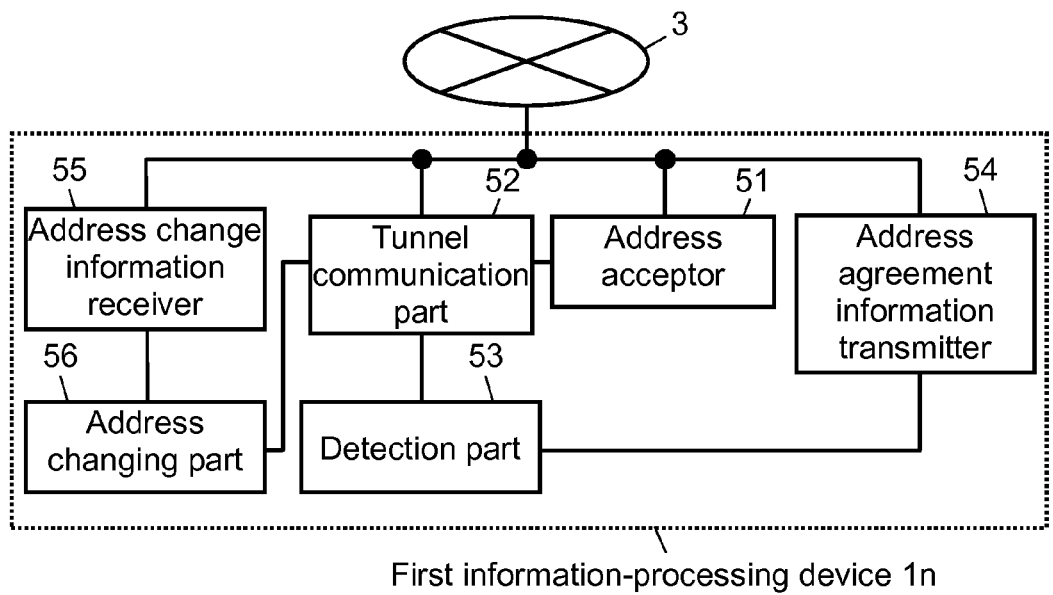
FIG. 40 is a block diagram showing the makeup of a first information-processing device according to embodiment 15 of the present invention.

FIG. 40 is a block diagram showing the makeup of the first information-processing device in according to this embodiment. The first information-processing device in according to this embodiment is equipped with the address acceptor 61, the tunnel communication part 52, the detection part 5, an address agreement information transmitter 54, an address change information receiver 55, and an address changing part 56. Here, the address acceptor 61 and the tunnel communication part 52 are the same as those in embodiment 3, except that the tunnel communication part 52 performs tunnel communication with two or more devices for communication destination, and detection part 53 is the same as the detection part 18 in embodiment 13, and thus their descriptions are omitted.

Address agreement information transmitter 54, when the detection part 53 detects two or more addresses are the same, transmits address agreement information to the server 7*n*. Here, address agreement information refers to information showing that addresses used for communication target data in tunnel communication are the same This address agreement information may include information showing in which tunnel communication the address used for communication target data has agreed with the address used for communication target data in other tunnel communication, for example. Here, the address agreement information transmitter 54 may optionally include a transmission device for transmitting (e.g. modem or network card). In this case, a transmission device (not illustrated) is to exist between the address agreement information transmitter 54 and the communication line 3.

Also, the address agreement information transmitter 54 may be implemented by means of hardware, or software such as a driver for driving the transmission device.

Address change information receiver 55 receives the address change information. Here, the address change information refers to information related to address change. Address change information, as described in embodiment 13, for example, may be one for only a direction to change an address, one including a direction related to how to change an address (e.g. adding "1" to a host address), or one showing a changed address. Here, the address change information receiver 55 may optionally include a receiving device for receiving (e.g. modem or network card). In this case, a receiving device (not illustrated) is to exist between the address change information receiver 55 and the communication line 3. Also, the address change information receiver 55 may be implemented by means of hardware, or software such as a driver for driving the receiving device.

Address changing part 56 changes an address used for communication target data. This address change is performed according to address change information received by an address change information receiver. If address change information is information showing how an address is changed, for example, the address changing part 56 changes an address used for communication target data in tunnel communication according to the address change information.

Figure 41:
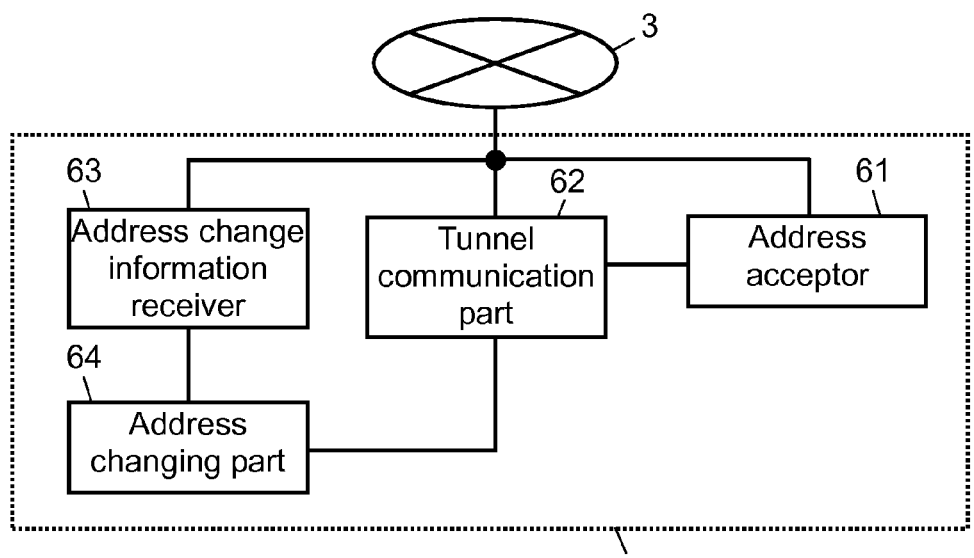
FIG. 41 is a block diagram showing the makeup of a second information-processing device according to the $15^{th}$ embodiment.

FIG. 41 is a block diagram showing the makeup of the second information-processing device 2*n* according to this embodiment. A second information-processing device 2*n* according to this embodiment is equipped with an address acceptor 61, a tunnel communication part 62, an address change information receiver 63, and an address changing part 64. Here, the address acceptor 61 and the tunnel communication part 62 are the same as those in embodiment 3, and thus their descriptions are omitted. Also, the address change information receiver 63 and the address changing part 64 are the same as the address change information receiver 55 and the address changing part 56 above-mentioned, respectively, and thus their descriptions are omitted.

Figure 42:
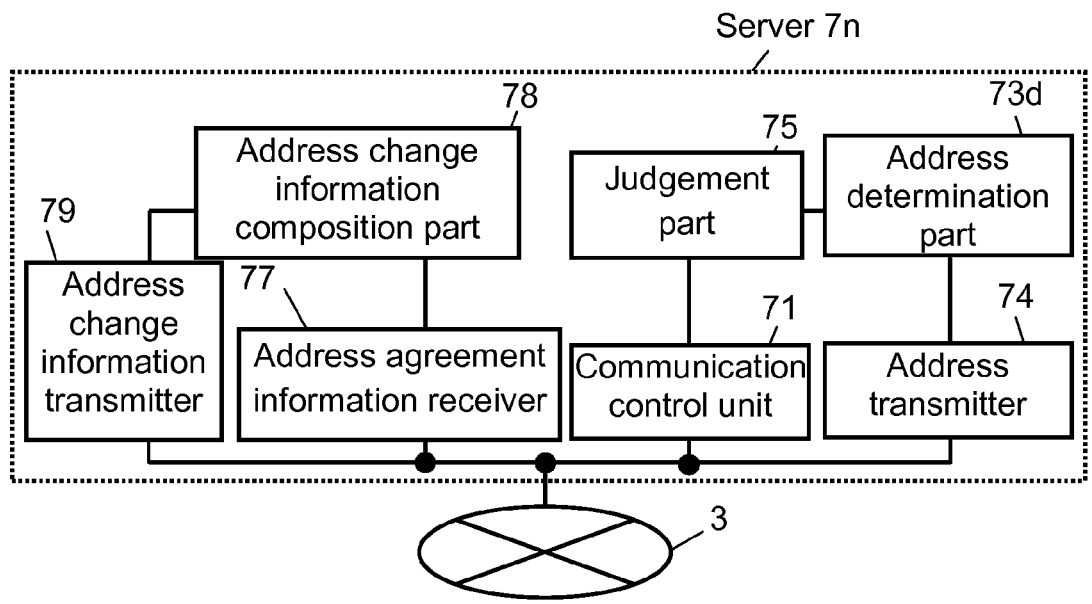
FIG. 42 is a block diagram showing the makeup of a server according to the $15^{th}$ embodiment.

FIG. 42 is a block diagram showing the makeup of a server 7*n* according to this embodiment. Server 7*n* according to this embodiment is equipped with a communication control unit 71, an address determination part 73*d*, an address transmitter 74, a judgment part 75, an address agreement information receiver 77, an address change information composition part 78, and an address change information transmitter 79. Here, the communication control unit 71, the address determination part 73*d*, the address transmitter 74, and the judgment part 75 are the same as those in embodiment 6, and thus their descriptions are omitted.

Address agreement information receiver 77 receives address agreement information. Here, the address agreement information receiver 77 may optionally include a receiving device for receiving (e.g. modem or network card). In this case, the receiving device (not illustrated) is to exist between address agreement information receiver 77 and the communication line 3. Also, the address agreement information receiver 77 may be implemented by means of hardware, or software such as a driver for driving the receiving device.

Address change information composition part 78, when the address agreement information receiver 77 receives address agreement information, composes address change information. Address change information composition part 78 may, for example, generate new address change information or read address change information stored in a given recording medium or the like.

Address change information transmitter 79 transmits address change information composed by the address change information composition part 78. Here, the address change information transmitter 79 may optionally include a transmission device for transmitting (e.g. modem or network card). In this case, the transmission device (not illustrated) is to exist between the address change information transmitter 79 and the communication line 3. Also, the address change information transmitter 79 may be implemented by means of hardware, or software such as a driver for driving the transmission device.

Figure 43:
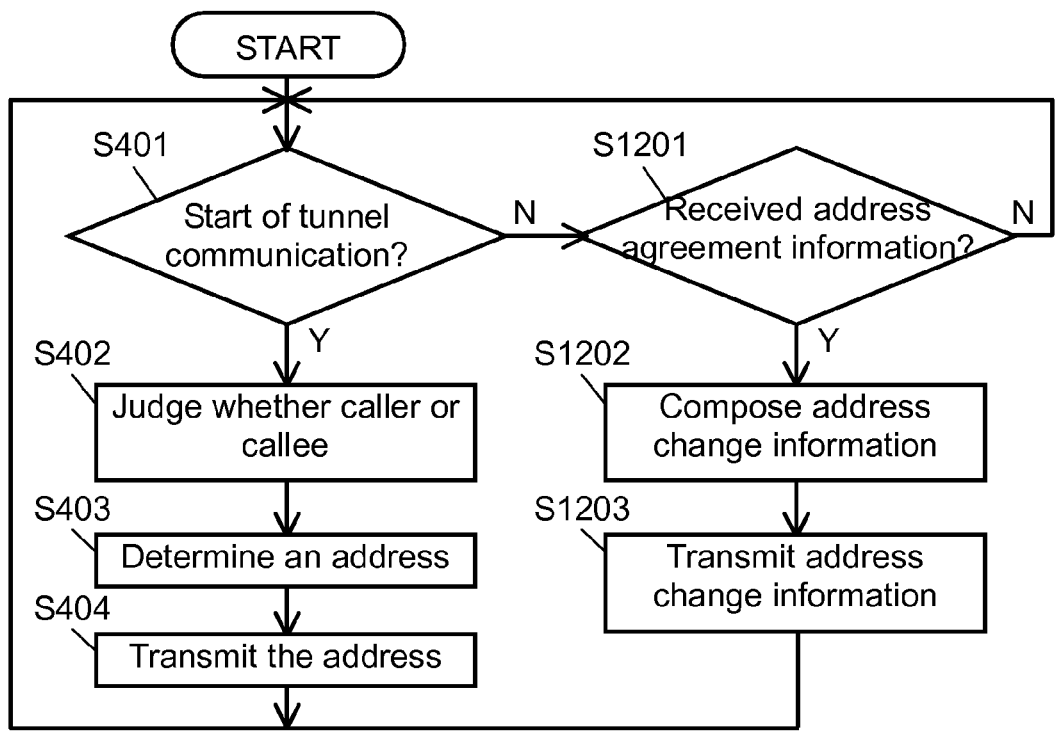
FIG. 43 is a flowchart showing the action of a server in the $15^{th}$ embodiment.

Next, a description is made for the action of a communication system, in particular, the action for determining and changing an address, according to this embodiment. FIG. 43 is a flowchart showing the action in which the server 7n determines an address. Here, processes S401 through S404 are the same as those in the flowchart of FIG. 18 in embodiment 6, and thus their descriptions are omitted.

(S1201) Address agreement information receiver 77 determines whether address agreement information has been received. If received, the flow goes to S1202; otherwise, returns to S401.

(S1202) Address change information composition part 78 composes address change information.

(S1203) Address change information transmitter 79 transmits address change information composed by the address change information composition part 78 to an information-processing device, and then the flow returns to S401.

Here, in the flowchart of FIG. 43, the process ends with an interruption of power off or process end.

Next, a description is made for the action of the communication system according to this embodiment, using a concrete example. First, the data structure in tunnel communication is the same as that in FIG. 5. In addition, the IP addresses and device identifiers of information-processing devices and a server are assumed to be the same as those in the concrete example in embodiment 13. First, the process in which the first information-processing device 1n and the third information-processing device 3k start tunnel communication, and after that the first information-processing device 1n and the second information-processing device 2n start tunnel communication is the same as that in embodiment 14, and thus its description is omitted.

It is assumed that, after the first information-processing device 1n and the second information-processing device 2n start tunnel communication, the IP address of the first information-processing device 1n, that the first information-processing device 1n uses for communication target data in tunnel communication with the third information-processing device 3k, and the IP address of the first information-processing device 1n, that the first information-processing device 1n uses for communication target data in tunnel communication with the second information-processing device 2n, are both "192.168.0.1", and the agreement is detected by detection part 53. Consequently, the address change information transmitter 54 transmits to the server 7n, the address "192.168.0.1" of the first information-processing device 1n and the address "192.168.0.2" of the second information-processing device 2n, both used for communication target data in tunnel communication performed between the first information-processing device 1n and the second information-processing device 2n; and address agreement information including information showing that the address of the first information-processing device 1n has agreed with an address to be used in other tunnel communication, and device identifying information of the second information-processing device 2n.

Consequently, the address agreement information is received by address agreement information receiver 77 (S1201). Then, the address change information composition part 78 determines that an address used for the communication target data in tunnel communication performed between the first information-processing device 1n and the second information-processing device 2n, has agreed with an address used for the communication target data in other tunnel communication, and composes address change information for changing the address used for the communication target data in tunnel communication performed between the first information-processing device 1n and the second information-processing device 2n (S1202). This address change information is assumed to include a direction to add "1" to the host address. The address change information is transmitted to the first information-processing device 1n and the second information-processing device 2n by the address change information transmitter 79 (S1203). Address change information transmitter 79 can learn the address of the first information-processing device 1n, which is a transmission destination of the address change information, from the transmission source address of the address agreement information. Also the address change information transmitter 79 can learn the address of the second information-processing device 2n, by using the device identifying information of the second information-processing device 2n, included in the address agreement information, and the address identifier correspondence information shown in FIG. 11.

The address change information is received by the address change information receiver 55 of the first information-processing device 1n, and the address changing part 56 adds "1" to the IP address "192.168.0.1" of the first information-processing device in and the IP address "192.168.0.2" of the second information-processing device 2n, according to the address change information, to changes an address. Further, address change information is received by the address change information receiver 63 of the second information-processing device 2n, and address changing part 64 of the second information-processing device 2 also adds "1" to the IP address "192.168.0.1" of the first information-processing device 1n and the IP address "192.168.0.2" of the second information-processing device 2n, according to the address change information, to change an address. After that, tunnel communication is performed between the first information-processing device in and the second information-processing device 2n, using the changed address.

In this concrete example, the description is made for a case where address change information shows how an address is changed. However, the address change information may show a changed address, and in such a case, the address changing part 56 and others are to change the address of the first information-processing device 1n and others to those shown by the address change information.

As mentioned above, in the communication system according to this embodiment, when the first information-processing device in detects that two or more addresses are the same, transmitting address agreement information showing two or more addresses are the same to the server 7n enables the server 7n to be notified of the address agreement. After that, the server 7n sends address change information to an information-processing device according to the reception of address agreement information, allowing each information-processing device to change an address according to the address change information. Consequently, the first information-processing device 1n and the second information-processing device 2n can perform tunnel communication using the changed address, and can also resolve the address agreement that has occurred in the first information-processing device 1*n*.

Here, in this embodiment, namely a communication system according to embodiment 6, the description is made for a case where the first information-processing device is further equipped with the address agreement information transmitter 54 and others, the second information-processing device is further equipped with the address change information receiver 63 and others, and the server is further equipped with the address agreement information receiver 77 and others. However, also in a communication system in other than embodiment 6, as a result that a server and others are equipped with the address agreement information receiver 77 and others, each information-processing device may change an address according to address change information transmitted from the server, in the same way as in this embodiment. In a communication system according to embodiments 9 and 12, for example, as a result that a server is equipped with an address agreement information receiver, address change information composition part, and address change information transmitter, when the first information-processing device performs tunnel communication with two or more devices, tunnel communication with two or more devices may be appropriately performed by changing at least one of the addresses if an address used for communication target data agrees.

In addition, in embodiments 13 through 15, the concrete example describes a case where an address is changed when two addresses are the same. However, also when three or more addresses are the same, the same address change process may be performed to resolve the address similarity.

Further, the concrete examples in each above-mentioned embodiment describe a case where first information-processing device receives the device identifier of a second information-processing device from a recording medium. However, first information-processing device may receive the device identifier of a second information-processing device with another means such as input by an input device or reception via a communication line.

In addition, in each above-mentioned embodiment, a single or a plurality of communication control devices capable of NAT function (e.g. router) may exist between a first information-processing device and the communication line 3, or between a second information-processing device and the communication line 3. In this case, the communication control device is to perform IP address conversion and others.

In addition, in each above-mentioned embodiment, the description is made for a case where servers 4 and 7 are identified by their IP addresses. However, servers 4 and 7 may be identified by their domain names (e.g. "server.pana.net"). In this case, as a result that the domain name is converted by a DNS server, servers 4 and 7 can be identified.

Further, a protocol for communication performed through the communication line 3 in each above-mentioned embodiment may be either IPv4 (Internet Protocol version 4) or IPv6 (Internet Protocol version 6).

In addition, in each above-mentioned embodiments, the description is mainly made for a case where the device identifier is shown in numeric characters. However, a device identifier may be other characters such as alphabetical characters.

In addition, in each above-mentioned embodiments, each process (each function) may be implemented by a centralized process with a single device (system) or a distributed process with a plurality of devices.

In addition, in each above-mentioned embodiments, each component may be composed of dedicated hardware, or software for a component feasible with software, namely by executing programs. One example is that a software program recorded in a recording medium such as a hard disk or semiconductor memory is read and executed by a program executing part such as a CPU, enabling each component to be implemented. Here, software for implementing an information-processing device or server in each above-mentioned embodiment, is the following program. That is, a program that makes a CPU execute an address determination step for determining an address used for communication target data encapsulated in tunnel communication performed between first information-processing device and second information-processing device, according to a first device identifier for identifying a first information-processing device and a second device identifier for identifying a second information-processing device.

This program may make a computer further execute an identifier accepting step for accepting a first device identifier and/or second device identifier, and may determine at the address determining step an address using the first device identifier and/or second device identifier accepted at the identifier accepting step.

In addition, another program is to make a computer execute a judging step for judging which is a caller or callee, a first information-processing device or second information-processing device, performing tunnel communication; and an address determination step for determining an address used for communication target data encapsulated in tunnel communication performed between a first information-processing device and a second information-processing device, according to a determination by the judging step.

Further, another program is to make a computer execute an address determination step for determining an address used for communication target data encapsulated in tunnel communication performed between a first information-processing device and a second information-processing device, according to a first device identifier for identifying a first information-processing device; a second device identifier for identifying a second information-processing device; and a tunnel communication identifier for identifying tunnel communication performed between a first information-processing device and a second information-processing device.

In addition, this program may further make a computer execute an identifier accepting step for accepting a first device identifier and/or second device identifier, and at the address determining step, an address may be determined using a first device identifier and/or second device identifier accepted by the identifier accepting step.

Still, this program may further make a computer execute a tunnel communication identifier accepting step for accepting a tunnel communication identifier, and at the address determining step, an address may be determined using a tunnel communication identifier accepted at the tunnel communication identifier accepting step.

Further, another program is to make a computer execute a judging step for judging which is a caller or callee, a first information-processing device or second information-processing device, performing tunnel communication; and an address determination step for determining an address used for communication target data encapsulated in tunnel communication performed between a first information-processing device and second information-processing device, according to a determination by the judging step, and to a tunnel communication identifier for identifying tunnel communication performed between a first information-processing device and a second information-processing device.

In addition, this program may further make a computer execute a tunnel communication identifier accepting step for accepting a tunnel communication identifier, and at the address determining step, an address may be determined using a tunnel communication identifier accepted at the tunnel communication identifier accepting step.

Further, another program is to make a computer execute a process in an information-processing device for communication source performing tunnel communication with two or more devices for communication destination, a program for making a computer execute a detecting step for detecting that two or more addresses are the same that are used for each communication target data encapsulated in two or more tunnel communications; and an address changing step for changing an address used for communication target data when it is detected that two or more addresses are the same at the detecting step.

Further, another program is to make a computer execute a process in an information-processing device for communication source performing tunnel communication with a device for communication destination, a program for making a computer execute an address change information receiving step for receiving address change information that is information related to address change; and an address changing step for changing an address used for communication target data.

Further, another program is to make a computer execute a process in an information-processing device for communication source performing tunnel communication with two or more devices for communication destination, a program for making a computer execute a detecting step for detecting that two or more addresses are the same that are used for each communication target data encapsulated in two or more tunnel communications; an address agreement information transmitting step for transmitting address agreement information that is information showing address agreement when it is detected that two or more addresses are the same; an address change information receiving step for receiving address change information that is information related to address change; and an address changing step for changing an address used for communication target data, according to the address change information.

Further, another program is to make a computer execute: an address agreement information receiving step for receiving address agreement information that is information showing that two or more addresses are the same that are used for communication target data encapsulated in two or more tunnel communications; an address change information composing step for composing address change information that is information related to address change so as to resolve the address agreement; and an address change information transmitting step for transmitting the address change information.

Here, in the above-mentioned program, the identifier accepting step for transmitting information and other steps do not include a process performed by hardware such as the process performed by an input device or the like (i.e. a process performed only by hardware).

In addition, this program may be executed by being downloaded from a server or the like, or being read from a given recording medium (e.g. optical disc, magnetic disk, or semiconductor memory)

Still, either a single or a plurality of computers may execute this program. In other words, either a centralized or distributed process may be performed.

INDUSTRIAL APPLICABILITY

As mentioned above, in a communication system and others according to the present invention, an address used for tunnel communication between information-processing devices with a simple algorithm, which is useful for a communication system performing tunnel communication, for example.

What is claimed is:

1. An information processing device operable as a server, the information processing device comprising:
   a processor;
   a non-transient, computer-readable memory storing a sever program;
   a network adaptor for operatively connecting the server to a communication network to communicate with a plurality of remotely located computers over the communication network;
   an identifier acceptor in communication with the network adaptor for accepting a first device identifier for identifying a first information-processing device and a second device identifier for identifying a second information-processing device;
   an address determination part for determining, as a function dependent upon both the first and second device identifiers, a first tunnel-communication address of the first information-processing device that is to be a communication source during a tunnel communication and a second tunnel-communication address of the second information-processing device that is to be a communication destination during the tunnel communication, both the first and second tunnel-communication addresses to be included in the encapsulated communication target data in the tunnel communication performed between the first information-processing device and the second information-processing device according to the first device identifier and the second device identifier that the identifier acceptor accepted, wherein
   the address determination part determines the first tunnel-communication address and the second tunnel-communication address by selecting the first and second tunnel-communication addresses from a plurality of predetermined addresses, and further wherein
   the address determination part compares at least one digit of the first device identifier with at least one digit of the second device identifier and selects one or both of the first and second tunnel-communication addresses according to a numerical magnitude difference between the at least one digit of the first and second device identifiers compared; and
   an address output part in communication with the network adaptor for outputting the first address and the second address determined by the address determination part.

2. The server as claimed in claim 1, wherein the at least one digit of the first and second device identifiers comprises a least significant digit.

3. An information processing device operable as a server, the information processing device comprising:
   a processor;
   a non-transient, computer-readable memory storing a sever program;

a network adaptor for operatively connecting the server to a computer network to communicate with a plurality of remotely located computers over the communication network;

an identifier acceptor in communication with the network adaptor for accepting a first device identifier for identifying a first information-processing device and a second device identifier for identifying a second information-processing device;

an address determination part for determining, based on accepted both the first and second device identifiers, a first tunnel-communication address of the first information-processing device and a second tunnel-communication address of the second information-processing device, both addresses used for encapsulated communication target data in a tunnel communication performed between the first information-processing device and the second information-processing device according to the first device identifier and the second device identifier that the identifier acceptor accepted, wherein the address determination part determines the first tunnel-communication address and the second tunnel-communication address by selecting the tunnel-communication addresses from a plurality of predetermined addresses, and further wherein the address determination part compares a magnitude of the first device identifier with a magnitude of the second device identifier and selects at least one of the first and second tunnel-communication addresses based on the magnitude of the first device identifier relative to the magnitude of the second device identifier; and an address output part in communication with the network adaptor for outputting the first address and the second address determined by the address determination part.

4. The server as claimed in claim 1, wherein the address determination part selects one or both of the first and second tunnel-communication addresses based on a table which shows a correspondence between i) a digit number of the first and second identifiers and ii) the first and second tunnel-communication addresses.

* * * * *

UNITED STATES PATENT AND TRADEMARK OFFICE
CERTIFICATE OF CORRECTION

Page 1 of 1

PATENT NO. : 7,860,980 B2
APPLICATION NO. : 11/466854
DATED : December 28, 2010
INVENTOR(S) : Maekawa et al.

It is certified that error appears in the above-identified patent and that said Letters Patent is hereby corrected as shown below:

1) On the title page of the patent, in the right column under 'OTHER PUBLICATIONS' please delete the "?" after "Solution Unyo Kokoga Point" and instead please insert --!--

2) In column 9, line 64, please delete "6A" and instead please insert --5A--

3) In column 22, line 31, please delete "16A" and instead please insert --15A--

4) In column 34, line 59, please delete "if" and instead please insert --1f--

5) In column 42, line 24, please delete "6" and instead please insert --5--

6) In column 51, line 18, please delete "192.168.0.20" and instead please insert --192.168.0.2--

7) In column 55, line 40, please delete "in" and instead please insert --1n--

8) In column 55, line 41, please delete "in" and instead please insert --1n--

9) In column 55, line 42, please delete "61" and instead please insert --51--

10) In column 55, line 46, please delete "61" and instead please insert --51--

Signed and Sealed this
Twenty-fourth Day of May, 2011

David J. Kappos
*Director of the United States Patent and Trademark Office*